(12) United States Patent
Tazume

(10) Patent No.: US 12,406,223 B2
(45) Date of Patent: Sep. 2, 2025

(54) CONTROL DEVICE AND METHOD FOR CONTROLLING AN UNMANNED DELIVERY VEHICLE

(71) Applicant: Rakuten Group, Inc., Tokyo (JP)

(72) Inventor: Toshiaki Tazume, Tokyo (JP)

(73) Assignee: Rakuten Group, Inc., Tokyo (JP)

( * ) Notice: Subject to any disclaimer, the term of this patent is extended or adjusted under 35 U.S.C. 154(b) by 0 days.

(21) Appl. No.: 17/795,368

(22) PCT Filed: May 31, 2021

(86) PCT No.: PCT/JP2021/020723
§ 371 (c)(1),
(2) Date: Jul. 26, 2022

(87) PCT Pub. No.: WO2022/254539
PCT Pub. Date: Dec. 8, 2022

(65) Prior Publication Data
US 2024/0185171 A1 Jun. 6, 2024

(51) Int. Cl.
*G06Q 10/0834* (2023.01)

(52) U.S. Cl.
CPC .................. *G06Q 10/0834* (2013.01)

(58) Field of Classification Search
CPC .......................... G06Q 10/0834; G06Q 10/083
See application file for complete search history.

(56) References Cited

U.S. PATENT DOCUMENTS 9,934,530 B1 * 4/2018 Iacono ................ G06Q 30/0639
10,482,421 B1 * 11/2019 Ducrou .................. G06V 20/54
11,610,276 B1 * 3/2023 Cohen .............. G06Q 10/06316
2020/0293989 A1 9/2020 Son
2021/0241224 A1 * 8/2021 Taniguchi .............. G06Q 50/40
(Continued)

FOREIGN PATENT DOCUMENTS

JP 2020-7148 A 1/2020
JP 6629490 B2 1/2020
(Continued)

OTHER PUBLICATIONS

The IP.com Journal, (Dec. 10, 2020). Smart Variable Order Delivery Time or Order Pickup Time System. (Year: 2020).*

*Primary Examiner* — Resha Desai
*Assistant Examiner* — Danielle Elizabeth Zevitz
(74) *Attorney, Agent, or Firm* — Sughrue Mion, PLLC

(57) ABSTRACT

A control device (100) controls a delivery vehicle and includes a first determiner (120) that determines a point (i) by using each of a plurality of shipping locations as a reference and (ii) on the basis of a preparation time from when a shipping request is accepted until when shipment becomes possible at each of the plurality of shipping locations. Additionally, the control device (100) includes a controller (130) that allows the delivery vehicle to accept a shipping location of a package or a delivery destination of the package as a movement destination so as to set a state of the delivery vehicle to a state of accepting the movement destination, moves the delivery vehicle to the movement destination when the state of the delivery vehicle is the state of accepting the movement destination, and moves the delivery vehicle toward the point when the state of the delivery vehicle is a state of not accepting the movement destination.

15 Claims, 21 Drawing Sheets

(56) References Cited

U.S. PATENT DOCUMENTS

| | | | |
|---|---|---|---|
| 2021/0248530 A1* | 8/2021 | Garcia-Brosa | G06Q 50/12 |
| 2022/0207478 A1* | 6/2022 | Hlavacek | G06N 5/01 |
| 2023/0359223 A1* | 11/2023 | Sakata | G05D 1/104 |

FOREIGN PATENT DOCUMENTS

| | | |
|---|---|---|
| JP | 2020-149558 A | 9/2020 |
| WO | 2020/013114 A1 | 1/2020 |

\* cited by examiner

FIG. 6

ESTIMATED PREPARATION TIME TABLE

| STORE ID | ESTIMATED PREPARATION TIME |
|----------|----------------------------|
| ST1      | 20 MINUTES                 |
| ST2      | 10 MINUTES                 |

FIG. 10

TASK TABLE

| DATE AND TIME | TASK ID | USER ID | PRODUCT ID | MOVEMENT DESTINATION ||
|---|---|---|---|---|---|
| | | | | SHIPPING LOCATION | DELIVERY DESTINATION |
| 2021/01/01 00:00:00 | TK1 | U1 | I1 | ST1 (...) | D1 (...) |
| 2021/01/01 00:01:00 | TK2 | U2 | I2 | ST2 (...) | D2 (...) |
| ... | ... | ... | ... | ... | ... |

FIG. 17

PREPARATION TIME TABLE

| STORE ID | PRODUCT ID | NAME | PREPARATION TIME |
|---|---|---|---|
| ST1 | S11 | STAKE | 30 MINUTES |
| ST1 | S12 | RAMEN | 15 MINUTES |
| ST1 | S13 | HAMBURGER | 15 MINUTES |
| ... | ... | ... | ... |
| ST2 | S21 | TOMATO | 5 MINUTES |
| ST2 | S22 | BREAD | 5 MINUTES |
| ... | ... | ... | ... |

CONTROL DEVICE AND METHOD FOR CONTROLLING AN UNMANNED DELIVERY VEHICLE

CROSS REFERENCE TO RELATED APPLICATIONS

This application is a National Stage of International Application No. PCT/JP2021/020723 filed May 31, 2021.

TECHNICAL FIELD

The present disclosure relates to a control device and a method.

BACKGROUND ART

In the related art, a system that notifies a terminal of a user, who is in a delivery destination, of the estimated time of arrival of a delivery vehicle, which is an unmanned delivery vehicle 80, to the delivery destination, and then delivers a package, which is an ordered product 71c, to the delivery destination by the delivery vehicle is known (for example, Patent Literature 1). After the package is delivered, the system determines a vehicle waiting area 40 closest to the delivery vehicle as a point of an objective destination and moves the delivery vehicle to the determined point.

CITATION LIST

Patent Literature

Patent Literature 1: Unexamined Japanese Patent Application Publication No. 2020-007148.

SUMMARY OF INVENTION

Technical Problem

However, the system of Patent Literature 1 determines the point of the objective destination not based on the time until shipment of the package becomes possible at a shipping location despite that start of the delivery of the package is not possible before the shipment of the package becomes possible. Therefore, the system of Patent Literature 1 has a first problem in that it is not possible to suppress the difference between the timing when the delivery vehicle arrives at the shipping location from the point of the objective destination or a point on the way to the point of the objective destination and the timing when shipment of the package becomes possible at the shipping location.

Furthermore, the system of Patent Literature 1 has a second problem in that since a mere notification to the delivery destination is performed, it is not possible to notify the shipping location of the start timing of preparation in order to suppress the difference between the timing when the delivery vehicle arrives at the shipping location and the timing when preparation of the package is completed and shipment of the package becomes possible at the shipping location.

The present disclosure has been made to solve the above problems, and a first objective of the present disclosure is to provide a control device and a method, capable of suppressing the difference between the timing when a delivery vehicle arrives at a shipping location and the timing when preparation of a package is completed and shipment of the package becomes possible at the shipping location.

A second objective of the present disclosure is to provide a control device and a method, capable of notifying a shipping location of the start timing of preparation in order to suppress the difference between the timing when a delivery vehicle arrives at the shipping location and the timing when preparation of a package is completed and shipment of the package becomes possible at the shipping location.

Solution to Problem

In order to achieve the above first objective, a control device according to a first aspect of the present disclosure is a control device for controlling a delivery vehicle, the control device including:
  a determiner that determines a point (i) by using each of a plurality of shipping locations as a reference and (ii) on the basis of a preparation time from when a shipping request is accepted until when shipment becomes possible at each of the plurality of shipping locations; and
  a controller that
    allows the delivery vehicle to accept a shipping location of a package or a delivery destination of the package as a movement destination so as to set a state of the delivery vehicle to a state of accepting the movement destination,
    moves the delivery vehicle to the movement destination when the state of the delivery vehicle is the state of accepting the movement destination, and
    moves the delivery vehicle toward the point when the state of the delivery vehicle is a state of not accepting the movement destination.

In order to achieve the above second objective, a control device according to a second aspect of the present disclosure is a control device for controlling a delivery vehicle, the control device including:
  a communicator that transmits, to a terminal device at a shipping location, a notification notifying that a start timing of preparation has arrived when the delivery vehicle arrives at a boundary of a region determined (i) by using, as a reference, the shipping location accepted as a movement destination and (ii) on the basis of a preparation time from when a shipping request is accepted until when shipment becomes possible at the shipping location.

Advantageous Effects of Invention

In accordance with a control device and a method according to a first aspect of the present disclosure, it is possible to suppress the difference between the timing when a delivery vehicle arrives at a shipping location and the timing when preparation of a package is completed and shipment of the package becomes possible at the shipping location.

In accordance with a control device and a method according to a second aspect of the present disclosure, it is possible to notify a shipping location of the start timing of preparation in order to suppress the difference between the timing when a delivery vehicle arrives at the shipping location and the timing when preparation of a package is completed and shipment of the package becomes possible at the shipping location.

BRIEF DESCRIPTION OF DRAWINGS

FIG. 6 is a diagram illustrating an example of an estimated preparation time table stored in the control device;

FIG. 10 is a diagram illustrating an example of a task table stored in the control device;

FIG. 17 is a diagram illustrating an example of a preparation time table stored in the control device;

DESCRIPTION OF EMBODIMENTS

Embodiments

Hereinafter, embodiments of the present disclosure are described with reference to the accompanying drawings.

Figure 1:
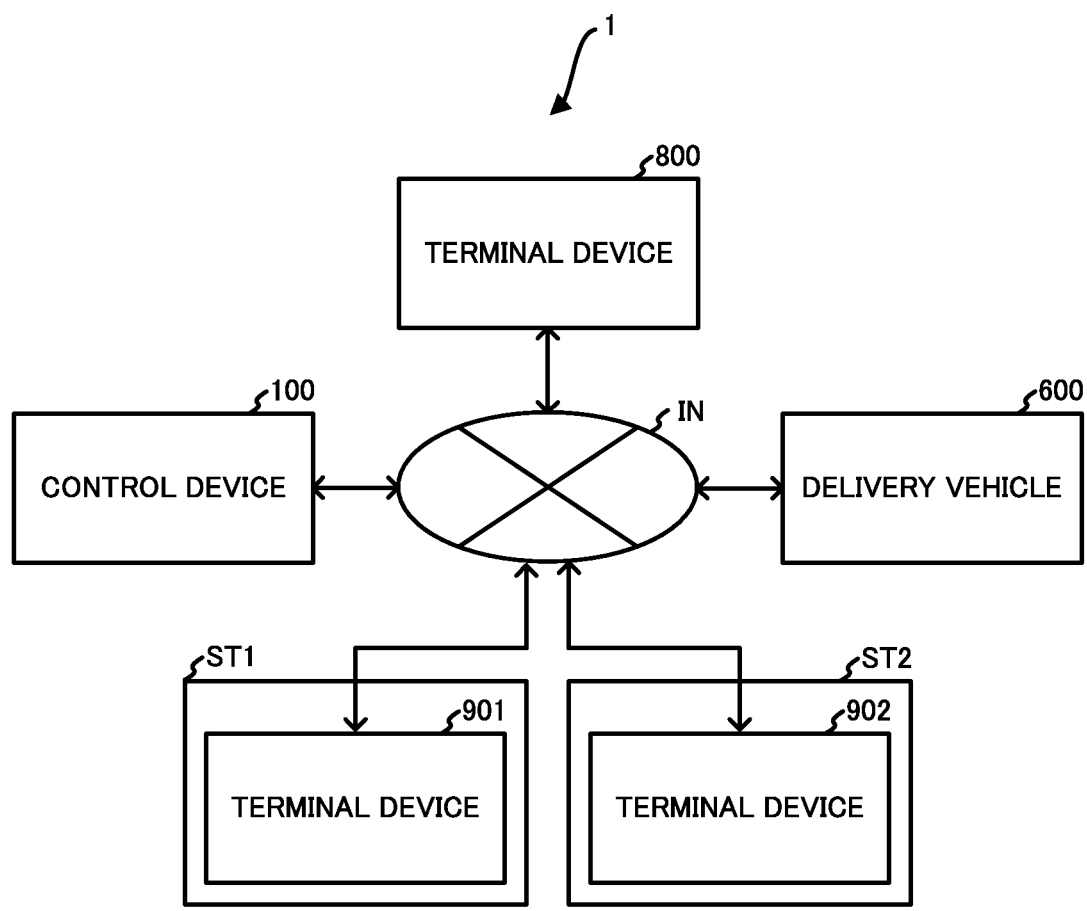
FIG. 1 is a system configuration diagram illustrating a configuration example of a delivery system according to the present disclosure.

A delivery system 1 according to an embodiment of the present disclosure includes a control device 100 as illustrated in FIG. 1 that controls the delivery of an ordered package, and a delivery vehicle 600 that stores the ordered package and moves under the control of the control device 100 in order to deliver the ordered package to a delivery destination. In the present embodiment, the following description is given by taking, as a specific example, a case where a package is an ordered product. Furthermore, the following description is given on the assumption that an order for a product includes a shipping request for requesting the shipment of the product, a collection request for collecting the shipped product, and a delivery request for requesting delivery of the shipped and collected product to a delivery destination.

Furthermore, the delivery system 1 includes a terminal device 800 carried by an orderer who orders a product. Moreover, the delivery system 1 includes a terminal device 901 carried by an employee of a store ST1 that sells ordered products and a terminal device 902 carried by an employee of a store ST2 that sells ordered products.

Figure 2:
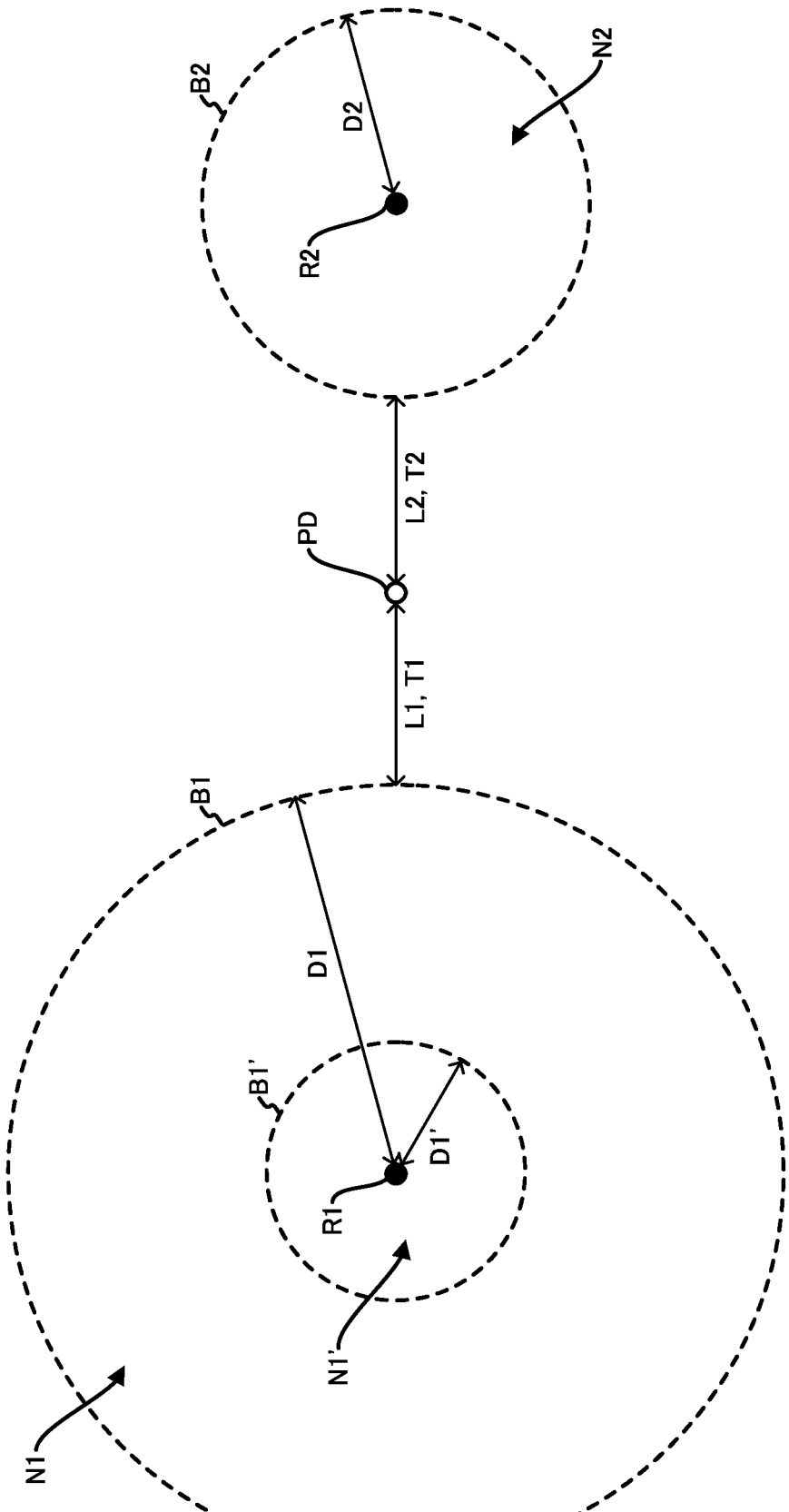
FIG. 2 is a diagram illustrating an example of a point of an objective destination located outside a neighboring region.

The store ST1 has an entrance that is a shipping location R1 as illustrated in FIG. 2 where products are shipped. The store ST2 has an entrance that is a shipping location R2.

Figure 3:
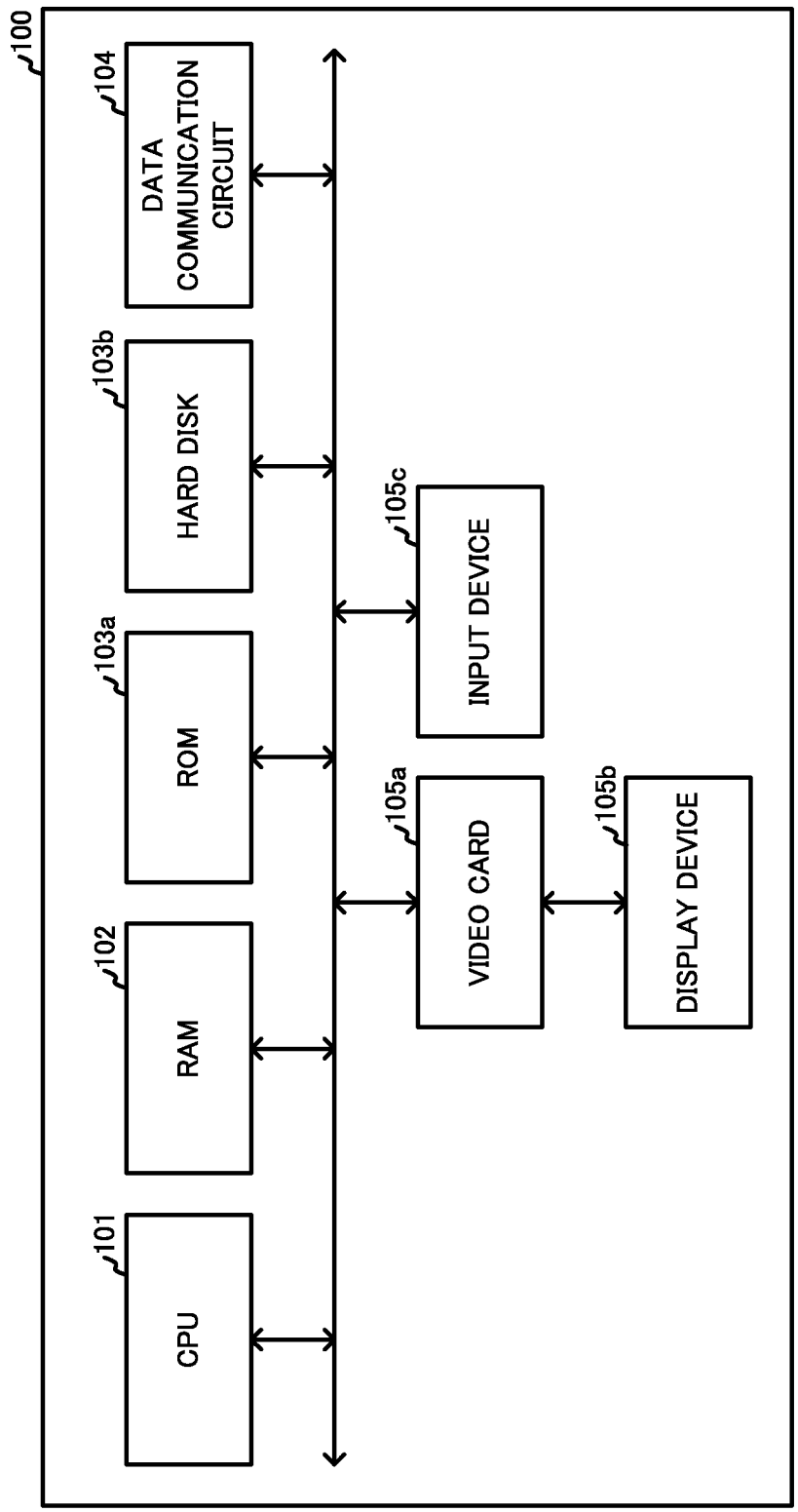
FIG. 3 is a hardware configuration diagram illustrating a configuration example of a control device.

The control device 100 is a server device, and is installed in, for example, an office building of an intermediary who mediates the sale of products. The control device 100 includes a central processing unit (CPU) 101, a random access memory (RAM) 102, a read only memory (ROM) 103a, a hard disk 103b, a data communication circuit 104, a video card 105a, a display device 105b, and an input device 105c as illustrated in FIG. 3, which are hardware. The control device 100 may include a plurality of CPUs, or a plurality of RAMs and flash memories.

The CPU 101 of the control device 100 performs the overall control of the entire control device 100 by executing a program stored in the ROM 103a or the hard disk 103b. The RAM 102 temporarily stores data to be processed when the program is executed by the CPU 101. The ROM 103a and the hard disk 103b store various programs, various data used for executing the programs, and a table in which the data are stored.

The data communication circuit 104 of the control device 100 is a network interface card (NIC), and, for example, performs data communication with a not-illustrated base station connected to the Internet IN by using radio waves according to communication standards such as long term evolution (LTE) and 5th generation (5G). With this, the data communication circuit 104 of the control device 100 performs data communication with the terminal devices 800, 901, and 902 and the delivery vehicle 600 that are connected to the Internet IN.

The video card 105a of the control device 100 renders an image on the basis of a digital signal output from the CPU 101, and outputs an image signal representing the rendered image. The display device 105b is an electroluminescence (EL) display, a plasma display panel (PDP), or a liquid crystal display (LCD), and displays the image according to the image signal output from the video card 105a. The input device 105c is one or more of a keyboard, a mouse, a touch pad, and a button, and inputs a signal corresponding to an operation of an employee of the intermediary.

Figure 4:
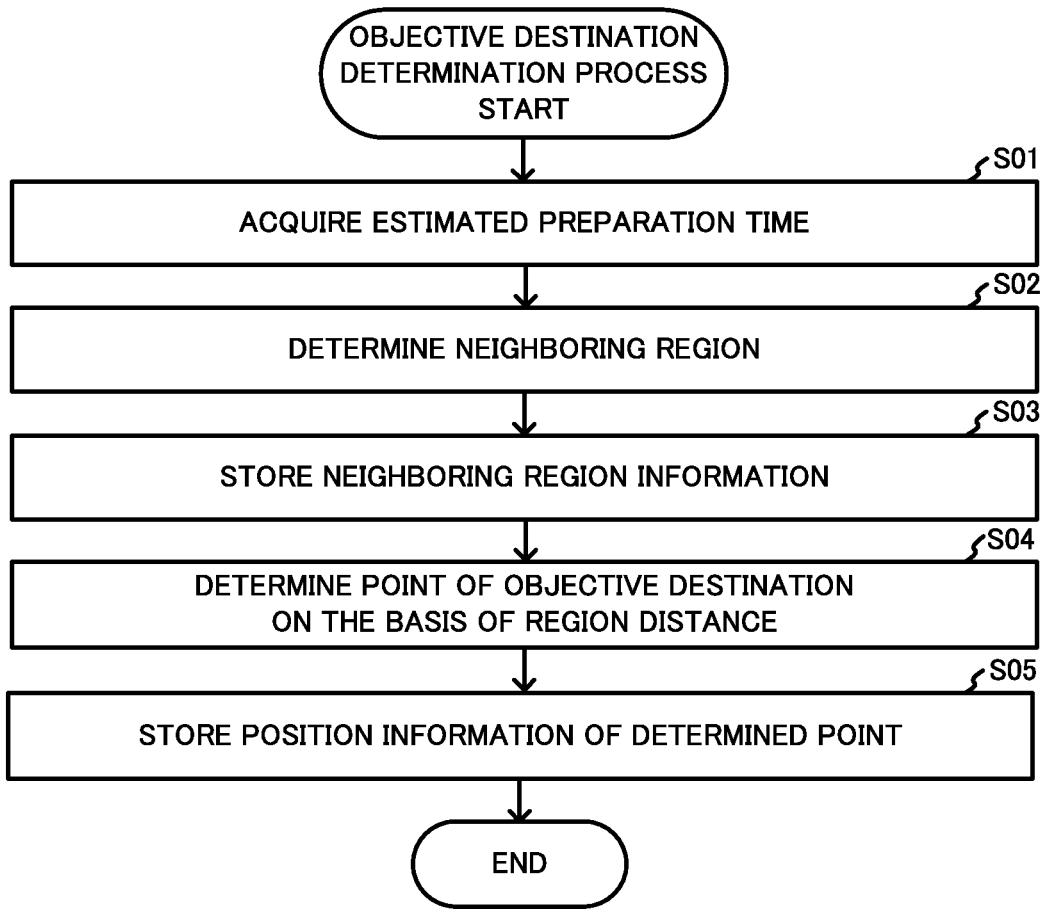
FIG. 4 is a flowchart illustrating an example of an objective destination determination process performed by the control device.
Figure 5:
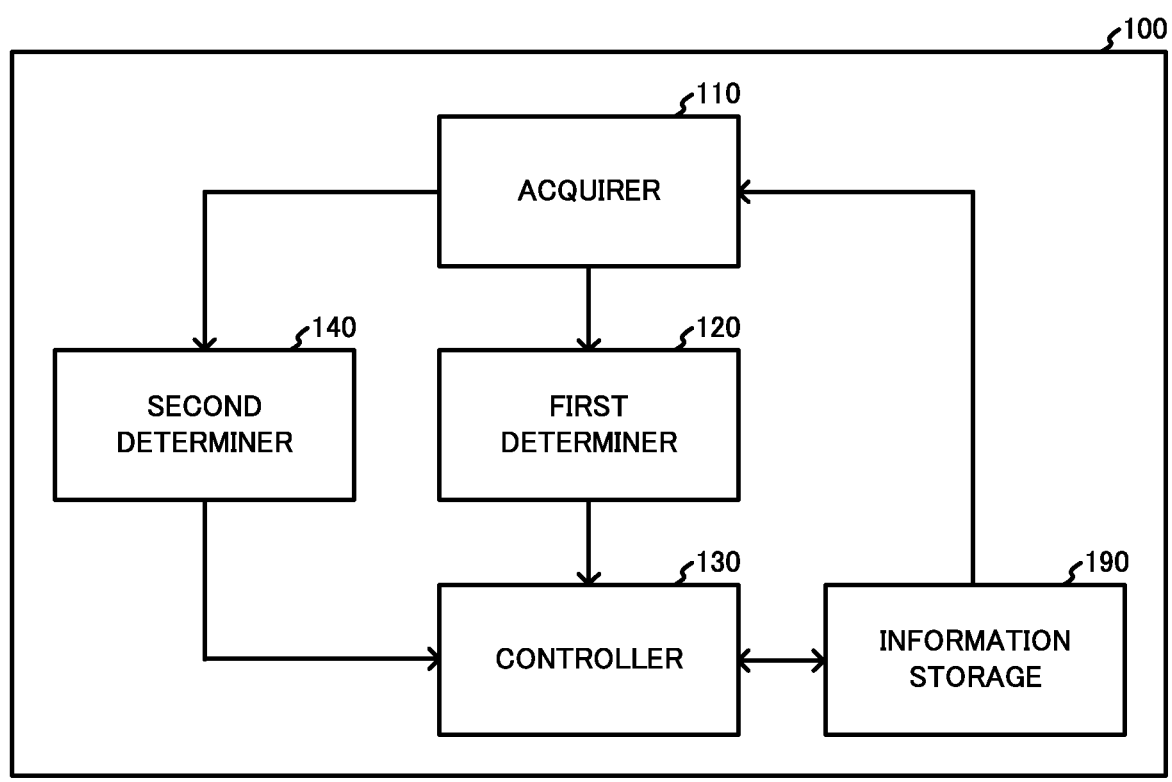
FIG. 5 is a functional block diagram illustrating an example of a function of the control device.

When the control device 100 is started, the CPU 101 of the control device 100 determines a point PD of an objective destination as illustrated in FIG. 2 by performing an objective destination determination process as illustrated in FIG. 4. With this, the CPU 101 of the control device 100 serves as an acquirer 110 as illustrated in FIG. 5 that acquires estimated preparation time information representing an estimated preparation time for each of the two shipping locations R1 and R2 that can be specified in the order of a product. On the assumption that a shipping request for a product estimated to be ordered (hereinafter, referred to as an estimated product) has been received, the estimated preparation time is the preparation time required from when the shipping request is accepted until when preparation of the estimated product is completed and shipment of the estimated product becomes possible.

In the present embodiment, the fact that shipment of the product becomes possible means that the state of the product changes to a state in which receiving of the product by the delivery vehicle 600 is possible. Furthermore, in the present embodiment, the state in which receiving of the product by the delivery vehicle 600 is possible includes a state in which the delivery of the product by the delivery vehicle 600 is startable.

In the present embodiment, the product is a food and drink. Therefore, the state of the product of which delivery is startable includes a state of having been cooked if the product needs to be cooked by the start of delivery of the product. Furthermore, the state of the product of which delivery is startable includes a state of having been packaged if the product needs to be packaged by the start of delivery of the product. Whether or not the product needs to be cooked or needs to be packaged is explicitly or implicitly agreed between an orderer and the employee of the store ST1 or ST2 at the time of accepting the order for the product, or is predetermined by business practice. Furthermore, the state of the product of which delivery is startable includes a state in which the product is located at the shipping location R1 or R2 of the store ST1 or ST2 specified in the order of the product.

Therefore, when a product does not need to be cooked and packaged, preparations for making shipment of the product possible include, for example, searching for the product from the shelves of a warehouse and transporting the searched product to the shipping location R1 or R2 of the product. Therefore, the preparation time includes the search time required for finding the product and the transportation time required for transporting the found product to the shipping location R1 or R2.

Furthermore, when a product does not need to be cooked but needs to be packaged, the preparation of the product includes finding the product, packaging the product, and transporting the product to the shipping location R1 or R2. Therefore, the preparation time of the product is the sum of the search time of the product, the packaging time required for packaging the found product, and the transportation time of the packaged product to the shipping location R1 or R2.

Moreover, when a product needs to be cooked and packaged, the preparation of the product includes cooking of the product, packaging of the cooked product, and transportation of the packaged product to the shipping location R1 or R2. Therefore, the preparation time of the product includes the sum of the cooking time required for cooking the product, the packaging time of the cooked product, and the transportation time of the packaged product to the shipping location R1 or R2.

The CPU 101 of the control device 100 serves as a first determiner 120 that determines the point PD of the objective destination of the delivery vehicle 600 on the basis of the estimated preparation time information acquired for each of the shipping locations R1 and R2. Furthermore, the CPU 101 serves as a controller 130 that performs a control for moving the delivery vehicle 600 toward the determined point PD.

The hard disk 103b of the control device 100 serves as an information storage 190 that stores information used for performing the objective destination determination process. The information storage 190 stores in advance an estimated preparation time table as illustrated in FIG. 6, in which estimated preparation time information is stored in advance.

A plurality of records is stored in advance in the estimated preparation time table. In each record of the estimated preparation time table, a store ID (IDentification) identifying the store ST1 or ST2 and the estimated preparation time information representing the estimated preparation time of the store ST1 or ST2 are stored in advance in correlation with each other.

In the present embodiment, an estimated product in the store ST1 is a product with the highest probability that an order is confirmed among a plurality of products that is sold in the store ST1. The probability that an order for a product sold in store ST1 is confirmed is a value obtained by dividing the number of previously confirmed orders specifying the shipping location R1 in the store ST1 and specifying the product by the number of previously confirmed orders specifying the shipping location R1 in the store ST1. Similarly, an estimated product in the store ST2 is a product with the highest probability that an order is confirmed among a plurality of products that is sold in the store ST2.

When the execution of the objective destination determination process of FIG. 4 is started, the acquirer 110 of the control device 100 acquires estimated preparation time information from the estimated preparation time table of FIG. 6 for each of the two shipping locations R1 and R2 (step S01). For this purpose, the first determiner 120 determines numbers of the shipping locations R1 and R2 according to a predetermined rule or a software random number. In the present embodiment, the following description is given by taking, as an example, a case where the number of the shipping location R1 is determined to be No. 1 and the number of the shipping location R2 is determined to be No. 2.

Next, the acquirer 110 of the control device 100 acquires, from the estimated preparation time table, estimated preparation time information (hereinafter, referred to as first estimated preparation time information) correlated with the store ID of the store ST1 including the first shipping location R1. Similarly, the acquirer 110 acquires, from the estimated preparation time table, estimated preparation time information (hereinafter, referred to as second estimated preparation time information) correlated with the store ID of the store ST2 including the second shipping location R2.

Next, the acquirer 110 of the control device 100 acquires position information stored in advance in the information storage 190 with respect to the store ID of the store ST1 including the first shipping location R1, thereby acquiring position information representing the position of the shipping location R1 using latitude, longitude, and altitude. Next, for the case of k=1 and the case of k=2, the first determiner 120 determines a neighboring region (hereinafter, referred to as a k-th neighboring region) where the time required for the delivery vehicle 600 to move to an k-th shipping location is equal to or less than an estimated preparation time represented by k-th estimated preparation time information.

In the present embodiment, the delivery vehicle 600 moves at a preset setting speed. The acquirer 110 of the control device 100 acquires information representing the setting speed of the delivery vehicle 600 stored in advance in the information storage 190. Thereafter, the first determiner 120 multiplies the setting speed of the delivery vehicle 600 represented by the acquired information by an estimated preparation time represented by the first estimated preparation time information, thereby calculating a distance D1 in which the delivery vehicle 600 moves in the estimated preparation time.

Next, the first determiner 120 of the control device 100 determines a boundary B1 as illustrated in FIG. 2, which is separated by the calculated distance D1 from the position of the shipping location R1 represented by the acquired position information. Thereafter, the first determiner 120 determines the determined boundary B1 and a region on the shipping location R1 side from the boundary B1 as a first neighboring region N1.

Thereafter, similarly, the first determiner 120 of the control device 100 determines a neighboring region (hereinafter, referred to as a second neighboring region) N2 where the time required for the delivery vehicle 600 to move to the second shipping location R2 is equal to or less than an estimated preparation time represented by the second estimated preparation time information (step S02).

For this purpose, the first determiner 120 of the control device 100 calculates a distance D2 in which the delivery vehicle 600 moves in the estimated preparation time represented by the second estimated preparation time information, and determines a boundary B2 separated from the position of the shipping location R2 by the calculated distance D2. Thereafter, the first determiner 120 determines the boundary B2 and a region on the shipping location R2 side from the boundary B2 as a second neighboring region N2.

In the present embodiment, since the distances D1 and D2 are Euclidean distances in a three-dimensional space, the neighboring regions N1 and N2 are spherical regions, and the boundaries B1 and B2 of the neighboring regions N1 and N2 are spherical surfaces, respectively.

The controller 130 of the control device 100 stores neighboring region information representing the first neighboring region N1 in the information storage 190 in correlation with the store ID of the store ST1 including the first shipping location R1. Similarly, the controller 130 stores neighboring region information representing the second neighboring region N2 in the information storage 190 in correlation with the store ID of the store ST2 including the second shipping location R2 (step S03). In the present embodiment, the neighboring region information representing the first neighboring region N1 is information representing an equation that defines the boundary B1 of the first neighboring region N1, and the neighboring region information representing the second neighboring region N2 is information representing an equation that defines the boundary B2 of the second neighboring region N2; however, the present disclosure is not limited thereto.

Thereafter, the first determiner 120 of the control device 100 determines the point PD so that region distances L1 and L2, which are distances from the point PD of the objective destination to the two boundaries B1 and B2, satisfy a predetermined condition (step S04). In the present embodiment, the region distances L1 and L2 are Euclidean distances in the three-dimensional space.

In the present embodiment, the predetermined condition is a condition that the sum of the region distance L1 from the point PD of the objective destination to the boundary B1 and the region distance L2 from the point PD to the boundary B2 is minimum. Therefore, the first determiner 120 determines the point PD of the objective destination, where the sum of the region distance L1 and the region distance L2 is minimized, by using, for example, a known algorithm including a least squares method.

Thereafter, the controller 130 of the control device 100 stores the position information representing, using latitude, longitude, and altitude, the position of the determined point PD of the objective destination in the information storage 190 (step S05), and then ends the execution of the objective destination determination process.

Figure 7:
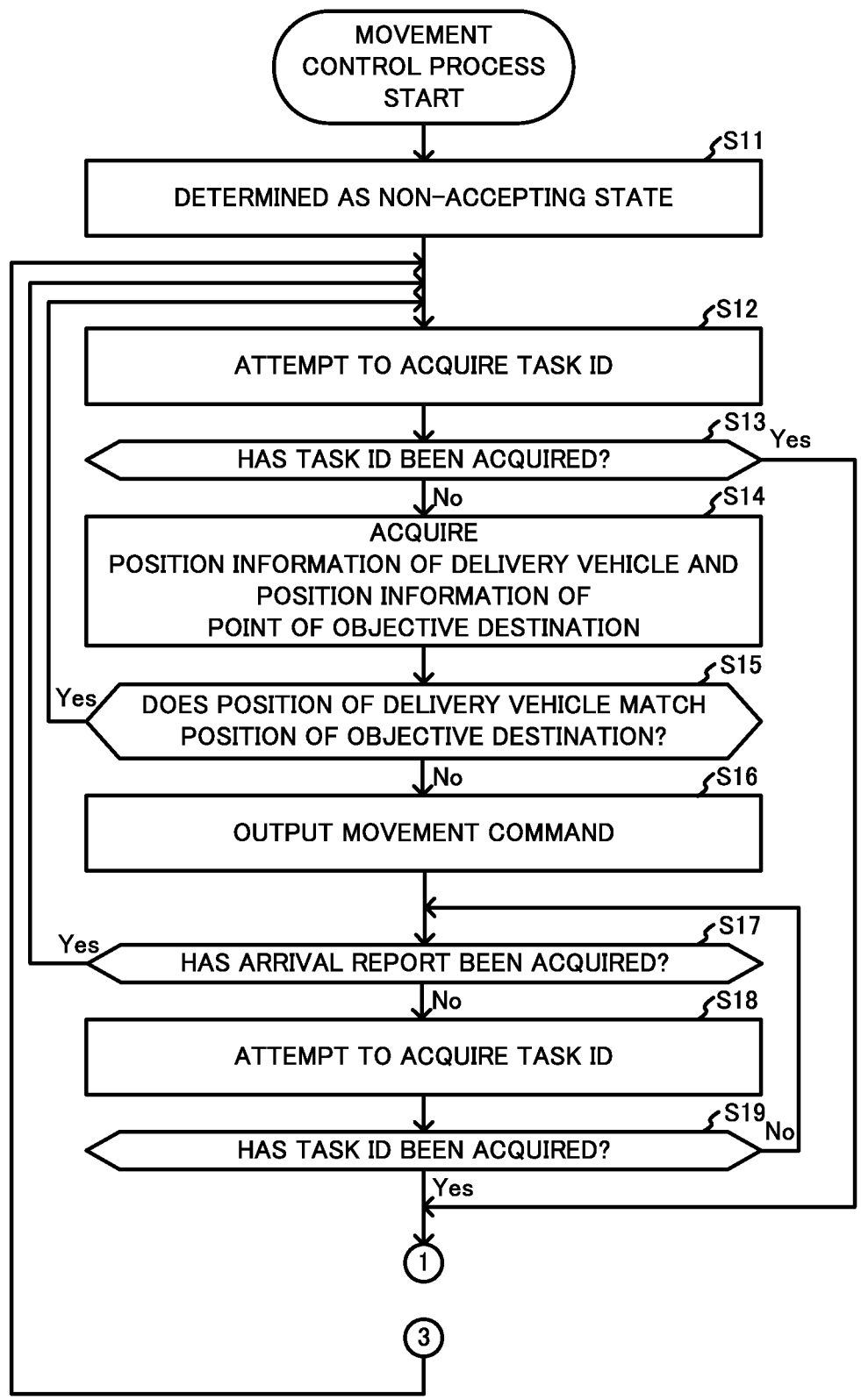
FIG. 7 is a front part of a flowchart showing an example of a movement control process performed by the control device.
Figure 8:
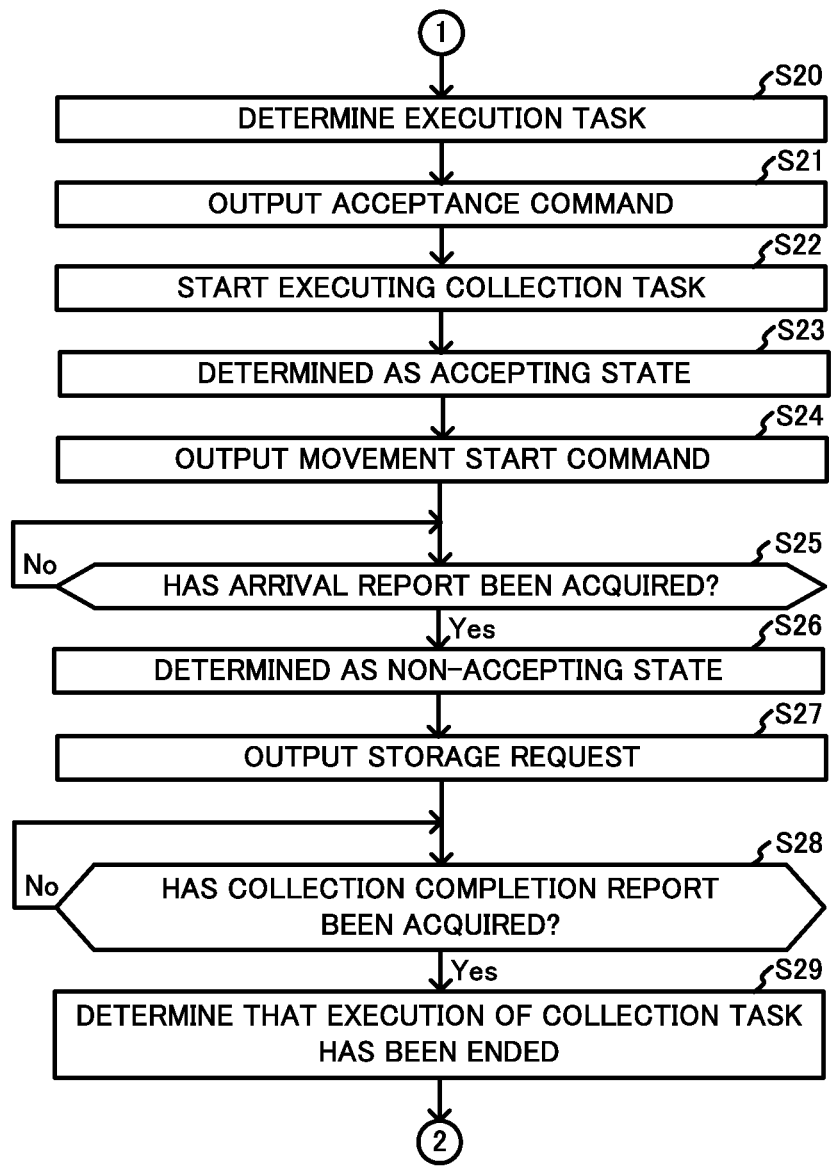
FIG. 8 is a central part of the flowchart showing the example of the movement control process performed by the control device.
Figure 9:
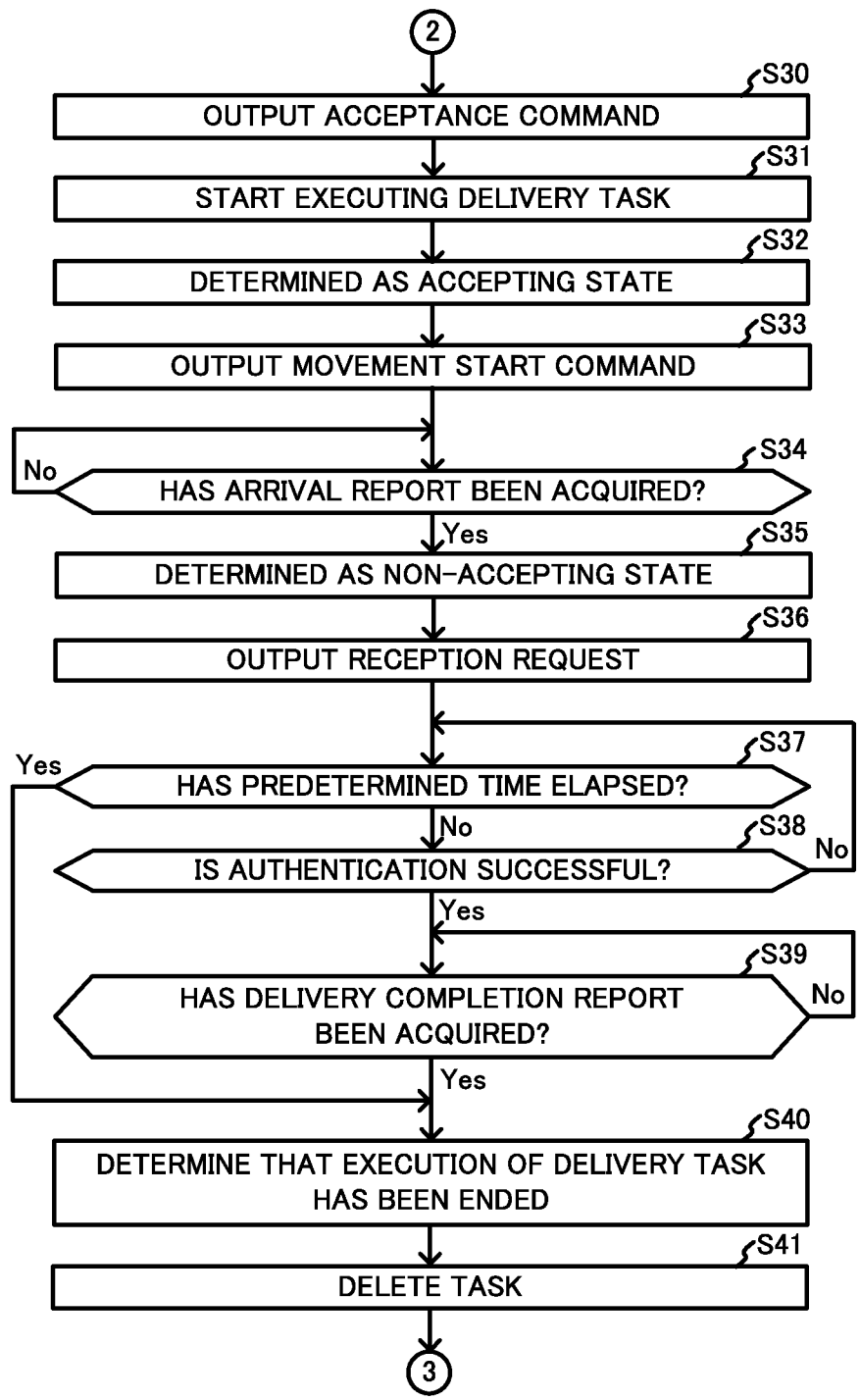
FIG. 9 is a rear part of the flowchart showing the example of the movement control process performed by the control device.

When the execution of the objective destination determination process is ended, the CPU 101 of the control device 100 performs a movement control process as illustrated in FIG. 7 to FIG. 9, in order to control the movement of the delivery vehicle 600. The information storage 190 stores in advance a task table as illustrated in FIG. 10, which is used for performing the movement control process. To the task table, records are to be added, in each of which a task ID identifying a collection delivery task for a product of which an order has been confirmed, a user ID of an orderer who placed the order, a product ID of the product, position information of the shipping location R1 or R2 specified in the order of the product, and position information of a delivery destination of the product are stored in correlation with one another. In the present embodiment, the confirmation of an order means that all of a shipping request, a collection request, and a delivery request included in the order are accepted.

The collection delivery task includes a collection task and a delivery task. The collection task for a product is a task of allowing the delivery vehicle 600 to collect the product at the shipping location R1 or R2 specified in the order of the product. Furthermore, the delivery task for a product is a task of allowing the delivery vehicle 600 to deliver the collected product to a delivery destination of the product. In the present embodiment, since the collection delivery task has not been generated at the start of execution of the movement control process, the following description is given on the assumption that no record is stored in the task table.

When the execution of the movement control process of FIG. 7 is started, the controller 130 of the control device 100 determines that the state of the delivery vehicle 600 is a state (hereinafter, referred to as a non-accepting state) different from a state (hereinafter, referred to as an accepting state) in order to execute the collection task or the delivery task, the accepting state being a state of accepting, by the delivery vehicle 600, the shipping location R1 or R2 or the delivery destination as a movement destination (step S11). The non-accepting state is a state of not accepting, by the delivery vehicle 600, the shipping locations R1 or R2 or the delivery destination as the movement destination. Thereafter, the controller 130 initializes the value of a state flag with a value indicating the non-accepting state, the value of the state flag being stored in advance in the information storage 190 and indicating whether or not the state of the delivery vehicle 600 is the accepting state or the non-accepting state.

Next, the acquirer 110 of the control device 100 attempts to acquire the task ID from the task table of FIG. 10 (step S12). Next, the acquirer 110 determines whether or not the task ID has been acquired (step S13). When it is determined that the task ID has not been acquired (step S13; No), the controller 130 determines that the collection delivery task does not exist, that is, the collection task and the delivery task do not exist.

Next, the acquirer 110 of the control device 100 outputs a transmission request for requesting transmission of the position information representing the position of the delivery vehicle 600 using the latitude, longitude, and altitude to the data communication circuit 104 with the delivery vehicle 600 as a destination. When the data communication circuit 104 of the control device 100 transmits the transmission request to the delivery vehicle 600 and then receives the position information from the delivery vehicle 600, the acquirer 110 acquires the position information of the delivery vehicle 600 from the data communication circuit 104. Furthermore, the acquirer 110 acquires the position information of the point PD of the objective destination stored in step S05 of FIG. 4 from the information storage 190 (step S14).

Thereafter, the controller 130 of the control device 100 determines whether or not the position of the delivery vehicle 600 represented by the acquired position information matches the position of the point PD of the objective destination represented by the position information (step S15). When it is determined that the position of the delivery vehicle 600 matches the position of the point PD of the objective destination (step S15; Yes), the controller 130 determines that the delivery vehicle 600 is located at the point PD of the objective destination. Therefore, the controller 130 repeats the above process from step S12 without performing the process of moving the delivery vehicle 600 toward the point PD.

However, when it is determined that the position of the delivery vehicle 600 is different from the position of the point PD of the objective destination (step S15; No), the controller 130 of the control device 100 determines that the delivery vehicle 600 is located at a point different from the point PD of the objective destination. Next, the controller 130 generates a movement command including the position information of the point PD of the objective destination and commanding the movement of the delivery vehicle 600 toward the point PD, and outputs the generated movement command to the data communication circuit 104 with the delivery vehicle 600 as a destination (step S16). With this, the controller 130 perform a control for moving the delivery vehicle 600 toward the point PD of the objective destination.

Next, the acquirer 110 of the control device 100 attempts to acquire an arrival report from the data communication circuit 104. The arrival report is a report received from the delivery vehicle 600 and is a report notifying that the delivery vehicle 600 is arrived at the point PD of the objective destination. When the acquirer 110 determines that the arrival report has been acquired (step S17; Yes), the acquirer 110 repeats the above process from step S12.

However, when it is determined that the arrival report has not been acquired (step S17; No), the acquirer 110 of the control device 100 attempts to acquire a task ID by performing the same process as that of step S12 (step S18). The acquisition of the task ID is attempted because the collection delivery task may be generated while the delivery vehicle 600 is heading for the point PD of the objective destination. When the acquirer 110 determines that the task ID has not been acquired (step S19; No), the acquirer 110 of the control device 100 repeats the above process from step S17.

Before describing a process to be performed after it is determined that the task ID has been acquired in step S13 or S19, the description of the movement control process is interrupted and the delivery vehicle 600 and the like are described.

Figure 11:
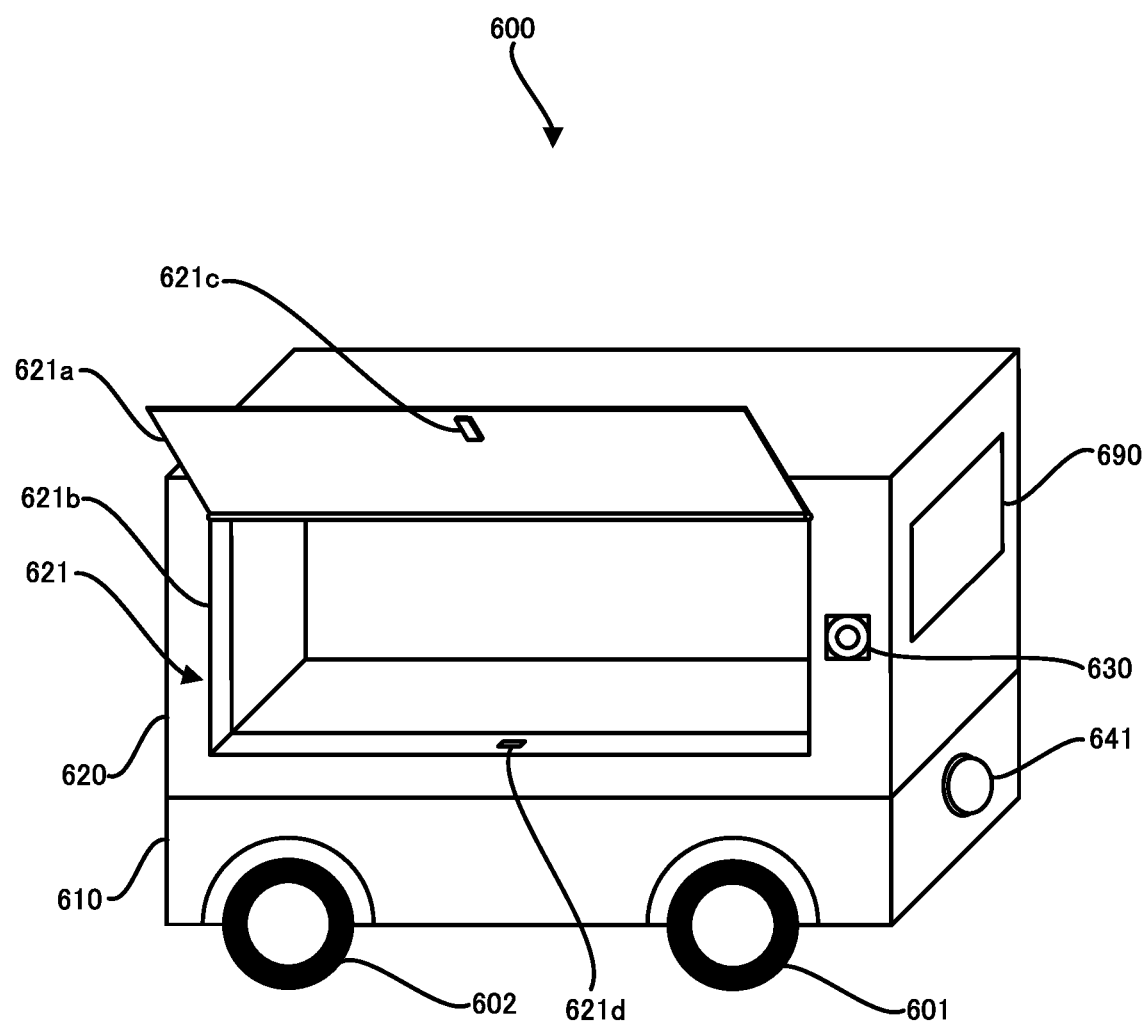
FIG. 11 is an external appearance configuration diagram illustrating an external appearance example of a delivery vehicle according to the embodiment.

The delivery vehicle 600 is an unmanned ground vehicle as illustrated in FIG. 11. The delivery vehicle 600 includes a chassis 610 having a plurality of wheels including wheels 601 and 602, a storage cabinet 620 installed on an upper surface of the chassis 610, and a control device 690 built in the storage cabinet 620.

The storage cabinet 620 of the delivery vehicle 600 includes one storage box 621 capable of storing products. The storage box 621 includes a box body that includes a not-illustrated bottom plate, top plate, and back plate, and two not-illustrated side plates, and that is closed by these plates to form a space where the front is open. A door frame 621*b* for receiving a door 621*a* is installed at the opening of the box body.

The door 621*a* is provided on the back surface thereof with a dead bolt 621*c* that is a bolt, and the door frame 621*b* is provided with a strike 621*d* that is a receiving seat for the dead bolt 621*c*. The door 621*a* further includes a not-illustrated motor that locks the door 621*a* by inserting the dead bolt 621*c* into the strike 621*d* according to a signal output from the control device 690. The motor unlocks the door 621*a* by pulling out the dead bolt 621*c* from the strike 621*d* according to a signal output from the control device 690.

The storage cabinet 620 of the delivery vehicle 600 includes an imaging device 630, which is a digital camera, for example, on the surface installed with the door 621*a*. An optical axis and a view angle of the imaging device 630 are adjusted so that a recipient who receives products stored in the storage box 621 is included in an imaging range. The imaging device 630 performs imaging at a predetermined cycle, and outputs a signal representing an image obtained by the imaging to the control device 690.

The delivery vehicle 600 further includes a light detection and ranging (LiDAR) sensor 641 installed on a front surface of the chassis 610 and a not-illustrated LiDAR sensor installed on a rear surface of the chassis 610.

When the front direction of the delivery vehicle 600 is used as a reference azimuth, the LiDAR sensor 641 on the front surface included in the delivery vehicle 600 emits laser light in a plurality of directions included in a range in which an azimuth angle formed with the reference azimuth is −90 degrees to +90 degrees and an elevation angle formed with the front direction of the delivery vehicle 600 is −90 degrees to +90 degrees. The LiDAR sensor 641 on the front surface receives reflected light of the emitted laser light, and measures distances to a plurality of reflection points, where the laser light is reflected, on the basis of the time from the emission of the laser light to the reception of the reflected light. Next, the LiDAR sensor 641 on the front surface calculates coordinate values of the plurality of reflection points in a three-dimensional coordinate system using a center point of the delivery vehicle 600 as the origin, on the basis of the emission direction of the laser light and the measured distances. Thereafter, the LiDAR sensor 641 on the front surface outputs the calculated coordinate values of the plurality of reflection points to the control device 690 of the delivery vehicle 600.

When the rear direction of the delivery vehicle 600 is used as a reference azimuth, the LiDAR sensor on the rear surface included in the delivery vehicle 600 emits infrared laser light in a plurality of directions included in a range in which an azimuth angle formed with the reference azimuth is −90 degrees to +90 degrees and an elevation angle formed with the rear direction of the delivery vehicle 600 is −90 degrees to +90 degrees. Furthermore, the LiDAR sensor on the rear surface calculates coordinate values of a plurality of reflection points of the emitted laser light in the three-dimensional coordinate system of the delivery vehicle 600, and outputs the calculated coordinate values of the plurality of reflection points to the control device 690 of the delivery vehicle 600.

The output of the coordinate values of the plurality of reflection points from the LiDAR sensor 641 on the front surface and the LiDAR sensor on the rear surface included in the delivery vehicle 600 to the control device 690 is for the control device 690 of the delivery vehicle 600 to specify coordinate values, sizes, and the like in the three-dimensional space of an object in all directions using the delivery vehicle 600 as a reference, in order to travel by avoiding the object such as an obstacle.

Figure 12:
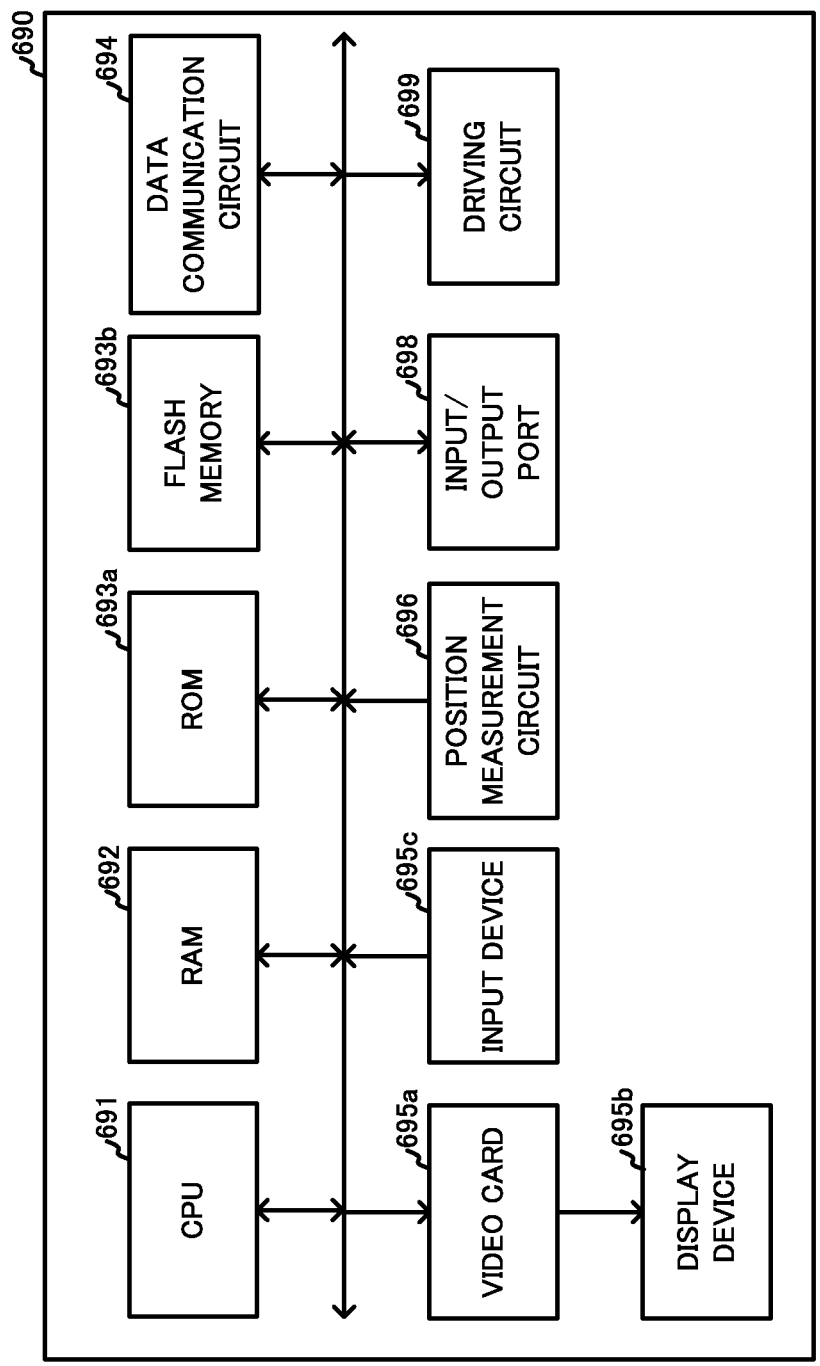
FIG. 12 is a hardware configuration diagram illustrating a configuration example of a control device included in the delivery vehicle.

The control device 690 of the delivery vehicle 600 includes a CPU 691, a RAM 692, a ROM 693a, a flash memory 693b, a data communication circuit 694, a video card 695a, a display device 695b, an input device 695c, a position measurement circuit 696, an input/output port 698, and a driving circuit 699, which are hardware as illustrated in FIG. 12. The delivery vehicle 600 may include a plurality of CPUs, or may include a plurality of RAMs and flash memories.

The configurations and functions of the CPU 691, the RAM 692, the ROM 693a, the data communication circuit 694, the video card 695a, the display device 695b, and the input device 695c of the delivery vehicle 600 are the same as those of the CPU 101, the RAM 102, the ROM 103a, the data communication circuit 104, the video card 105a, the display device 105b, and the input device 105c of the control device 100.

The flash memory 693b of the delivery vehicle 600 stores various programs, various data used for executing the programs, and a table in which the data are stored. The delivery vehicle 600 may include a hard disk instead of the flash memory 693b.

The position measurement circuit 696 of the delivery vehicle 600 is a quasi-zenith satellite system (QZSS) circuit. The position measurement circuit 696 receives signals output from quasi-zenith satellites, measures latitude, longitude, and altitude indicating the position of the delivery vehicle 600 on the basis of the received signals, and outputs a signal representing the measured latitude, longitude, and altitude. The position measurement circuit 696 may not be the QZSS circuit, but may be a global positioning system (GPS) circuit that receives GPS signals output from GPS satellites, and measures latitude, longitude, and altitude representing the position of the delivery vehicle 600 on the basis of the received GPS signals.

The input/output port 698 of the delivery vehicle 600 is connected to a not-illustrated cable connected to the imaging device 630, and inputs a signal output by the imaging device 630 to the CPU 691. Furthermore, the input/output port 698 is connected to not-illustrated cables connected to the LiDAR sensor 641 on the front surface and the LiDAR sensor on the rear surface, respectively. The input/output port 698 inputs, to the CPU 691, a signal representing the coordinate values output by each of the LiDAR sensor 641 on the front surface and the LiDAR sensor on the rear surface.

The driving circuit 699 of the delivery vehicle 600 is connected to not-illustrated cables respectively connected to not-illustrated motors for rotating the plurality of wheels. The driving circuit 699 rotates the plurality of wheels by driving the motors according to a control signal output by the CPU 691.

Furthermore, the driving circuit 699 of the delivery vehicle 600 is connected to not-illustrated cables respectively connected to the not-illustrated motor for pulling out the dead bolt 621c included in the door 621a from the strike 621d or inserting the dead bolt 621c into the strike 621d, and drives the motor according to a control signal output by the CPU 691.

When the data communication circuit 694 of the delivery vehicle 600 receives the transmission request output in step S14 of FIG. 7 from the control device 100, the CPU 691 of the delivery vehicle 600 specifies the latitude, longitude, and altitude of the delivery vehicle 600 on the basis of a signal output from the position measurement circuit 696. Next, the CPU 691 generates position information representing the position of the delivery vehicle 600 using the latitude, longitude, and altitude, and outputs the generated position information to the data communication circuit 694 with the control device 100 as a destination. Thereafter, the data communication circuit 694 of the delivery vehicle 600 transmits the position information of the delivery vehicle 600 to the control device 100.

Figure 13:
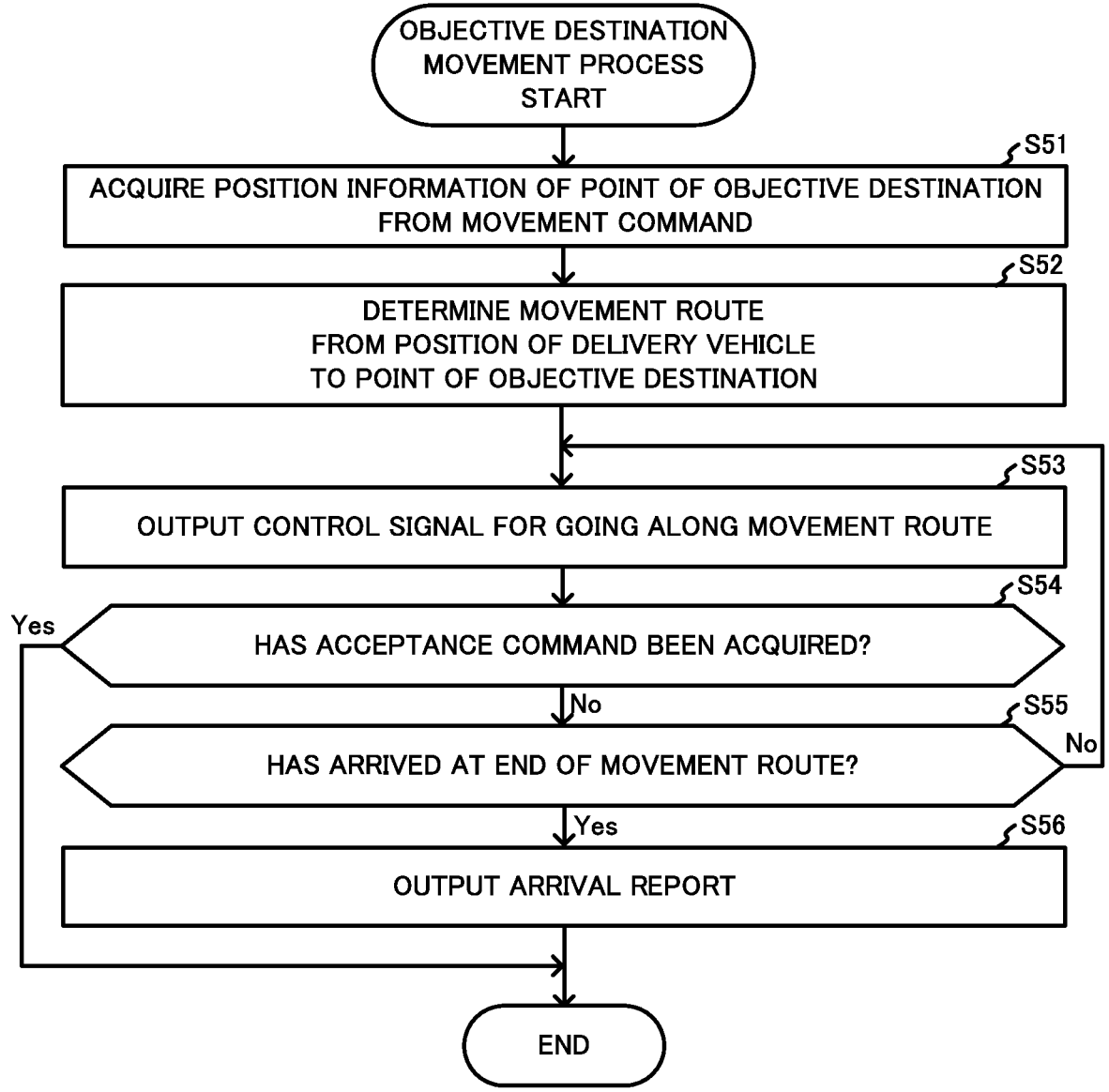
FIG. 13 is a flowchart illustrating an example of an objective destination movement process performed by the delivery vehicle.

When the data communication circuit 694 of the delivery vehicle 600 receives the movement command output in step S16 of FIG. 7, the CPU 691 of the delivery vehicle 600 performs an objective destination movement process as illustrated in FIG. 13 in order to move according to the movement command.

When the execution of the objective destination movement process is started, the CPU 691 of the delivery vehicle 600 acquires the movement command from the data communication circuit 694, and acquires the position information of the point PD of the objective destination from the acquired movement command (step S51). Next, the CPU 691 specifies the latitude, longitude, and altitude of the delivery vehicle 600 on the basis of a signal output from the position measurement circuit 696. Thereafter, the CPU 691 determines a movement route from the specified position of the delivery vehicle 600 to the point PD of the objective destination.

For this purpose, the CPU 691 of the delivery vehicle 600 reads a plurality of records from a partial route table stored in advance in the flash memory 693b. In each of the plurality of records in the partial route table, information relating to a partial route, such as, for example, a road and a sidewalk, along which the delivery vehicle 600 can move, is stored. The information relating to a partial route is information in which the latitude, longitude, and altitude of a start node of an edge, which is the partial route, the latitude, longitude, and altitude of an end node of the edge, and information indicating the distance of the edge are correlated with one another.

Next, the CPU 691 of the delivery vehicle 600 executes a known route search algorithm including, for example, a Dijkstra method, by using the distance of the edge, the latitude, longitude, and altitude of the start node and the end node of the edge, which are stored in the respective read records of the partial route table, the latitude, longitude, and altitude representing the position of the delivery vehicle 600, and the latitude, longitude, and altitude representing the point PD of the objective destination. With this, the CPU 691 searches for the shortest overall route from the position of the delivery vehicle 600 to the point PD of the objective destination by combining the partial routes, and determines the searched overall route as a movement route of the delivery vehicle 600 (step S52). Thereafter, the CPU 691 of the delivery vehicle 600 generates information representing a movement route including information representing, using latitude, longitude, and altitude, the positions of nodes included in the determined movement route, and information representing the passage sequence of the nodes.

Next, the CPU 691 of the delivery vehicle 600 acquires information representing the setting speed of the delivery vehicle 600 stored in advance in the flash memory 693b. Thereafter, the CPU 691 specifies the latitude, longitude, and altitude of the delivery vehicle 600 on the basis of a signal output from the position measurement circuit 696. Next, the CPU 691 generates a control signal for moving at the setting speed so as to reduce the difference between the specified latitude, longitude, and altitude and the latitude, longitude, and altitude of a node having the earliest passage order among a plurality of unpassed nodes included in the movement route, and outputs the generated control signal to the driving circuit 699 (step S53). With this, the delivery vehicle 600 moves at the setting speed toward the unpassed node having the earliest passing order.

Thereafter, the CPU 691 of the delivery vehicle 600 attempts to acquire an acceptance command from the data communication circuit 694. The acceptance command is a command received from the control device 100, and is a command that commands accepting the shipping location R1 or R2 or the delivery destination as a movement destination. In the present embodiment, when an order is confirmed during a period from when the reception of the movement command until when the arrival at the point PD of the objective destination, the acceptance command is transmitted from the control device 100 to the delivery vehicle 600 in order to allow the delivery vehicle 600 to accept the shipping location R1 or R2 specified in the confirmed order as a movement destination.

When the CPU 691 of the delivery vehicle 600 determines that the acceptance command has been acquired (step S54; Yes), the CPU 691 ends the execution of the objective destination movement process. With this, the delivery vehicle 600 stops movement toward the point PD of the objective destination. Thereafter, the delivery vehicle 600 moves to the shipping location R1 or R2, which is a movement destination, or the delivery destination under the control of the control device 100.

However, when it is determined that the acceptance command has not been acquired (step S54; No), the CPU 691 of the delivery vehicle 600 determines whether or not the delivery vehicle 600 has arrived at the point PD of the objective destination, which is the end point of the movement route, on the basis of whether or not the delivery vehicle 600 has arrived at all of the plurality of nodes included in the movement route (step S55). When it is determined that the delivery vehicle 600 has not arrived at the end point of the movement route (step S55; No) because the delivery vehicle 600 has not arrived at all of the plurality of nodes, the CPU 691 repeats the above process from step S53.

However, when it is determined that the delivery vehicle 600 has arrived at the end point of the movement route (step S55; Yes) because the delivery vehicle 600 has arrived at all of the plurality of nodes, the CPU 691 outputs a control signal for parking or stopping the delivery vehicle 600 at the position of the end point to the driving circuit 699. Thereafter, the CPU 691 outputs an arrival report to the data communication circuit 694 with the control device 100 as a destination (step S56), and ends the execution of the objective destination movement process, the arrival report notifying that the delivery vehicle 600 is arrived at the point PD of the objective destination that is the end point of the movement route.

Figure 14:
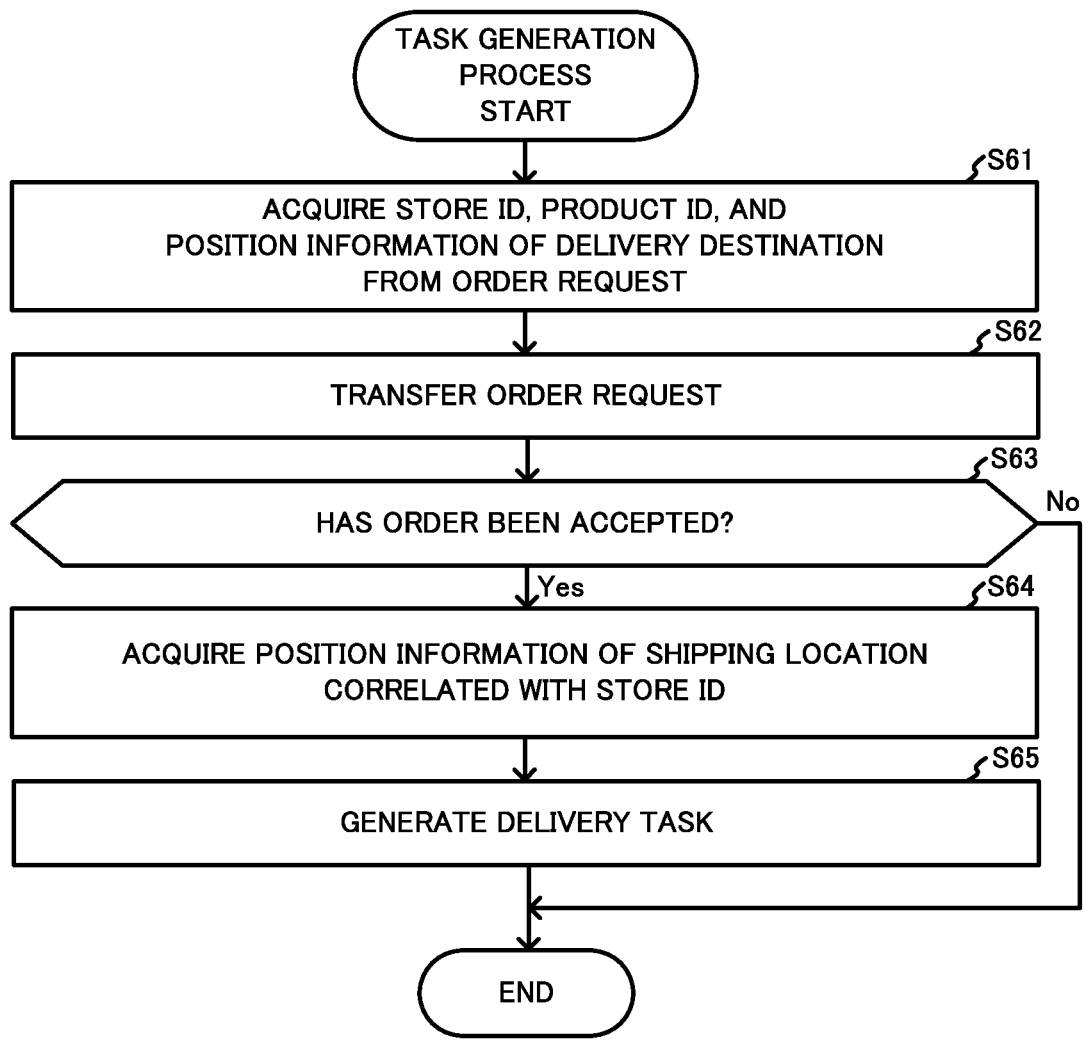
FIG. 14 is a flowchart illustrating an example of a task generation process performed by the control device.

When the data communication circuit 104 of the control device 100 receives an order request from the terminal device 800 of the orderer, the CPU 101 of the control device 100 performs a task generation process as illustrated in FIG. 14, in order to generate a collection task and a delivery task for an ordered product. The task generation process may be performed before the movement command is transmitted and then the delivery vehicle 600 arrives at the point PD of the objective destination according to the movement command, may be performed when the delivery vehicle 600 has arrived at the point PD of the objective destination, or may be performed after the delivery vehicle 600 arrives at the point PD of the objective destination.

In the present embodiment, the following description is given by taking, as a specific example, a case where the store ST1 and a not-illustrated product I1 sold in the store ST1 are specified in an order requested to be accepted by an order request. Furthermore, in the present embodiment, the following description is given on the assumption that specifying the store ST1 means that the shipping location R1 in the store ST1 is specified.

By performing the task generation process, the CPU 101 of the control device 100 further serves as a second determiner 140 as illustrated in FIG. 5 for determining whether or not a shipping request for the ordered product I1 has been accepted in the store ST1.

When the execution of the task generation process is started, the acquirer 110 of the control device 100 acquires the order request received from the terminal device 800 of the orderer from the data communication circuit 104. Next, the acquirer 110 acquires a user ID of the orderer, a store ID identifying the specified store ST1, a product ID identifying the specified product I1, and information representing the delivery destination of the product I1 by an address. Next, the acquirer 110 acquires information representing latitude, longitude, and altitude stored in advance in the information storage 190 in correlation with information representing the address of the delivery destination, thereby acquiring position information representing the position of the delivery destination using latitude, longitude, and altitude (step S61).

Next, the controller 130 of the control device 100 outputs the order request to the data communication circuit 104 with the terminal device 901 of the store ST1 identified by the acquired store ID as a destination. With this, the order request is transferred to the store ST1 (step S62).

When the data communication circuit 104 of the control device 100 does not receive an acceptance notification after when the order request is transferred and before when a predetermined time elapses from the transferring, the second determiner 140 determines that no order has been confirmed (step S63; No). In such a case, the reason why it is determined that no order has been confirmed is because the second determiner 140 determines that a shipping request has not been accepted among the shipping request, a collection request, and a delivery request included in the order requested to be accepted by the order request. Thereafter, the controller 130 outputs anon-acceptance notification notifying that the order has not been accepted to the data communication circuit 104 with the terminal device 800 of the orderer as a destination, and then ends the execution of the task generation process.

However, when the acceptance notification is received after when the order request is transferred and before when the predetermined time elapses from the transferring, the second determiner 140 of the control device 100 determines that the shipping request has been accepted. Next, the second determiner 140 determines that the collection request and the delivery request of the product to be shipped are accepted, and determines that the order has been confirmed (step S63; Yes).

Next, the acquirer 110 of the control device 100 acquires the position information of the shipping location R1 stored in advance in the information storage 190 in correlation with the store ID of the store ST1 acquired in step S61 (step S64). The store ID of the store ST1 and the position information of the shipping location R1 are correlated with each other because the entrance of the store ST1 is the shipping location R1.

Thereafter, the controller 130 of the control device 100 generates a task ID on the basis of a predetermined rule or a software random number, and the acquirer 110 acquires a system date and time from, for example, an operation system (OS) as a task generation date and time. Next, the controller 130 stores information indicating the task generation date and time, the generated task ID, the user ID and the product ID acquired in step S61, the acquired position information of the shipping location R1, and the acquired position information of the delivery destination in the task table of FIG. 10 in correlation with one another. In this way, the controller 130 generates a collection delivery task including a collection task of allowing the delivery vehicle 600 to collect the product I1 at the shipping location R1 specified by the orderer, and a delivery task of allowing the delivery vehicle 600 to deliver the collected product I1 to the delivery destination specified by the orderer (step S65). Thereafter, the controller 130 ends the execution of the task generation process.

Next, the interrupted movement control process is described again. When it is determined in step S13 or S19 of FIG. 7 that the acquirer 110 of the control device 100 has acquired the task ID of the task generated in step S65 of FIG. 14 (step S13; Yes or step S19; Yes), it is determined that the collection delivery task exists, that is, at least one of the collection task and the delivery task exists. Thereafter, the first determiner 120 determines the task ID of a task to be executed (hereinafter, referred to as an execution task) within the acquired task ID. At this time, the first determiner 120 may determine, as the task ID of the execution task, a task ID having the earliest date and time represented by the information correlated with the task ID in the task table of FIG. 10. Next, the first determiner 120 determines the collection delivery task identified by the determined task ID as an execution task (step S20 in FIG. 8).

In the present embodiment, the following description is given by taking, as an example, a case where the execution task is the collection delivery task including the collection task of allowing the delivery vehicle 600 to collect the product I1 at the shipping location R1 specified by the orderer and the delivery task of allowing the delivery vehicle 600 to deliver the collected product I1 to the delivery destination specified by the orderer.

Therefore, the acquirer 110 of the control device 100 acquires the position information of the shipping location R1 correlated with the task ID of the execution task from the task table of FIG. 10. Next, the controller 130 generates an acceptance command that includes the acquired position information of the shipping location R1 and that commands accepting the shipping location R1 as a movement destination, and outputs the generated acceptance command to the data communication circuit 104 with the delivery vehicle 600 as a destination (step S21). In this way, the controller 130 allows the delivery vehicle 600 to accept the shipping location R1 as a movement destination, and starts executing the collection task of allowing the delivery vehicle 600 to collect the product I1 at the shipping location R1 (step S22).

Thereafter, the controller 130 the control device 100 determines that the state of the delivery vehicle 600 has been changed from the non-accepting state to the accepting state of accepting the shipping location R1 as the movement destination (step S23), and changes the value of the state flag stored in the information storage 190 to a value indicating the accepting state. Next, the controller 130 outputs a movement start command commanding the start of movement to the accepted movement destination to the data communication circuit 104 with the delivery vehicle 600 as a destination (step S24).

Thereafter, the acquirer 110 of the control device 100 attempts to acquire an arrival report from the data communication circuit 104, and determines whether or not the arrival report has been acquired (step S25). When it is determined that the arrival report has not been acquired (step S25; No), the acquirer 110 repeats the process of step S25.

However, when it is determined that the arrival report has been acquired (step S25; Yes), the acquirer 110 of the control device 100 determines that the state of the delivery vehicle 600 has been changed from the state of accepting the shipping location R1 as the movement destination to the non-accepting state since the delivery vehicle 600 has arrived at the shipping location R1 (step S26). Next, the controller 130 changes the value of the state flag of the information storage 190 to a value indicating the non-accepting state.

Thereafter, the acquirer 110 of the control device 100 acquires, from the task table of FIG. 10, the product ID and the position information of the shipping location R1 correlated with the task ID of the execution task, and acquires the store ID of the store ST1 stored in advance in the information storage 190 in correlation with the position information of the shipping location R1. Next, the controller 130 generates a storage request including the acquired product ID and for requesting storage of the prepared product I1 identified by the product ID in the delivery vehicle 600. Thereafter, the controller 130 outputs the generated storage request to the data communication circuit 104 with the terminal device 901 of the store S1 identified by the acquired store ID and including the shipping location R1 as a destination (step S27).

Thereafter, the acquirer 110 of the control device 100 attempts to acquire a collection completion report from the data communication circuit 104, and determines whether or not the collection completion report has been acquired (step S28). The collection completion report is a report received from the delivery vehicle 600, and is a report notifying that the collection of the product I1 at the shipping location R1 by the delivery vehicle 600 is completed. When it is determined that the collection completion report has not been acquired (step S28; No), the acquirer 110 repeats the process of step S28.

However, when it is determined that the collection completion report has been acquired (step S28; Yes), the acquirer 110 of the control device 100 determines that the execution of the collection task has been ended (step S29). Next, in the task table of FIG. 10, the controller 130 deletes the executed collection task by changing the position information of the shipping location R1 correlated with the task ID of the execution task to a character string "NULL".

Thereafter, the acquirer 110 of the control device 100 acquires the position information of the delivery destination correlated with the task ID of the execution task from the task table. Thereafter, the controller 130 generates an acceptance command that includes the acquired position information of the delivery destination and that commands accepting the delivery destination as a movement destination. Next, the controller 130 outputs the generated acceptance command to the data communication circuit 104 with the delivery vehicle 600 as a destination (step S30 in FIG. 9). In this way, the controller 130 starts executing the delivery task of allowing the delivery vehicle 600 to deliver the collected product I1 to the delivery destination by allowing the delivery vehicle 600 to accept the delivery destination as a movement destination (step S31).

Thereafter, the controller 130 of the control device 100 determines that the state of the delivery vehicle 600 has been changed from the non-accepting state to the accepting state of accepting the delivery destination as the movement destination (step S32), and changes the value of the state flag stored in the information storage 190 to a value indicating the accepting state. Next, the controller 130 outputs a movement start command to the data communication circuit 104 with the delivery vehicle 600 as a destination, the movement start command being a command commanding the start of movement to the accepted movement destination (step S33).

Thereafter, the acquirer 110 of the control device 100 attempts to acquire an arrival report, and when the acquirer 110 determines that the arrival report has not been acquired (step S34; No), the acquirer 110 repeats the process of step S34. However, when it is determined that the arrival report has been acquired (step S34; Yes), the acquirer 110 determines that the state of the delivery vehicle 600 has been changed from the state of accepting the delivery destination as the movement destination to the non-accepting state since the delivery vehicle 600 has arrived at the delivery destination (step S35). Next, the controller 130 changes the value of the state flag of the information storage 190 to a value indicating the non-accepting state.

Thereafter, the acquirer 110 of the control device 100 acquires the user ID and the product ID correlated with the task ID of the execution task from the task table of FIG. 10, and acquires information representing the name of the product I1 stored in advance in the information storage 190 in correlation with the acquired product ID. Next, the first determiner 120 determines a password used for authenticating a recipient, who receives the product I1, on the basis of a predetermined rule or a software random number. Thereafter, the controller 130 generates a reception request for receiving the product I1 from the delivery vehicle 600 by inputting the password into the delivery vehicle 600, the reception request including information representing the determined password and information representing the acquired name of the product I1. Next, the controller 130 outputs the generated reception request to the data communication circuit 104 with the terminal device 800 of the orderer identified by the acquired user ID as a destination (step S36).

Next, the second determiner 140 of the control device 100 starts counting using a hardware timer or software timer, which is not illustrated, thereby measuring the elapsed time from the timing when the arrival report is acquired or from the timing when the reception request is output. Thereafter, the acquirer 110 acquires information representing the predetermined time from the information storage 190. Next, on the basis of whether or not the length of the counted time is equal to or greater than the length of the predetermined time, the controller 130 determines whether or not the predetermined time has elapsed from the start of the counting (step S37).

When the length of the counting time is shorter than the length of the predetermined time, the controller 130 of the control device 100 determines that the predetermined time has not elapsed (step S37; No). Next, the acquirer 110 attempts to acquire an authentication request from the data communication circuit 104. The authentication request is a request received from the delivery vehicle 600, and is a request including information representing the password input into the delivery vehicle 600 by the orderer of the product I1 and requesting for performing password authentication by using the password.

When the authentication request is not acquired, the acquirer 110 of the control device 100 determines that user authentication is not possible, and repeats the above process from step S37. However, when the authentication request is acquired, the acquirer 110 acquires the information representing the password from the authentication request. Next, on the basis of whether or not the password represented by the acquired information matches the password determined by the control device 100, the controller 130 determines whether or not the password authentication is successful (step S38). When the controller 130 determines that the password authentication is not successful and has failed because theses passwords do not match each other (step S38; No), the controller 130 outputs a lock maintenance command for maintaining the lock of the door 621a included in the delivery vehicle 600 to the data communication circuit 104 with the delivery vehicle 600 as a destination. Thereafter, the control device 100 repeats the above process from step S37.

However, when the controller 130 of the control device 100 determines that the password authentication is successful because the two passwords match each other (step S38; Yes), the controller 130 outputs an unlocking command that commands unlocking the door 621a included in the delivery vehicle 600 to the data communication circuit 104 with the delivery vehicle 600 as the destination. Next, the acquirer 110 of the control device 100 attempts to acquire a delivery completion report from the data communication circuit 104, and determines whether or not the delivery completion report has been acquired (step S39). The delivery completion report is a report received from the delivery vehicle 600, and is a report notifying that the delivery of the product is completed because handing over of the product I1 to the orderer is completed. When it is determined that the delivery completion report has not been acquired (step S39; No), the acquirer 110 repeats the process of step S39.

However, when it is determined that the delivery completion report has been acquired (step S39; Yes), the controller 130 determines that the execution of the delivery task of allowing the delivery vehicle 600 to deliver the product I1 to the delivery destination has been ended since the product I1 has been handed over to the orderer at the delivery destination (step S40).

On the other hand, in step S37, when the length of the counting time is equal to or greater than the length of the predetermined time, the controller 130 determines that the predetermined time has elapsed (step S37; Yes). Next, the controller 130 regards that the order for the product I1 has been canceled, and determines that the execution of the delivery task of allowing the delivery vehicle 600 to deliver the product I1 has been ended (step S40).

After the process of step S40 is performed, the controller 130 of the control device 100 deletes the executed delivery task by deleting a record storing the task ID of the execution task from the task table of FIG. 10 (step S41). Thereafter, the control device 100 repeats the above process from step S12 of FIG. 7.

When in step S12, the control device 100 attempts to acquire the task ID from the task table of FIG. 10 (step S12) and determines that the task ID has not been acquired (step S13; No), the control device 100 determines that no collection delivery task exists. Thereafter, the control device 100 repeats the processes of steps S14 to S16. With this, when the delivery vehicle 600 is located at a point different from the point PD of the objective destination, the control device 100 moves the delivery vehicle 600 in the non-accepting state toward the point PD, the non-accepting state being a state of not accepting the shipping locations R1 or R2 or the delivery destination as a movement destination. Thereafter, when it is determined that the arrival report notifying the delivery vehicle 600 is arrived at the point PD has been acquired (step S17; Yes), the control device 100 performs the processes of steps S12 and S13. However, when it is determined that the arrival report has not been acquired (step S17; No), the control device 100 performs processes similar to those of steps S12 and S13 (steps S18 and S19).

When it is determined in step S13 or S19 that the task ID has been acquired (step S13; Yes or step S19; Yes), the control device 100 determines that one or a plurality of collection delivery tasks exist. Thereafter, the control device 100 determines one execution task from the one or plurality of existing collection delivery tasks and executes the determined execution task by performing the processes of steps S20 to S41.

In this way, the control device 100 allows the delivery vehicle 600 to accept the shipping location R1 or R2 as a movement destination, and then moves the delivery vehicle 600, of which state has been changed to the accepting state, to the shipping location R1 or R2 that is the movement destination. Next, the control device 100 allows the delivery vehicle 600, of which state has been changed to the non-accepting state by arriving at the shipping location R1 or R2, to collect a product at the shipping location R1 or R2. Thereafter, the control device 100 allows the delivery vehicle 600 to accept the delivery destination as the movement destination, and then moves the delivery vehicle 600, of which state has been changed to the accepting state, to the delivery destination that is the movement destination. Next, the control device 100 allows the delivery vehicle 600, of which state has been changed to the non-accepting state by the delivery vehicle 600 arriving at the delivery destination, to hand over the product to the orderer at the delivery destination. Thereafter, the control device 100 repeats the above process from step S12.

Figure 15:
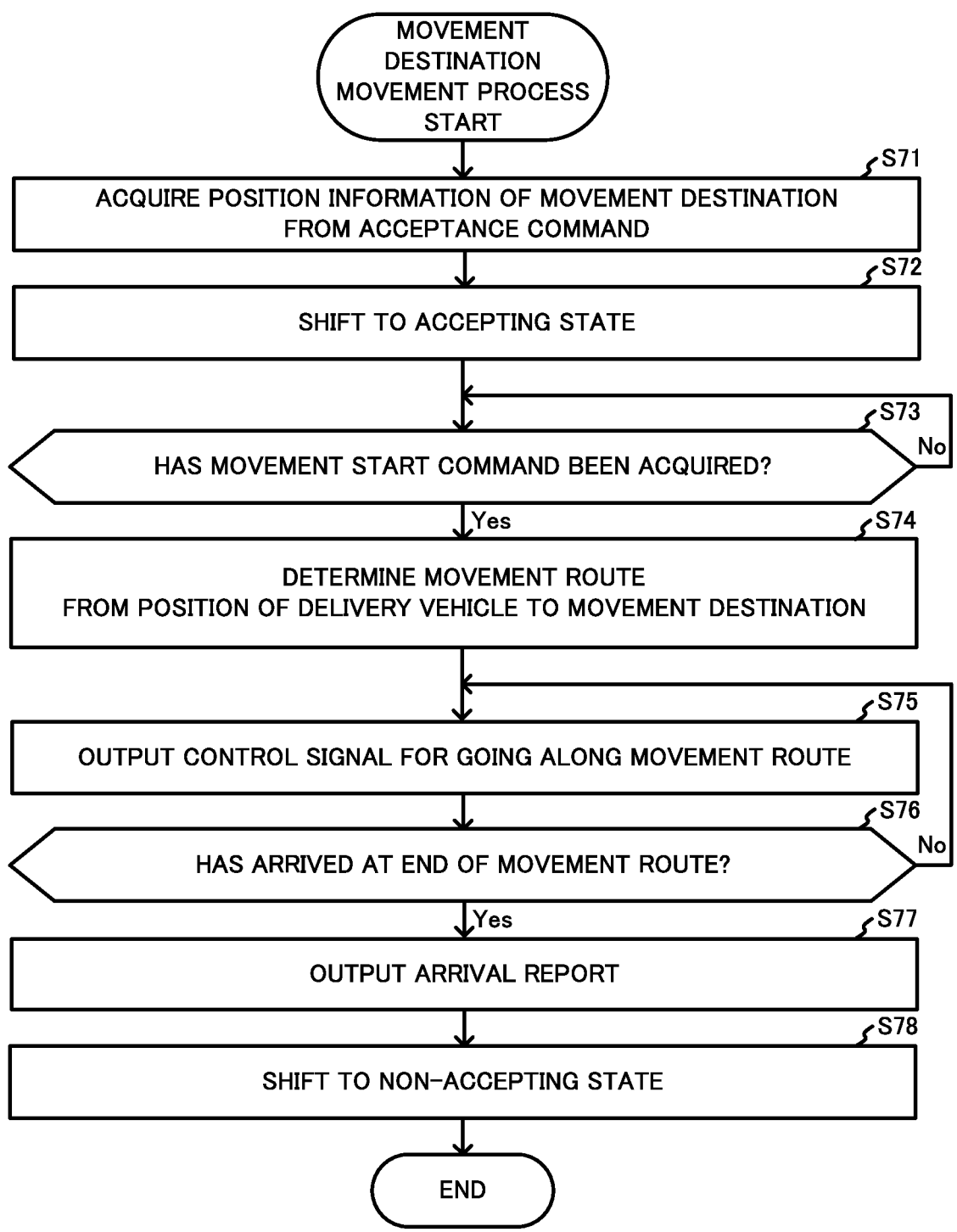
FIG. 15 is a flowchart illustrating an example of a movement destination movement process performed by the delivery vehicle.

When the data communication circuit 694 of the delivery vehicle 600 receives the acceptance command that is a command output in step S21 of FIG. 8 and commands accepting the shipping location R1 as a movement destination, the CPU 691 of the delivery vehicle 600 performs a movement destination movement process as illustrated in FIG. 15 in order to accept the movement destination according to the acceptance command and move to the movement destination.

When the execution of the movement destination movement process is started, the CPU 691 of the delivery vehicle 600 acquires the acceptance command from the data communication circuit 694, and acquires the position information of the shipping location R1 from the acquired acceptance command (step S71). Next, the CPU 691 accepts the shipping location R1 as a movement destination according to the acceptance command. Thereafter, the CPU 691 shifts the state of the delivery vehicle 600 to the accepting state by changing the value of the state flag stored in advance in the flash memory 693b to a value indicating the accepting state of accepting the movement destination (step S72). The state flag is a flag representing whether or not the state of the delivery vehicle 600 is an accepting state or a non-accepting state of not accepting the movement destination.

Thereafter, the CPU 691 of the delivery vehicle 600 attempts to acquire the movement start command from the data communication circuit 694, and determines whether or not the movement start command has been acquired (step S73). When it is determined that the movement start command has not been acquired (step S73; No), the CPU 691 repeats the process of step S73. However, when it is determined that the movement start command has been acquired (step S73; Yes), the CPU 691 performs the same processes as those of steps S52, S53, S55, and S56 of FIG. 13 (steps S74 to S77). With this, the delivery vehicle 600 moves along the movement route to the movement destination at the setting speed, and transmits an arrival report to the control device 100 when arriving at the movement destination.

Thereafter, the CPU 691 of the delivery vehicle 600 shifts the state of the delivery vehicle 600 to the non-accepting state by changing the value of the state flag from a value representing the accepting state to a value representing the non-accepting state (step S78). Thereafter, the CPU 691 ends the execution of the movement destination movement process.

Figure 16:
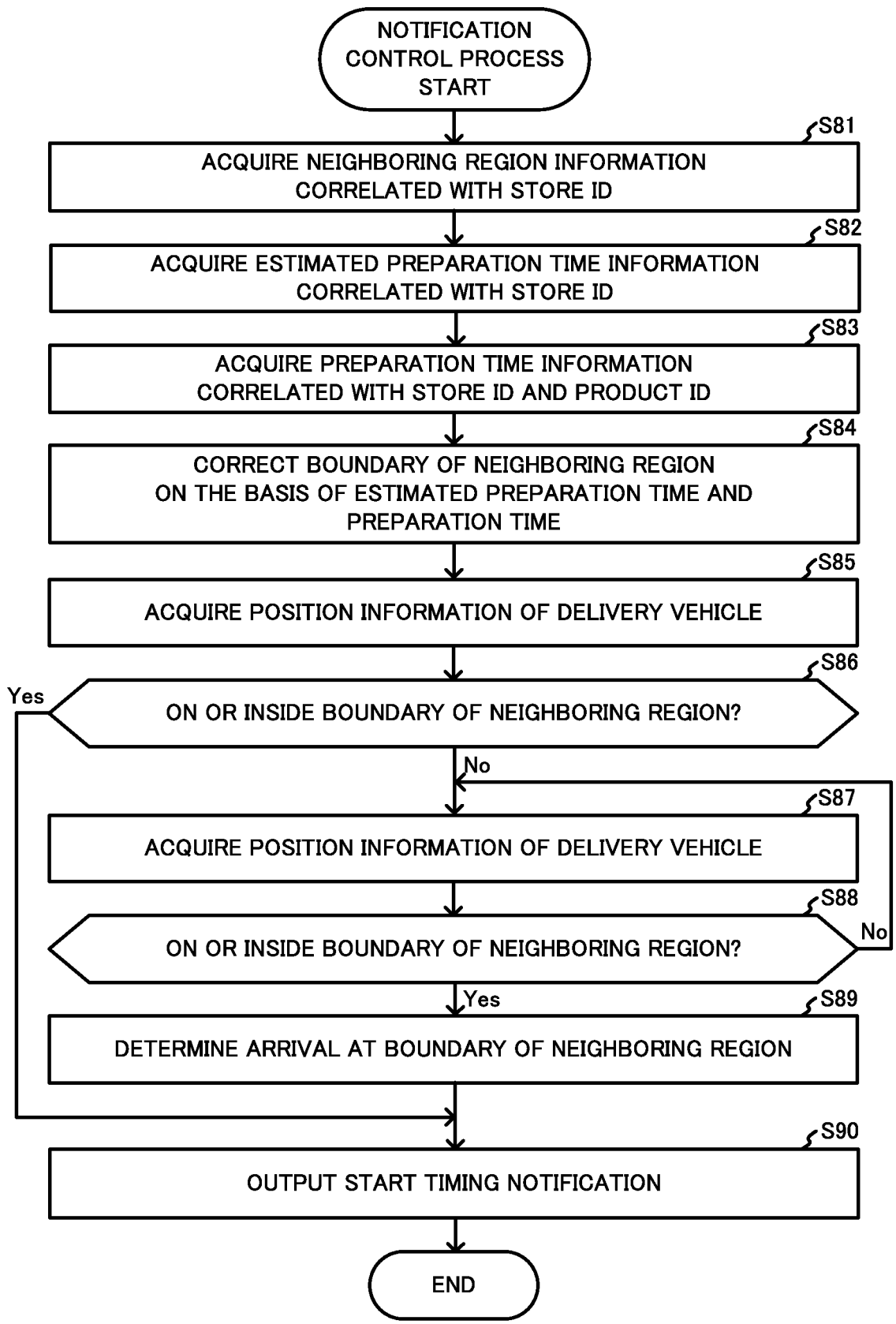
FIG. 16 is a flowchart illustrating an example of a notification control process performed by the control device.

After outputting the acceptance command that commands accepting the shipping location R1 of the product I1 as the movement destination in step S21 of FIG. 8, the CPU 101 of the control device 100 performs a notification control process as illustrated in FIG. 16 in parallel with the movement control process illustrated in FIG. 7 to FIG. 9, in order to transmit a notification that the start timing of preparation of the product I1 has arrived (hereinafter, referred to as a start timing notification).

The information storage 190 of the control device 100 stores in advance a preparation time table as illustrated in FIG. 17, which is used for the notification control process. A plurality of records is stored in advance in the preparation time table. In each record of the preparation time table, a store ID, a product ID identifying a product sold in the store ST1 or ST2 identified by the store ID, and information representing the name of the product are stored in correlation with one another. The product sold in the store ST1 or ST2 is a product that can be shipped at the shipping location R1 or R2 in the store ST1 or ST2.

Furthermore, in each record of the preparation time table, preparation time information representing a preparation time is stored in advance in correlation with the store ID and the product ID, the preparation time is time required from when a shipping request of a product identified by the product ID is accepted in the store ST1 or ST2 identified by the store ID until when preparation of the product is completed and then shipment of the product becomes possible at the shipping location R1 or R2 in the store ST1 or ST2.

In the present embodiment, the product includes steak, ramen, hamburger, tomato, and bread. Furthermore, in the present embodiment, the preparation for changing a state of the tomato and a state of the bread to a state in which shipment of the tomato and the bread is possible does not include cooking, but the preparation of the steak, the ramen, and the hamburger includes cooking. Therefore, preparation times for the tomato and the bread are preset to be shorter than those for the steak, the ramen, and the hamburger.

Furthermore, in the present embodiment, the property of the product includes the property that the state of the product changes over time. For example, the properties of the steak, the ramen, and the hamburger include the need for cooking to increase the temperature of the product to a temperature higher than a predetermined temperature (hereinafter, need for heating cooking), and the property that the temperature of a product increased higher than the predetermined temperature by cooking becomes lower than the predetermined temperature over time (hereinafter, the property of cooling).

On the other hand, for example, the properties of the tomato and the bread do not include the need for heating cooking and the property of cooling.

Moreover, in the present embodiment, the property of the ramen includes the property that noodles become too soft over time. The fact that noodles become too soft means that the state of noodles changes from a state in which noodles contain an amount of water per unit length less than a predetermined amount of water per unit length to a state in which noodles contain an amount of water per unit length greater than or equal to the predetermined amount of water per unit length. On the other hand, for example, the properties of the tomato, the bread, the hamburger, and the steak do not include the property that noodles become too soft.

The product and the property of the product are not limited thereto, and the product may be soup served cold or ice cream. Furthermore, the property of the product may include the need for cooking or storage to decrease the temperature of the product to a temperature lower than a predetermined temperature (hereinafter, need for cooling cooking or cooling storage), and the property that the temperature of a product decreased lower than the predetermined temperature, increases to a temperature higher than or equal to the predetermined temperature over time (hereinafter, the property of warming).

When the execution of the notification control process is started, the acquirer 110 of the control device 100 acquires the store ID of the store ST1 stored in advance in the information storage 190 in correlation with the position information of the shipping location R1 of which accepting as the movement destination is commanded in step S21 of FIG. 8. Next, the acquirer 110 acquires the neighboring region information that is the information stored in step S03 of FIG. 4 and stored in the information storage 190 in correlation with the store ID of the store ST1 (step S81). With this, the neighboring region N1 that is determined on the basis of the estimated preparation time in the store S1 including the shipping location R1 is specified by using the shipping location R1 accepted as the movement destination as a reference.

Next, the acquirer 110 of the control device 100 acquires the estimated preparation time information correlated with the store ID of the store ST1 from the estimated preparation time table of FIG. 6 (step S82). Thereafter, the acquirer 110 acquires the product ID correlated with the task ID of the execution task determined in step S20 of FIG. 8 from the task table of FIG. 10. Next, the acquirer 110 acquires the preparation time information correlated with the store ID of the store ST1 and the acquired product ID from the preparation time table of FIG. 17 (step S83). With this, the preparation time of the product I1 in the store ST1 is specified.

Thereafter, the first determiner 120 of the control device 100 corrects the boundary B1 of the neighboring region N1 determined on the basis of the estimated preparation time to a boundary B1' as illustrated in FIG. 2 on the basis of the preparation time of the product (hereinafter, also referred to as a shipping product) I1 requested to be shipped (step S84). With this, the first determiner 120 determines the boundary B1' of a neighboring region N1' as illustrated in FIG. 2, in which the time required for the delivery vehicle 600 to move to the shipping location R1 is equal to or less than the preparation time of the shipping product I1.

Therefore, the first determiner 120 of the control device 100 calculates the ratio of the preparation time represented by the preparation time information acquired in step S83 to the estimated preparation time represented by the estimated preparation time information acquired in step S82. In the present embodiment, since the delivery vehicle 600 moves at the preset setting speed, the ratio of a distance D1' in which the delivery vehicle 600 moves in the preparation time to the distance D1 in which the delivery vehicle 600 moves in the estimated preparation time is equal to that of the preparation time to the estimated preparation time.

Therefore, the first determiner 120 of the control device 100 determines the boundary B1' by reducing or expanding the boundary B1 by the calculated ratio centering on the shipping location R1. Furthermore, the first determiner 120 determines the determined boundary B1' and a region on the shipping location R1 side from the boundary B1' as the neighboring region N1' where the time required for the delivery vehicle 600 to move to the shipping location R1 is equal to or less than the preparation time of the shipping product I1.

Thereafter, the acquirer 110 of the control device 100 acquires the position information of the delivery vehicle 600 by performing the same process as that of step S14 of FIG. 7 (step S85). Thereafter, on the basis of the acquired position information of the delivery vehicle 600 and information representing the boundary B1' of the neighboring region N1', the second determiner 140 of the control device 100 determines whether or not the delivery vehicle 600 is located on the boundary B1' of the neighboring region N1' or inside the neighboring region N1' (step S86). The inside of the neighboring region N1' means a region on the shipping location R1 side from the boundary B1' of the neighboring region N1'.

When it is determined that the delivery vehicle 600 is not located either on the boundary B1 of the neighboring region N1' or inside the neighboring region N1' (step S86; No), the second determiner 140 of the control device 100 determines that the delivery vehicle 600 is located outside the neighboring region N1'. The outside of the neighboring region N1' means a region on an opposite side of the shipping location R1 from the boundary B1' of the neighboring region N1'.

Next, the control device 100 re-acquires the position information of the delivery vehicle 600 (step S87), and then determines whether or not the delivery vehicle 600 is located on or inside the boundary B1' of the neighboring region N1' on the basis of the re-acquired position information (step S88) by performing the same processes as those of steps S85 and S86. When it is determined that the delivery vehicle 600 is located outside the neighboring region N1' (step S88; No), the control device 100 repeats the above process from step S87.

However, when it is determined that the delivery vehicle 600 is located on or inside the boundary B1' of the neighboring region N1' (step S88; Yes), the second determiner 140 of the control device 100 determines that the delivery vehicle 600 has arrived at the boundary B1' (step S89).

When it is determined in step S86 that the delivery vehicle 600 is located on or inside the boundary B1' of the neighboring region N1' (step S86; Yes) or after the process of step S89 is performed, the controller 130 of the control device 100 outputs a start timing notification to the data communication circuit 104 with the terminal device 901 of the store ST1 as a destination (step S90). Next, after the data communication circuit 104 of the control device 100 transmits the start timing notification to the terminal device 901, the controller 130 of the control device 100 ends the execution of the notification control process.

The terminal device 800 carried by the orderer, the terminal device 901 of the store ST1, and the terminal device 902 of the store ST2 are, for example, smartphones or tablet-type or notebook-type personal computers. The terminal device 800 of the orderer transmits an order request for accepting an order to the control device 100 according to an operation of the orderer.

Upon receiving the order request transferred by the control device 100 in step S62 of FIG. 14, the terminal device 901 of the store ST1 displays the received order request. When an employee of the store ST1 visually recognizes the displayed order request, the employee determines whether or not to accept a shipping request of an order requested to be accepted by the order request. When the employee determines to accept the shipping request, the employee accepts the shipping request, and then performs an operation on the terminal device 901 to transmit an acceptance notification notifying that the shipping request has been accepted. The terminal device 901 transmits the acceptance notification to the control device 100 according to the operation.

Thereafter, upon receiving the start timing notification transmitted by the control device 100 in step S90 of FIG. 16, the terminal device 901 of the store ST1 outputs the start timing notification by display or by voice or sound. The employee of the store ST1 who has confirmed the start timing notification starts preparing the product I1.

However, when the employee determines not to accept the shipping request, the employee does not accept the shipping request, does not perform the operation on the terminal device 901 to transmit the acceptance notification, and does not prepare the product I1.

Thereafter, upon receiving the storage request transmitted by the control device 100 in step S27 of FIG. 8, the terminal device 901 outputs the received storage request by display or by voice or sound. Upon confirming the output storage request, the employee of the store ST1 stores the prepared product I1 in the storage box 621 of the delivery vehicle 600 arrived at the shipping location R1 in the store ST1. Thereafter, the employee performs an operation on the input device 695c of the delivery vehicle 600 to lock the door 621a of the storage box 621.

When the input device 695c of the delivery vehicle 600 outputs a signal corresponding to the operation, the CPU 691 of the delivery vehicle 600 outputs a control signal for locking the door 621a to the driving circuit 699, and then outputs a collection completion report notifying that the collection of the product I1 is completed to the data communication circuit 694 with the control device 100 as a destination.

When the data communication circuit 694 of the delivery vehicle 600 receives the acceptance command, which commands accepting the delivery destination as the movement destination and is output in step S30 of FIG. 9, from the control device 100, the CPU 691 of the delivery vehicle 600 performs the movement destination movement process illustrated in FIG. 15 on the basis of the received acceptance command. With this, the delivery vehicle 600 accepts the delivery destination as the movement destination according to the acceptance command, and shifts the state of the delivery vehicle 600 to the accepting state. Next, upon receiving the movement start command, the delivery vehicle 600 starts moving from the shipping location R1 to the delivery destination. Thereafter, when the delivery vehicle 600 arrives at the delivery destination, the delivery vehicle 600 transmits an arrival report notifying that the delivery vehicle 600 is arrived at the delivery destination to the control device 100, and then shifts the state of the delivery vehicle 600 to the non-accepting state.

Upon receiving the reception request, which is a request transmitted from the control device 100 having received the arrival report and is transmitted in step S36 of FIG. 9, the terminal device 800 of the orderer outputs the received reception request by display or by voice or sound. In the present embodiment, the delivery destination of the product I1 is an entrance of a condominium where the orderer resides. Upon confirming the reception request displayed on the terminal device 800, the orderer moves to the entrance and performs an operation for inputting the password included in the receipt request into the input device 695c of the delivery vehicle 600 arriving at the entrance. When the input device 695c of the delivery vehicle 600 outputs a signal corresponding to the operation, the CPU 691 of the delivery vehicle 600 performs a process of acquiring the input password on the basis of the signal. Next, the CPU 691 outputs an authentication request including the acquired password and for requesting password authentication to the data communication circuit 694 with the control device 100 as a destination.

When the data communication circuit 694 of the delivery vehicle 600 having transmitted the authentication request to the control device 100 receives a lock maintenance command from the control device 100, the CPU 691 of the delivery vehicle 600 determines that the password authentication has failed, and does not output a control signal for unlocking the door 621a to the driving circuit 699. Therefore, the door 621a is kept locked. Thereafter, the CPU 691 of the delivery vehicle 600 displays a message prompting re-input of a password on the display device 695b, and then repeats the above process from a process of acquiring an input password.

When the data communication circuit 694 of the delivery vehicle 600 receives an unlocking command from the control device 100, the CPU 691 of the delivery vehicle 600 determines that the password authentication is successful, and outputs a control signal for unlocking the door 621a to the driving circuit 699. Thereafter, the CPU 691 acquires a signal output from the imaging device 630, and determines on the basis of an image represented by the acquired signal whether or not the product I1 has been received from the unlocked storage box 621 at a predetermined cycle. For this purpose, the CPU 691 acquires information representing a template image of a product stored in advance in the flash memory 693b, and performs template matching on the basis of the template image represented by the acquired information and the image represented by the acquired signal and generated by the imaging device 630. Thereafter, when an image region corresponding to the template image is detected from the image generated by the imaging device 630, the CPU 691 determines that the product I1 has been received. Next, since handing over of the product I1 to the orderer is completed, the CPU 691 outputs a delivery completion report notifying that the delivery of the product is completed to the data communication circuit 694 with the control device 100 as a destination.

With such configurations, the control device 100 controls the delivery vehicle 600. Furthermore, the control device 100 includes the first determiner 120 that determines the point PD of the objective destination (i) by using each of the two shipping locations R1 and R2 as a reference and (ii) on the basis of an estimated preparation time from when a shipping request is accepted until when shipment of an estimated product becomes possible at each of the two shipping locations R1 and R2. Moreover, the control device 100 includes the controller 130 that allows the delivery vehicle 600 to accept the shipping location R1 or R2 of a product or a delivery destination of the product as a movement destination so as to set the state of the delivery vehicle 600 to a state of accepting the movement destination. When the state of the delivery vehicle 600 is the state of accepting the movement destination, the controller 130 moves the delivery vehicle 600 to the movement destination. Furthermore, when the state of the delivery vehicle 600 is the state of not accepting the movement destination, the controller 130 moves the delivery vehicle 600 toward the point PD. Furthermore, the product is a package. Therefore, the control device 100 can suppress the difference between the timing when the delivery vehicle 600 arrives at the shipping location R1 or R2 and the timing when preparation of the package is completed and shipment of the package becomes possible at the shipping location R1 or R2.

With such configurations, the control device 100 includes the data communication circuit 104 that transmits, to the terminal device 901 at the shipping location R1, the start timing notification notifying that the start timing of preparation has arrived when the delivery vehicle 600 arrives at the boundary B1' of the neighboring region N1' determined (i) by using, as a reference, the shipping location R1 accepted as the movement destination and (ii) on the basis of the preparation time at the shipping location R1. Therefore, the control device 100 can notify the shipping location R1 of the start timing of preparation in order to suppress the difference between the timing when the delivery vehicle 600 arrives at the shipping location R1 and the timing when preparation of the product is completed and shipment of the package becomes possible at the shipping location R1. Therefore, when the preparation of the product is started at the shipping location R1 at the timing when the start timing is notified, an increase of a preparation waiting time, which is time from when the delivery vehicle 600 arrives at the shipping location R1 until when shipment of the product becomes possible, can be suppressed, so that a decrease in utilization efficiency of the shipping location R1 can be suppressed.

In the present embodiment, the utilization efficiency of the shipping location R1 is calculated by dividing an area of a region that can be used by a person using the shipping location R1 by an area of the shipping location R1. Furthermore, the area of the region that can be used by a person using the shipping location R1 is, for example, an area excluding the area of a region where an object including the delivery vehicle 600 is placed from the area of the region of the shipping location R1, but is limited to thereto.

Since the shipping location R1 is the position of the entrance of the store ST1, the area of the region of the shipping location R1 includes the area of a region in the entrance of the store ST1. Moreover, the area of the region that can be used by a person using the shipping location R1 includes, for example, an area excluding the area of the region where an object including the delivery vehicle 600 is placed from the area of the region in the entrance of the store ST1. Therefore, the control device 100 can suppress an increase in time that the delivery vehicle 600 obstructs or may obstruct the passage of persons entering and exiting the store ST1 including customers or employees.

Furthermore, the control device 100 can suppress the difference between the timing when the delivery vehicle 600 arrives at the shipping location R1 or R2 and the timing when preparation of a product is completed and shipment of the product becomes possible at the shipping location R1 or R2. Therefore, the control device 100 can suppress an increase in an arrival waiting time from when shipment of the product becomes possible at the shipping location R1 or R2 until when the delivery vehicle 600 arrives at the shipping location R1 or R2.

Moreover, since the increase in the arrival waiting time can be suppressed, when an ordered product has the property that the state of the product changes over time, the control device 100 can suppress a state change before the start of delivery, the state change being a change of the state of the product to a state different from the state at the end of preparation. That is, for example, the control device 100 can suppress a state change before the start of delivery, the state change being a change of a product having the property that noodles become too soft over time from a state in which noodles have not become too soft to a state in which noodles have become too soft. Furthermore, for example, the control device 100 can suppress a temperature change before the start of delivery, the temperature change being a change of the temperature of a product having the need for heating cooking and the property of cooling over time from the temperature higher than the predetermined temperature to a temperature lower than or equal to the predetermined temperature.

Furthermore, with such configurations, an estimated preparation time at the shipping location R1 is the time until when shipment of an estimated product becomes possible, the estimated product being a product of which shipment is estimated to be requested. Furthermore, when a shipping request is actually accepted, the first determiner 120 of the control device 100 corrects the boundary B1 of the neighboring region N1 on the basis of the time from when the shipping request is accepted until when shipment of a shipping product becomes possible, the shipping product being a product of which shipment is requested by the shipping request. The data communication circuit 104 sends the start timing notification when the delivery vehicle 600 arrives at the corrected boundary B1'. Therefore, even though the estimated product is different from the shipping product, the control device 100 can notify the shipping location R1 of the start timing of preparation in order to suppress the difference between the timing when the delivery vehicle 600 arrives at the shipping location R1 and the timing when the preparation of the shipping product is completed at the shipping location R1.

With such configurations, the first determiner 120 of the control device 100 determines the point PD of the objective destination so that the region distances L1 and L2 to the boundaries B1 and B2 of the neighboring regions N1 and N2 satisfy a predetermined condition, the neighboring regions N1 and N2 determined (i) by using each of the two shipping locations R1 and R2 as a reference and (ii) on the basis of the preparation time at each of the two shipping locations R1 and R2.

Therefore, the control device 100 can determine the point PD of the objective destination at a position where an increase in the total arrival waiting time that occurs when an order is confirmed a plurality of times can be suppressed. In the present embodiment, since the predetermined condition is a condition that the sum of the region distance L1 and the region distance L2 is minimum, the control device 100 can determine the point PD of the objective destination at a position where the total arrival waiting time can be minimized.

With such configurations, the first determiner 120 of the control device 100 determines the point PD of the objective destination at a position where a timing difference can be suppressed, the timing difference being a difference between the timing when the delivery vehicle 600 arrives at the shipping location R1 or R2 and the timing when preparation of the product becomes possible at the shipping location R1 or R2. Furthermore, the controller 130 of the control device 100 performs a control for moving the delivery vehicle 600 to the determined point PD of the objective destination, and performs a control for moving the delivery vehicle 600 from the determined point PD of the objective destination or from a point on the way to the point PD of the objective destination to the shipping location R1 or R2. Moreover, the controller 130 further performs a control for moving the delivery vehicle 600 storing a product from the shipping location R1 or R2 to the delivery destination. Therefore, the control device 100 can suppress a decrease in the delivery efficiency of a package that is a product. In the present embodiment, the delivery efficiency of the package is calculated by dividing the total number of a package delivered by the delivery vehicle 600 by the total delivery time from when the delivery vehicle 600 departs from the point PD of the objective destination to when the delivery vehicle 600 returns to the point PD of the objective destination, but it is not limited thereto.

Modification 1 of Embodiment

In the embodiment, the case where the two shipping locations R1 and R2 exist has been described; however, the present disclosure is not limited thereto and K shipping locations (K is an integer of 3 or more) may exist.

That is, the acquirer 110 of the control device 100 may acquire estimated preparation time information for each of the K shipping locations (K is an integer of 3 or more), and the first determiner 120 may acquire the point PD of the objective destination on the basis of the estimated preparation time information acquired for each of the K shipping locations.

Moreover, the control device 100 may determine, for example, at predetermined intervals such as 30 minutes, whether or not each of the K shipping locations can be specified.

For this purpose, the acquirer 110 of the control device 100 according to the present modification outputs, at the predetermined interval, a business inquiry asking whether or not the store ST1 is open to the data communication circuit 104 with the terminal device 901 of the store ST1 as a destination, the store ST1 including the first shipping location R1.

An employee of the store ST1 according to the present modification performs an operation on the terminal device 901 of the store ST1 to change a value of a flag representing whether or not the store ST1 is open to a value "TRUE" representing that the store ST1 is open, at the timing when the store ST1 is opened. The terminal device 901 changes the value of the flag to the value "TRUE" according to the operation. Furthermore, the employee of the store ST1 performs an operation on the terminal device 901 to change the value of the flag to a value "FALSE" representing that the store ST1 is not open, at the timing when the store ST1 is closed. The terminal device 901 changes the value of the flag to the value "FALSE" according to the operation. Furthermore, upon receiving a business inquiry from the control device 100, the terminal device 901 returns an in-business notification notifying that the store ST1 is open when the value of the flag is "TRUE", and returns no in-business notification when the value of the flag is "FALSE".

When the data communication circuit 104 of the control device 100 according to the present modification receives the in-business notification after the business inquiry is transmitted and before a predetermined time elapses from the transmission, the second determiner 140 determines that the first shipping location R1 can be specified since the store ST1 is open. However, when the data communication circuit 104 receives no in-business notification before the predetermined time elapses and after the business inquiry is transmitted, the second determiner 140 determines that the first shipping location R1 is not specifiable since the store ST1 is not open. Similarly, the control device 100 determines whether or not the second shipping location R2 and third to K-th shipping locations can be specified.

Thereafter, the first determiner 120 of the control device 100 according to the present modification excludes a shipping location determined not to be specifiable from the K shipping locations, and determines the point PD of the objective destination on the basis of estimated preparation time information acquired for each of the plurality of non-excluded shipping locations.

With such configurations, even though one or more of the K shipping locations are not specifiable due to temporary closure, other than a regular holiday or outside business hours, the point PD of the objective destination can be determined at a position where a decrease in the delivery efficiency of the delivery vehicle 600 can be suppressed.

Modification 2 of Embodiment

In the embodiment, it has been described that the distance D1 as the basis for determining the neighboring region N1, the distance D2 as the basis for determining the neighboring region N2, the region distance L1 from the point PD of the objective destination to the boundary B1 of the neighboring region N1, and the region distance L2 from the point PD of the objective destination to the boundary B2 of the neighboring region N2 are Euclidean distances in the three-dimensional space. Furthermore, the neighboring regions N1 and N2 have been described to be spherical regions.

However, the present disclosure is not limited thereto, and the distances D1 and D2 and the region distances L1 and L2 may be Euclidean distances in a horizontal plane, the neighboring regions N1 and N2 may be circular regions, and the boundary B1 of the neighboring region N1 and the boundary B2 of the neighboring region N2 may be circles. Furthermore, the distances D1 and D2 and the region distances L1 and L2 may be Manhattan distances in the horizontal plane or Manhattan distance in the three-dimensional space. Moreover, the distances D1 and D2 and the region distances L1 and L2 may be the square of the Euclidean distance or the Manhattan distance.

Moreover, the distances D1 and D2 and the region distances L1 and L2 may be distances on a route on which the delivery vehicle 600 can move. In such a case, the first determiner 120 of the control device 100 may determine a plurality of routes to the shipping location R1 by performing the same process as that of step S52 of FIG. 13 performed by the delivery vehicle 600, in order to determine the boundary B1 of the neighboring region N1 separated from the shipping location R1 by the distance D1. Next, the first determiner 120 may determine a point where a distance on the route from the shipping location R1 is equal to the distance D1 with respect to each of the plurality of determined routes, and determine the boundary B1 having a polyhedral shape or a polygonal shape so that the boundary B1 includes the point determined for each of the plurality of routes. The first determiner 120 may determine the boundary B2 of the neighboring region N2 in the same manner.

Moreover, the first determiner 120 of the control device 100 may determine a plurality of routes from the point PD of the objective destination to the boundary B1 by performing the same process as that of step S52 of FIG. 13, calculate a distance on each of the plurality of determined routes, and set the calculated minimum distance as the region distance L1. The first determiner 120 may determine the region distance L2 in the same manner.

With such configurations, the first determiner 120 of the control device 100 calculates the distance D1 on the basis of an estimated preparation time, and determines the boundary B1 having a polyhedral shape or a polygonal shape on the basis of the calculated distance D1. Thereafter, when an order is confirmed, the first determiner 120 corrects the boundary B1 of the neighboring region N1 determined on the basis of the estimated preparation time to the boundary B1' on the basis of the preparation time of a shipping product targeted for the confirmed order. Therefore, since the control device 100 determines the boundary B1' by correcting the previously determined boundary B1, the amount of calculation required for determining the boundary B1' can be reduced as compared with the case of determining the boundary B1', which has a shape more complicated than a spherical shape or a circular shape, such as a polyhedral shape or a polygonal shape, without correcting the boundary B1. Furthermore, since the control device 100 determines the boundary B1' by correcting the previously determined boundary B1, the time required for determining the boundary B1' can be shortened as compared with the case of determining the boundary B1' without correcting the boundary B1.

Modification 3 of Embodiment

In the embodiment, it has been described the first determiner 120 of the control device 100 calculates the time required for the delivery vehicle 600 to move to the shipping location R1 on the basis of the setting speed of the delivery vehicle 600. However, the present disclosure is not limited thereto, and the first determiner 120 calculates the time required for the delivery vehicle 600 to move to the shipping location R1 on the basis of a movement route of the delivery vehicle 600 and traffic conditions on the movement route.

For this purpose, the first determiner 120 of the control device 100 determines a plurality of routes to the shipping location R1 by performing the same process as that of step S52 of FIG. 13 performed by the delivery vehicle 600. Next, the controller 130 generates a reply request that includes information representing a plurality of edges included in the plurality of determined routes and requests for a replay of information representing traffic conditions on each of the plurality of edges. Thereafter, the controller 130 outputs the generated reply request to the data communication circuit 104 with a not-illustrated traffic server as a destination.

In the present modification, the information representing the edge is information representing the latitude, longitude, and altitude of a start point node of the edge, and the latitude, longitude, and altitude of an end point node of the edge. Furthermore, the traffic condition of the edge includes a passing time required for passing the edge. The passing time of the edge is an average value of times required for one or more of a plurality of delivery vehicles and a plurality of automobiles to pass through the edge, the one or more of a plurality of delivery vehicles and a plurality of automobiles having passed through the edge per unit time, but may be a maximum value of the times or a minimum value of the times.

When the data communication circuit 104 of the control device 100 receives the information indicating the traffic conditions from the traffic server, the acquirer 110 acquires the information from the data communication circuit 104. Next, on the basis of the passing time of the edge represented by the acquired information, the first determiner 120 determines a point for each of the plurality of determined routes so that the time that is required for the delivery vehicle 600 to move from the point to the shipping location R1 equals to an estimated preparation time. Thereafter, the first determiner 120 determines the boundary B1 of the neighboring region N1 so that the boundary B1 includes the point determined for each of the plurality of routes.

Similarly, the control device 100 calculates the times required for the delivery vehicle 600 to move to the shipping location R2 on the basis of a movement route of the delivery vehicle 600 and traffic conditions on the movement routes, and determines the boundary B2 of the neighboring region N2 on the basis of the calculated times.

In the present modification, it has been described that the acquirer 110 of the control device 100 acquires the information representing the traffic conditions of the edges received from the not-illustrated traffic server; however, the present disclosure is not limited thereto. The information storage 190 may store a plurality of information representing the edges and a plurality of information representing the traffic conditions of the edges in advance in correlation with each other, and the acquirer 110 may acquire the information representing traffic conditions correlated with each of the information representing the plurality of edges from the information storage 190.

The information representing the traffic conditions of the edge stored in the information storage 190 of the control device 100 may be information representing an average value of times required for the delivery vehicle 600 to pass the edge in the past, information representing a minimum value of the times, or information representing a maximum value of the times. Furthermore, the information representing the traffic conditions of the edge stored in the information storage 190 may be information representing an average value of times required for one or more of a plurality of delivery vehicles and a plurality of automobiles to pass the edge, the one or more of a plurality of delivery vehicles and a plurality of automobiles having passed the edge per unit time in the past. The information representing the traffic conditions of the edge may be information representing a minimum value of the times or information representing a maximum value of the times.

In the present modification, it has been described that the traffic conditions of the edge include the passing time of the edge; however, the present disclosure is not limited thereto, and the traffic conditions may include the speed limit of the edge. In such a case, the first determiner 120 of the control device 100 may determine, on the basis of the speed limit of the edge represented by the information acquired by the acquirer 110, a point for each of the plurality of determined routes so that the time that is required for the delivery vehicle 600 to move from the point to the shipping location R1 at the speed limit equals to an estimated preparation time. Thereafter, the first determiner 120 may determine the boundary B1 of the neighboring region N1 so that the boundary B1 includes the point determined for each of the plurality of routes.

Modification 4 of Embodiment

In the embodiment, it has been described that the first determiner 120 of the control device 100 determines the point PD of the objective destination so that the region distance L1, which is the distance from the point PD of the objective destination to the boundary B1 of the neighboring region N1, and the region distance L2, which is the distance from the point PD of the objective destination to the boundary B2 of the neighboring region N2, satisfy the predetermined condition; however, the present disclosure is not limited thereto.

The first determiner 120 of the control device 100 according to the present modification determines the point PD of the objective destination so that a region time T1 required for the delivery vehicle 600 to move from the point PD of the objective destination to the boundary B1 of the neighboring region N1 and a region time T2 required for the delivery vehicle 600 to move from the point PD of the objective destination to the boundary B2 of the neighboring region N2 satisfy a predetermined condition.

In the present modification, the predetermined condition is a condition that the sum of the region time T1 and the region time T2 is minimum. Furthermore, in the present modification, the delivery vehicle 600 moves at a preset setting speed. Therefore, at the point PD of the objective destination where the sum of the region distance L1 from the point PD of the objective destination to the boundary B1 and the region distance L2 from the point PD of the objective destination to the boundary B2 is minimized, the sum of the region time T1 and the region time T2 is minimized. On the contrary, at the point PD of the objective destination where the sum of the region time T1 and the region time T2 is minimized, the sum of the region distance L1 and the region distance L2 is minimized. Therefore, the first determiner 120 of the control device 100 according to the present modification determines a point, where the sum of the region distance L1 and the region distance L2 is minimized, as the point PD of the objective destination by using the known algorithm described in the embodiment.

On the other hand, when the delivery vehicle 600 moves at a speed according to traffic conditions, the first determiner 120 of the control device 100 determines a point where the sum of the region distance L1 and the region distance L2 is minimized, and then determines the point and J points (J is a natural number), which are separated from the point by a distance equal to or less than a predetermined distance, as candidates for the point PD of the objective destination. Next, the first determiner 120 determines numbers of J+1 candidates for the point PD of the objective destination from No. 1 to No. J+1 on the basis of a predetermined rule or a software random number.

Thereafter, the first determiner 120 of the control device 100 calculates the total time of the region time T1 and the region time T2 for the first candidate by the method described in modification 3 of the embodiment, the region time T1 being the shortest time required for the delivery vehicle 600 to move from the first candidate to the boundary B1 of the neighboring region N1, the region time T2 being the shortest time required for the delivery vehicle 600 to move from the first candidate to the boundary B2 of the neighboring region N2. Similarly, the first determiner 120 calculates the total time for the second to J+1-th candidates, and determines a candidate, for which the minimum total time is calculated among the calculated J+1 total times, as the point PD of the objective destination.

Modification 5 of Embodiment

In the embodiment, it has been described that the first determiner 120 of the control device 100 determines the point PD of the objective destination so that the region distance L1 and the region distance L2 satisfy the predetermined condition. Furthermore, in the embodiment, it has been described that the predetermined condition is a condition that the sum of the region distance L1 and the region distance L2 is minimum; however, the present disclosure is not limited thereto. The predetermined condition may be a condition that the point PD of the objective destination is located at a place where the delivery vehicle 600 can wait (hereinafter, referred to as a standby place) and the sum of the region distance L1 and the region distance L2 is minimum.

Therefore, the information storage 190 of the control device 100 stores in advance I pieces (I is a natural number) of position information representing the position of the place, where the delivery vehicle 600 can wait, by using latitude, longitude, and altitude. The first determiner 120 determines numbers of the I pieces of position information to be from No. 1 to No. I, and calculates, for a waiting place at a position represented by the first position information, the total distance of the region distance L1 from the waiting place to the boundary B1 and the region distance L2 from the waiting place to the boundary B2. Similarly, the first determiner 120 calculates the total distance for second to I-th position information, and determines a waiting place, where the minimum total distance is calculated among the calculated I total distances, as the point PD of the objective destination.

In the present modification, it has been described that the predetermined condition is a condition that the point PD of the objective destination is located at a place where the delivery vehicle 600 can wait and the sum of the region distance L1 and the region distance L2 is minimum; however, the present disclosure is not limited thereto. The predetermined condition may be a condition that the point PD of the objective destination is located at a place where the delivery vehicle 600 can wait and of which a number that is determined on the basis of the sum of the region distance L1 and the region distance L2 is from No. 1 to No. N (N is a natural number equal to or less than I) in ascending order.

Therefore, the first determiner 120 of the control device 100 may determine numbers of the I waiting places to be from No. 1 to No. I in ascending order of the total distance, and determine one waiting place, which is selected, on the basis of a predetermined rule or a software random number, among waiting places of which numbers are determined to be equal to or less than N, as the point PD of the objective destination.

In the present modification, it has been described that the first determiner 120 of the control device 100 determines the point PD of the objective destination so that the point PD of the objective destination is located at a place where the delivery vehicle 600 can wait and the sum of the region distance L1 and the region distance L2 is minimum; however, the present disclosure is not limited thereto. The first determiner 120 may determine the point PD of the objective destination so that the point PD of the objective destination is located at a place where the delivery vehicle 600 can wait and the sum of the region time T1 and the region time T2 is minimized.

Furthermore, the predetermined condition may be a condition that the point PD of the objective destination is located at a place where the delivery vehicle 600 can wait and of which a number that is determined on the basis of the sum of the region time T1 and the region time T2 is from No. 1 to No. N (N is a natural number equal to or less than I) in ascending order.

Furthermore, the predetermined condition may be a condition that the sum of the region distance L1 and the region distance L2 is shorter than a predetermined distance, or the predetermined condition may be a condition that the sum of the region time T1 and the region time T2 is shorter than a predetermined time.

Modification 6 of Embodiment

In the embodiment, it has been described that the predetermined condition is a condition that the sum of the region distance L1 and the region distance L2 is minimized; however, the present disclosure is not limited thereto. The predetermined condition may be any condition as long as it is a condition for determining, as the point PD of the objective destination, a point where the sum of the region distance L1 and the region distance L2 decreases, in preference to a point where the sum of the region distance L1 and the region distance L2 increases.

Furthermore, the predetermined condition may be any condition as long as it is a condition for determining, as the point PD of the objective destination, a point where the sum of the region time T1 and the region time T2 decreases, in preference to a point where the sum of the region time T1 and the region time T2 increases.

Modification 7 of Embodiment

When the point PD of the objective destination is located inside the neighboring region N1, the first determiner 120 of the control device 100 may correct the region distance L1 to "0" meters. Furthermore, when the point PD of the objective destination is located inside the neighboring region N2, the first determiner 120 may correct the region distance L2 to "0" meters.

Correcting the region distance L1 to "0" meters when the point PD of the objective destination is located inside the neighboring region N1 is because when an estimated product is the same as a shipping product targeted for a confirmed order and the shipping location R1 is specified in the order, as long as the point PD of the objective destination is located inside the neighboring region N1, the delivery vehicle 600 arrives at the shipping location R1 before preparation of the product is completed at the shipping location R1 no matter where the point PD of the objective destination is located. Therefore, in a case where the point PD of the objective destination is located inside the neighboring region N1, when the point PD of the objective destination is determined as a point, where an arrival waiting time occurring when specifying the shipping location R2 is minimized, on the basis of the region distance L2, a decrease in the delivery efficiency of the delivery vehicle 600 can be reliably suppressed. Similarly, correcting the region distance L2 to "0" meters when the point PD of the objective destination is located inside the neighboring region N2 is because a decrease in the delivery efficiency of the delivery vehicle 600 can be reliably suppressed when the point PD of the objective destination is determined as a point, where an arrival waiting time occurring when specifying the shipping location R1 is minimized, on the basis of the region distance L1.

Furthermore, when the point PD of the objective destination is located inside the neighboring region N1, the first determiner 120 of the control device 100 may correct the region distance L1 to a shorter distance than before the correction, and when the point PD of the objective destination is located inside the neighboring region N2, the first determiner 120 of the control device 100 may correct the region distance L2 to a shorter distance than before the correction.

Moreover, when the point PD of the objective destination is located outside the neighboring region N1, the first determiner 120 of the control device 100 may correct the region distance L1 to "0" meters, and when the point PD of the objective destination is located outside the neighboring region N2, the first determiner 120 of the control device 100 may correct the region distance L2 to "0" meters.

Correcting the region distance L1 to "0" meters when the point PD of the objective destination is located outside the neighboring region N1 is because when an estimated product is the same as a shipping product and the shipping location R1 is specified, as long as the point PD of the objective destination is located outside the neighboring region N1, the delivery vehicle 600 arrives at the shipping location R1 after preparation of the product is completed at the shipping location R1 no matter where the point PD of the objective destination is located. Therefore, in a case where the point PD of the objective destination is located outside the neighboring region N1, when the point PD of the objective destination is determined as a point, where a preparation waiting time occurring when specifying the shipping location R2 is minimized, on the basis of the region distance L2, a decrease in utilization efficiency of the shipping locations R1 and R2 can be reliably suppressed.

Furthermore, when the point PD of the objective destination is located outside the neighboring region N1, the first determiner 120 of the control device 100 may correct the region distance L1 to a shorter distance than before the correction, and when the point PD of the objective destination is located outside the neighboring region N2, the first determiner 120 of the control device 100 may correct the region distance L2 to a shorter distance than before the correction.

Modification 8 of Embodiment

In the embodiment, it has been described that the predetermined condition is a condition that the sum of the region distance L1 and the region distance L2 is minimized; however, the present disclosure is not limited thereto. The predetermined condition according to the present modification is a condition for minimizing an expected value of a region distance, which is the sum of a weighted region distance L1 and a weighted region distance L2, the weighted region distance L1 being the region distance L1 weighted by the probability that an order specifying the first shipping location R1 is confirmed (hereinafter, referred to as first probability), the weighted region distance L2 being the region distance L2 weighted by the probability that an order specifying the second shipping location R2 is confirmed (hereinafter, referred to as second probability).

The information storage 190 of the control device 100 according to the present modification stores in advance total confirmation frequency information representing the number of times by which an order has been confirmed. Furthermore, the information storage 190 stores in advance the store ID and confirmation frequency information in correlation with each other, the confirmation frequency information representing the number of times by which an order specifying the shipping location R1 or R2 in the store ST1 or ST2 identified by the store ID has been confirmed.

When it is determined in step S63 of FIG. 14 that the order has been accepted (step S63; Yes), the second determiner 140 of the control device 100 determines that the order has been confirmed. Thereafter, the acquirer 110 acquires the total confirmation frequency information stored in the information storage 190, and the controller 130 increments the number of times represented by the acquired total confirmation frequency information by a value "1" and then changes the total confirmation frequency information stored in the information storage 190 into total confirmation frequency information representing the incremented number of times.

Furthermore, the acquirer 110 of the control device 100 acquires the confirmation frequency information stored in the information storage 190 in correlation with the store ID acquired in step S61. Next, the controller 130 increments the number of times represented by the acquired confirmation frequency information by a value "1", and then changes the confirmation frequency information stored in the information storage 190 in correlation with the store ID acquired in step S61 into confirmation frequency information representing the incremented number of times.

Moreover, in step S04 of FIG. 4, the acquirer 110 of the control device 100 acquires the total confirmation frequency information stored in the information storage 190. Furthermore, the acquirer 110 acquires, from the information storage 190, confirmation frequency information (hereinafter, referred to as first confirmation frequency information) correlated with the store ID of the store ST1 including the first shipping location R1. Similarly, the acquirer 110 acquires confirmation frequency information (hereinafter, referred to as second confirmation frequency information) correlated with the store ID of the store ST2 including the second shipping location R2.

Thereafter, the acquirer 110 of the control device 100 acquires the first probability by dividing the number of times represented by the first confirmation frequency information by the number of times represented by the total confirmation frequency information. Similarly, the acquirer 110 acquires the second probability by dividing the number of times represented by the second confirmation frequency information by the number of times represented by the total confirmation frequency information.

Next, the first determiner 120 of the control device 100 determines the point PD of the objective destination, where the sum of the region distance L1 weighted by the first probability and the region distance L2 weighted by the second probability is minimized, by using, for example, a known algorithm including a least squares method.

It has been described that the predetermined condition according to the present modification is a condition for minimizing the expected value of the region distance, which is the sum of the region distance L1 weighted by the first probability and the region distance L2 weighted by the second probability, and the first determiner 120 of the control device 100 determines the point PD of the objective destination where the expected value of the region distance is minimized. However, the present disclosure is not limited thereto. The predetermined condition may be a condition for minimizing an expected value of a region time, which is the sum of the region time T1 weighted by the first probability and the region time T2 weighted by the second probability, and the first determiner 120 of the control device 100 may determine the point PD of the objective destination where the expected value of the region time is minimized.

Modification 9 of Embodiment

In the embodiment, it has been described that the estimated product in the store ST1 is a product with the highest probability that an order is confirmed among a plurality of products sold in the store ST1; however, the present disclosure is not limited thereto.

The estimated product in the store ST1 may be one product selected from one or a plurality of products with a higher probability that an order is confirmed than a predetermined probability among the plurality of products sold in the store ST1, on the basis of a predetermined rule or a software random number. Similarly, the estimated product in the store ST2 may be one product selected from one or a plurality of products with a higher probability that an order is confirmed than a predetermined probability among the plurality of products sold in the store ST2, on the basis of a predetermined rule or a software random number.

Furthermore, the estimated product in the store ST1 may be one product selected from one or a plurality of products, numbers of which are from No. 1 to a predetermined number in descending order of probability that an order is confirmed, on the basis of a predetermined rule or a software random number, the products being sold in the store ST1. Similarly, the estimated product in the store ST2 may be one product selected from one or a plurality of products, numbers of which are from No. 1 to a predetermined number in descending order of probability that an order is confirmed, on the basis of a predetermined rule or a software random number, the products being sold in the store ST2.

Moreover, the estimated product in the store ST1 may be a product having the longest preparation time or a product having the shortest preparation time among the plurality of products sold in the store ST1. Similarly, the estimated product in the store ST2 may be a product having the longest preparation time or a product having the shortest preparation time among the plurality of products sold in the store ST2.

Furthermore, the estimated product in the store ST1 may be a real product or a virtual product having the length of a preparation time equal to an average value of preparation times of the plurality of products sold in the store ST1, or a real product having a preparation time closest to the average value. Similarly, the estimated product in the store ST2 may be a real product or a virtual product having the length of a preparation time equal to an average value of preparation times of the plurality of products sold in the store ST2, or a real product having a preparation time closest to the average value. The average value of the preparation times of the plurality of products may be a value obtained by dividing the sum of the preparation times of the plurality of products by the number of the plurality of products.

Moreover, the estimated product in the store ST1 may be a real product or a virtual product having the length of a preparation time equal to an expected value of the preparation times of the plurality of products sold in the store ST1, or a real product having a preparation time closest to the expected value. That is, when M products (M is a natural number) are sold in the store ST1, the length of the preparation time of the estimated product may be the sum of weighted preparation times of first to M-th products. The weighted preparation time of the first product is a preparation time of the first product weighted by the probability that an order for the first product is confirmed, and the weighted preparation times of the second to M-th products are preparation times of the second to M-th products weighted by the probability that an order for the second to M-th products is confirmed. Similarly, the estimated product in the store ST2 may be a real product or a virtual product having the length of a preparation time equal to an expected value of the preparation times of the plurality of products sold in the store ST2, or a real product having a preparation time closest to the expected value.

Modification 10 of Embodiment

In the embodiment, the first determiner 120 of the control device 100 may correct the estimated preparation time of the store ST1 on the basis of the number of employees attending and working in the store ST1 (hereinafter, referred to as the number of workers) and determine the neighboring region N1 on the basis of the corrected estimated preparation time.

For this purpose, among the employees who are attending and working in the store ST1, an employee who is in managerial positions performs an operation on the terminal device 901 of the store ST1, for example, at a predetermined time to input the number of workers, and the terminal device 901 generates information representing the number of workers according to the operation and stores the generated information. Thereafter, upon receiving a report request for reporting the number of workers from the control device 100, the terminal device 901 returns the information indicating the number of workers to the control device 100.

In step S01 of FIG. 4, the acquirer 110 of the control device 100 acquires the estimated preparation time information of the store ST1 from the estimated preparation time table of FIG. 6, and then outputs the report request to the data communication circuit 104 with the terminal device 901 of the store ST1 as a destination. Thereafter, after transmitting the report request to the terminal device 901, when the data communication circuit 104 of the control device 100 receives the information indicating the number of workers from the terminal device 901, the acquirer 110 acquires the information from the data communication circuit 104.

Next, on the basis of the number of workers in the store ST1 represented by the acquired information, the first determiner 120 of the control device 100 corrects the estimated preparation time of the store ST1 represented by the estimated preparation time information. For this purpose, the acquirer 110 acquires information representing the reference number of people stored in advance in the information storage 190 in correlation with the store ID of the store ST1. Next, for example, by multiplying an absolute value of the difference between the number of workers in the store ST1 and the reference number of people in the store ST1 by a positive constant C1, the first determiner 120 determines a larger correction value as the absolute value of the difference increases. A person skilled in the art can experimentally determine a suitable value of the constant C1.

Thereafter, when the number of workers is greater than the reference number of people, the first determiner 120 of the control device 100 corrects the estimated preparation time to a shorter time than before the correction by subtracting the determined positive correction value from the estimated preparation time. However, when the number of workers is smaller than the reference number of people, the first determiner 120 corrects the estimated preparation time to a longer time than before the correction by adding the determined positive correction value to the estimated preparation time. Furthermore, when the number of workers is equal to the reference number of people, the first determiner 120 corrects the estimated preparation time to the same time as before the correction. Thereafter, the first determiner 120 determines the neighboring region N1 on the basis of the corrected estimated preparation time of the store ST1.

Furthermore, the first determiner 120 of the control device 100 corrects the estimated preparation time of the store ST2 on the basis of the number of workers in the store ST2, and determines the neighboring region N2 on the basis of the corrected estimated preparation time of the store ST2.

Moreover, in step S82 of FIG. 16, the first determiner 120 of the control device 100 corrects the estimated preparation time of the store ST1 on the basis of the number of workers in the store ST1, and corrects the estimated preparation time of the store ST2 on the basis of the number of workers in the store ST2. Moreover, in step S83, the first determiner 120 corrects the preparation time of the store ST1 on the basis of the number of workers in the store ST1, and corrects the preparation time of the store ST2 on the basis of the number of workers in the store ST2. Thereafter, in step S84, the first determiner 120 corrects the boundary B1 of the neighboring region N1 on the basis of the corrected estimated preparation time of the store ST1 and the corrected preparation time of the store ST1. Similarly, the first determiner 120 corrects the boundary B2 of the neighboring region N2 on the basis of the corrected estimated preparation time of the store ST2 and the corrected preparation time of the store ST2.

Modification 11 of Embodiment

In modification 10 of the embodiment, it has been described that the first determiner 120 of the control device 100 corrects the preparation time and the estimated preparation time of the store ST1 on the basis of the number of workers in the store ST1; however, the present disclosure is not limited thereto. The first determiner 120 according to the present modification corrects the preparation time and the estimated preparation time of the store ST1 on the basis of the number of products for which an order has been confirmed but preparation has not been completed in the store ST1 (hereinafter, referred to as the number of unprepared products). The confirmed order may or may not include an order of a customer who visited the store ST1.

For this purpose, when the terminal device 901 of the store ST1 according to the present modification is started, the terminal device 901 initializes the value of a counter representing the number of unprepared products to a value "0". Next, upon accepting an order, an employee of the store ST1 performs an operation on the terminal device 901 to increase the value of the counter by a value "1", and the terminal device 901 increases the value of the counter by the value "1" according to the operation. Furthermore, when finishing the preparation of an accepted product, the employee performs an operation of reducing the value of the counter by the value "1", and the terminal device 901 reduces the value of the counter by the value "1" according to the operation. Upon receiving a report request for reporting the number of unprepared products from the control device 100, the terminal device 901 returns information representing the value of the counter to the control device 100.

The acquirer 110 of the control device 100 according to the present modification outputs the report request to the data communication circuit 104 with the terminal device 901 of the store ST1 as a destination. Thereafter, when the data communication circuit 104 of the control device 100 receives information indicating the number of unprepared products, the acquirer 110 acquires the information from the data communication circuit 104. Next, the first determiner 120 corrects the preparation time and the estimated preparation time of the store ST1 on the basis of the number of products represented by the acquired information.

For this purpose, the first determiner 120 of the control device 100 determines a larger correction value as the number of products increases by multiplying the number of unprepared products in the store ST1 by a positive constant C2, for example. A person skilled in the art can experimentally determine a suitable value of the constant C2.

Thereafter, the first determiner 120 of the control device 100 corrects the preparation time and the estimated preparation time to longer times than before the correction by adding the determined positive correction value to the preparation time and the estimated preparation time, respectively.

Furthermore, the first determiner 120 of the control device 100 corrects the preparation time and the estimated preparation time of the store ST2 on the basis of the number of unprepared products in the store ST2.

Modification 12 of Embodiment

The control device 100 according to modification 10 of the embodiment, which corrects the preparation time and the estimated preparation time of the store ST1 on the basis of the number of workers in the store ST1, and the control device 100 according to modification 11 of the embodiment, which corrects the preparation time and the estimated preparation time of the store ST1 on the basis of the number of unprepared products in the store ST1, can be combined. Therefore, the first determiner 120 of the control device 100 according to the present modification corrects the preparation time and the estimated preparation time of the store ST1 on the basis of both the number of workers in the store ST1 and the number of unprepared products in the store ST1. Furthermore, the first determiner 120 according to the present modification corrects the preparation time and the estimated preparation time of the store ST2 on the basis of both the number of workers in the store ST2 and the number of unprepared products in the store ST2.

Modification 13 of Embodiment

On the basis of a response time from when a start timing notification is transmitted to the terminal device 901 of the store S1 to when a response transmitted from the terminal device 901 is received, the control device 100 may perform a control for delaying an arrival time of the delivery vehicle 600 to the shipping location R1.

For this purpose, upon receiving the start timing notification from the control device 100, the terminal device 901 of the store ST1 including the shipping location R1 outputs the start timing notification by display or by voice or sound. In the present modification, the following description is given by taking, as a specific example, a case where, for example, since an employee of the store ST1 is preparing a product ordered by a customer who visited the store ST1, the start timing notification is confirmed at the timing when "5 minutes" has elapsed from the timing when the start timing notification is output by display or by voice or sound.

Upon confirming the start timing notification, the employee of the store ST1 performs an operation on the terminal device 901 to transmit a notification notifying that the preparation of the ordered product is started as a response to the start timing notification. When the operation is performed, the terminal device 901 transmits the response to the control device 100.

When the controller 130 of the control device 100 according to the present modification outputs the start timing notification to the data communication circuit 104 with the terminal device 901 of the store ST1 as a destination in step S90 of FIG. 16, the acquirer 110 starts counting by using a hardware timer or software timer, which is not illustrated.

When the data communication circuit 104 of the control device 100 transmits the start timing notification to the terminal device 901 and then receives a response from the terminal device 901, the acquirer 110 of the control device 100 acquires time "5 minutes" counted from the transmission of the start timing notification to the reception of the response as a response time.

Thereafter, in the present modification, the first determiner 120 of the control device 100 determines a delay time for delaying an arrival time of the delivery vehicle 600 at the shipping location R1 as the response time "5 minutes". However, the present disclosure is not limited thereto, and as long as the delay time is based on the response time "5 minutes", the first determiner 120 may determine the length of the delay time to any length. For example, the first determiner 120 may determine the length of the delay time to be longer than the response time "5 minutes" or shorter than the response time "5 minutes".

Next, the controller 130 of the control device 100 generates a route change command that includes information representing the delay time "5 minutes" and that commands changing the movement route of the delivery vehicle 600 to a route (hereinafter, referred to as a delay route) for delaying, by "5 minutes", an arrival time of the delivery vehicle 600 to the shipping location R1 when the delivery vehicle 600 continues to move along a route on which the delivery vehicle 600 is moving. Thereafter, by outputting the generated route change command to the data communication circuit 104 with the delivery vehicle 600 as a destination, the controller 130 performs a delay control for delaying the arrival time of the delivery vehicle 600 to the shipping location R1 and then ending the execution of the notification control process.

When the data communication circuit 694 receives the route change command while the delivery vehicle 600 is moving to the shipping location R1 by performing the movement destination movement process of FIG. 15, the CPU 691 of the delivery vehicle 600 acquires the route change command from the data communication circuit 694. Next, the CPU 691 specifies the position of the delivery vehicle 600 on the basis of a signal output from the position measurement circuit 696, and calculates a movement distance from the position of the delivery vehicle 600 to the shipping location R1 on the route, on which the delivery vehicle 600 is moving, on the basis of information representing the movement route. Thereafter, the CPU 691 acquires information representing the setting speed stored in the flash memory 693b, and divides the movement distance by the setting speed represented by the acquired information. With this, the CPU 691 calculates the movement time required to move from the position of the delivery vehicle 600 to the shipping location R1 when the delivery vehicle 600 continues to move along the route on which the delivery vehicle 600 is moving.

Next, the CPU 691 of the delivery vehicle 600 acquires the information representing the delay time "5 minutes" from the route change command and then searches for a plurality of routes from the position of the delivery vehicle 600 to the shipping location R1. Thereafter, the CPU 691 determines a route, where the time required for movement is longer by the delay time "5 minutes" than the calculated movement time among the plurality of searched routes, as a delay route. Next, the CPU 691 changes the movement route to the delay route and continues the execution of the movement destination movement process of FIG. 15. With this, the delivery vehicle 600 arrives at the shipping location R1 (i) at the timing delayed by the delay time "5 minutes" from the timing when the delivery vehicle 600 arrives at the shipping location R1 when the delivery vehicle 600 continues to move along the movement route before the change, and (ii) at the timing when preparation of an ordered product is completed at the shipping location R1.

With such configurations, the data communication circuit 104 of the control device 100 receives the response to the start timing notification from the terminal device 901 at the shipping location R1, and the controller 130 performs a control for delaying the arrival time of the delivery vehicle 600 to the shipping location R1 on the basis of a response time from the transmission of the start timing notification to the reception of the response. Therefore, the control device 100 can reliably suppress the difference between the timing when the delivery vehicle 600 arrives at the shipping location R1 and the timing when preparation of a product that is a package is completed and shipment of the product becomes possible at the shipping location R1. Therefore, the control device 100 can reliably suppress a decrease in the utilization efficiency of the shipping location R1.

In the present modification, it has been described that the control device 100 performs a control for delaying the arrival time of the delivery vehicle 600 to the shipping location R1 in the store ST1 on the basis of the response time of the store ST1; however, the present disclosure is not limited thereto. The data communication circuit 104 of the control device 100 may transmit the start timing notification to the terminal device 902 of the store ST2 and then receive a response from the terminal device 902, and the controller 130 may perform a control for delaying the arrival time of the delivery vehicle 600 to the shipping location R2 in the store ST2 on the basis of a response time from the transmission of the start timing notification to the reception of a response.

Modification 14 of Embodiment

In modification 13 of the embodiment, it has been described that the control device 100 controls the movement route of the delivery vehicle 600 on the basis of the response time; however, the present disclosure is not limited thereto. The control device 100 may control the movement speed of the delivery vehicle 600 on the basis of the response time.

For this purpose, the controller 130 of the control device 100 generates a speed change command that includes information representing the delay time "5 minutes" and that commands changing the movement speed of the delivery vehicle 600 to a speed (hereinafter, referred to as a delay speed) for delaying, by the delay time "5 minutes", an arrival time of the delivery vehicle 600 to the shipping location R1 when the delivery vehicle 600 continues to move at a preset setting speed. Thereafter, the controller 130 outputs the generated speed change command to the data communication circuit 104 with the delivery vehicle 600 as a destination.

When the data communication circuit 694 receives the speed change command while the delivery vehicle 600 is moving to the shipping location R1 by performing the movement destination movement process of FIG. 15, the CPU 691 of the delivery vehicle 600 acquires the speed change command from the data communication circuit 694. Next, the CPU 691 acquires the information representing the delay time "5 minutes" from the acquired speed change command. Furthermore, the CPU 691 calculates a movement distance from the position of the delivery vehicle 600 to the shipping location R1. Moreover, the CPU 691 acquires information representing the setting speed of the delivery vehicle 600 from the flash memory 693*b*. Thereafter, on the basis of the calculated movement distance, the delay time "5 minutes", and the setting speed, the CPU 691 determines a deceleration speed for delaying, by the delay time "5 minutes", an arrival time of the delivery vehicle 600 to the shipping location R1.

Next, the CPU 691 of the delivery vehicle 600 calculates a delay speed slower than the setting speed by the deceleration speed. Thereafter, the CPU 691 outputs a control signal for moving at the calculated delay speed to the driving circuit 699 in the process of step S75 of FIG. 15. With this, the delivery vehicle 600 moves to the shipping location R1 by changing the movement speed from the setting speed to the delay speed.

In the present modification, it has been described that the control device 100 controls the moving speed of the delivery vehicle 600 moving to the shipping location R1 in the store ST1 on the basis of the response time of the store ST1; however, the present disclosure is not limited thereto. The control device 100 may control the moving speed of the delivery vehicle 600 moving to the shipping location R2 in the store ST2 on the basis of the response time of the store ST2.

In the present modification, it has been described that the control device 100 controls the moving speed of the delivery vehicle 600 on the basis of the response time; however, the present disclosure is not limited thereto. The control device 100 may perform a control for stopping the delivery vehicle 600 moving to the shipping location R1 or R2 by a stop time determined on the basis of the response time. The length of the stop time may be any length as long as it is based on the response time, and may be, for example, the same as that of the response time, may be shorter than that of the response time, or may be longer than that of the response time.

Modification 15 of Embodiment

The control device 100 according to modification 13 of the embodiment and the control device 100 according to modification 14 of the embodiment can be combined, the control device 100 according to modification 13 of the embodiment being a device that performs a control for changing, on the basis of the response time of the store ST1 or ST2, the movement route of the delivery vehicle 600 moving to the shipping location R1 or R2 in the store ST1 or ST2, the control device 100 according to modification 14 of the embodiment being a device that performs a control for changing, on the basis of the response time, the moving speed of the delivery vehicle 600 or a control for stopping the delivery vehicle 600 on the basis of the response time. The controller 130 of the control device 100 according to the present modification performs one or more of the control for changing, on the basis of the response time of the store ST1 or ST2, the movement route of the delivery vehicle 600 moving to the shipping location R1 or R2 in the store ST1 or ST2, the control for changing the moving speed on the basis of the response time, and the control for stopping the delivery vehicle 600 on the basis of the response time.

Modification 16 of Embodiment

Figure 18:
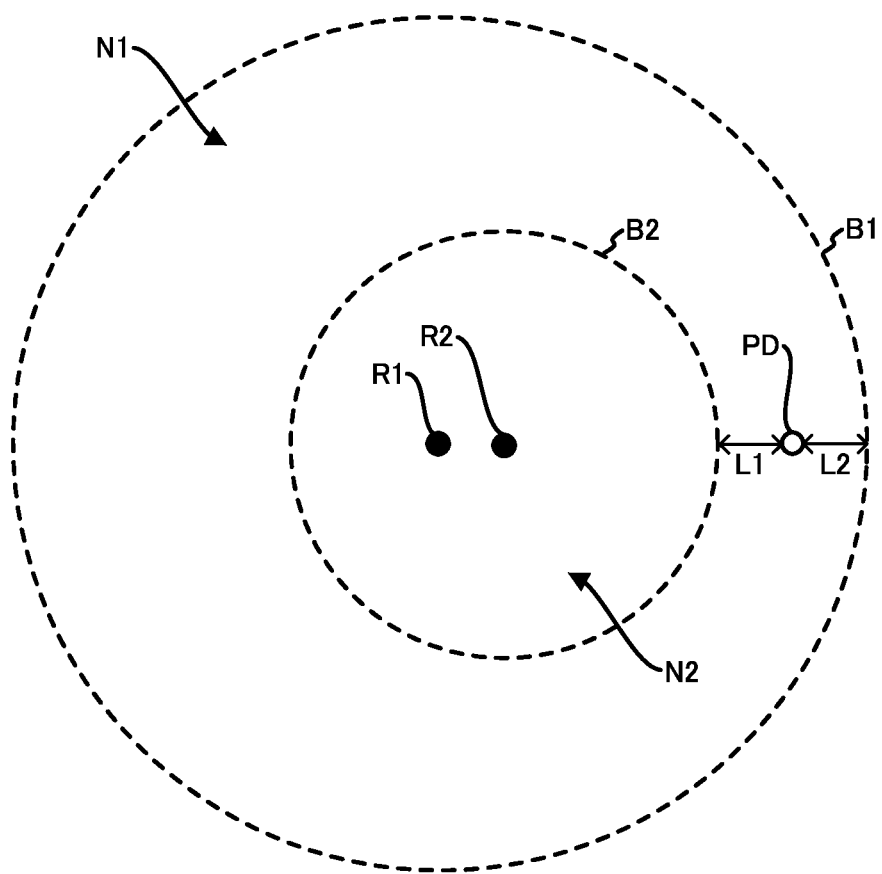
FIG. 18 is a diagram illustrating an example of a point of an objective destination located inside a neighboring region.

Although FIG. 2 referenced in the description of the embodiment illustrates the point PD of the objective destination located outside the neighboring regions N1 and N2, the position of the point PD of the objective destination determined by the first determiner 120 of the control device 100 is not limited to the outside of the neighboring regions N1 and N2. For example, as illustrated in FIG. 18, when the neighboring region N2 is included in the neighboring region N1 and there is no point of tangency between the boundary B1 of the neighboring region N1 and the boundary B2 of the neighboring region N2, the first determiner 120 determines the point PD of the objective destination at a position located inside the neighboring region N1 and located outside the neighboring region N2.

Figure 19:
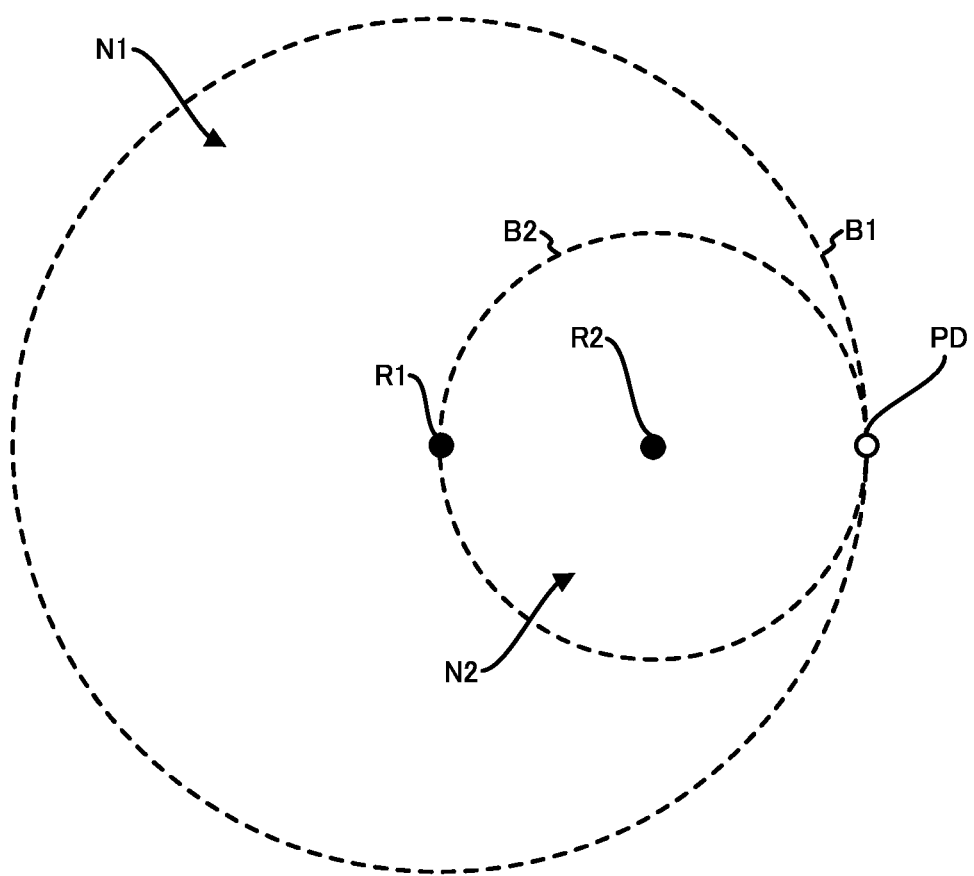
FIG. 19 is a diagram illustrating an example of a point of an objective destination located at a point of tangency between two neighboring regions.
Figure 20:
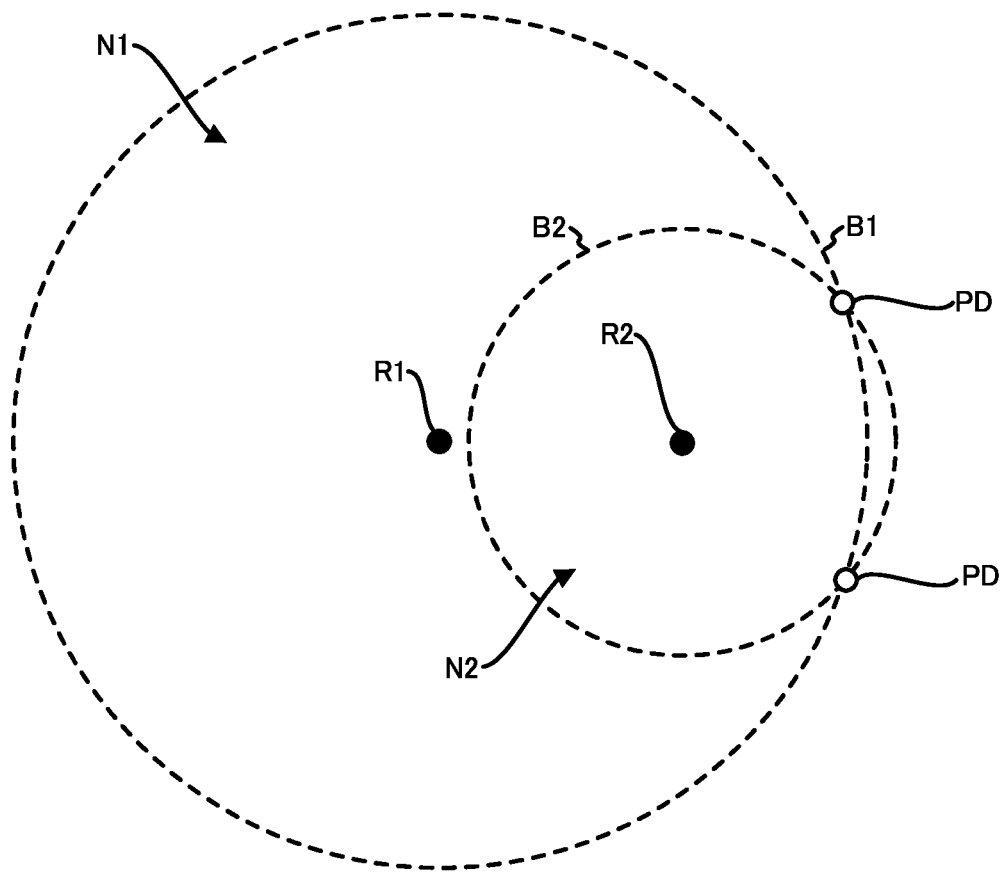
FIG. 20 is a diagram illustrating an example of a point of an objective destination located at a point of intersection of two boundaries of neighboring regions.

Furthermore, as illustrated in FIG. 19, when there is a point of tangency between the boundary B1 of the neighboring region N1 and the boundary B2 of the neighboring region N2, the first determiner 120 of the control device 100 determines the point PD of the objective destination at a position of the point of tangency. Moreover, as illustrated in FIG. 20, when there are two points of intersection of the boundary B1 of the neighboring region N1 and the boundary B2 of the neighboring region N2, the first determiner 120 determines the point PD of the objective destination at a position of one point of intersection selected from the two points of intersection on the basis of a predetermined rule or a software random number.

Modification 17 of Embodiment

In the embodiment, the case where an order specifying the store ST1 and the product I1 sold in the store ST1 is accepted has been described as a specific example; however, the present disclosure is not limited thereto. An order specifying the store ST2 and a not-illustrated product I2 sold in the store ST2 may be accepted.

Furthermore, in the embodiment, the case where the shipping location R1 in the store ST1 is specified and the boundary B1 of the neighboring region N1 of the shipping location R1 is corrected to the boundary B1' has been described as a specific example; however, the present disclosure is not limited thereto. The shipping location R2 in the store ST2 may be specified and the boundary B2 of the neighboring region N2 of the shipping location R2 may be corrected.

Modification 18 of Embodiment

In the embodiment, it has been described that the first determiner 120 of the control device 100 corrects, on the basis of the preparation time of the shipping product I1 requested to be shipped, the boundary B1 of the neighboring region N1 determined on the basis of the estimated preparation time to the boundary B1' and the second determiner 140 determines whether or not the delivery vehicle 600 has arrived at the corrected boundary B1'. However, the present disclosure is not limited thereto. The first determiner 120 may determine a new neighboring region on the basis of the preparation time of the shipping product I1 without correcting the boundary B1 of the neighboring region N1 determined on the basis of the estimated preparation time. Furthermore, the second determiner 140 may determine whether or not the delivery vehicle 600 has arrived at a boundary of the determined new neighboring region.

Modification 19 of Embodiment

In the embodiment, it has been described that the delivery vehicle 600 determines the movement route; however, the present disclosure is not limited thereto, and the first determiner 120 of the control device 100 may determine the movement route of the delivery vehicle 600. In such a case, the controller 130 of the control device 100 may output a movement command, an acceptance command, or a movement start command including information indicating the determined movement route to the data communication circuit 104 with the delivery vehicle 600 as a destination. Furthermore, the delivery vehicle 600 may move along the movement route represented by the information included in the received movement command, acceptance command, or movement start command.

Modification 20 of Embodiment

In the embodiment, it has been described that when the control device 100 is started, the control device 100 performs the objective destination determination process illustrated in FIG. 4. However, the present disclosure is not limited thereto. The control device 100 may perform the objective destination determination process at the timing when it is determined in step S13 of FIG. 7 that the task ID is not acquired (that is, it is determined that there is no collection delivery task), at a predetermined cycle, or at the timing when the input device 105c outputs a signal corresponding to an operation performed by an employee of an intermediary.

Modification 21 of Embodiment

In the embodiment, it has been described that the control device 100 performs the objective destination determination process illustrated in FIG. 4 in order to move the delivery vehicle 600 to the point PD of the objective destination and performs the notification control process illustrated in FIG. 16 in order to provide a notification of the start timing of preparation. However, the present disclosure is not limited thereto, and the control device 100 performs the objective destination determination process, but may not perform the notification control process. Furthermore, the control device 100 performs the notification control process, but may not perform the objective destination determination process.

Modification 22 of Embodiment

Figure 21:
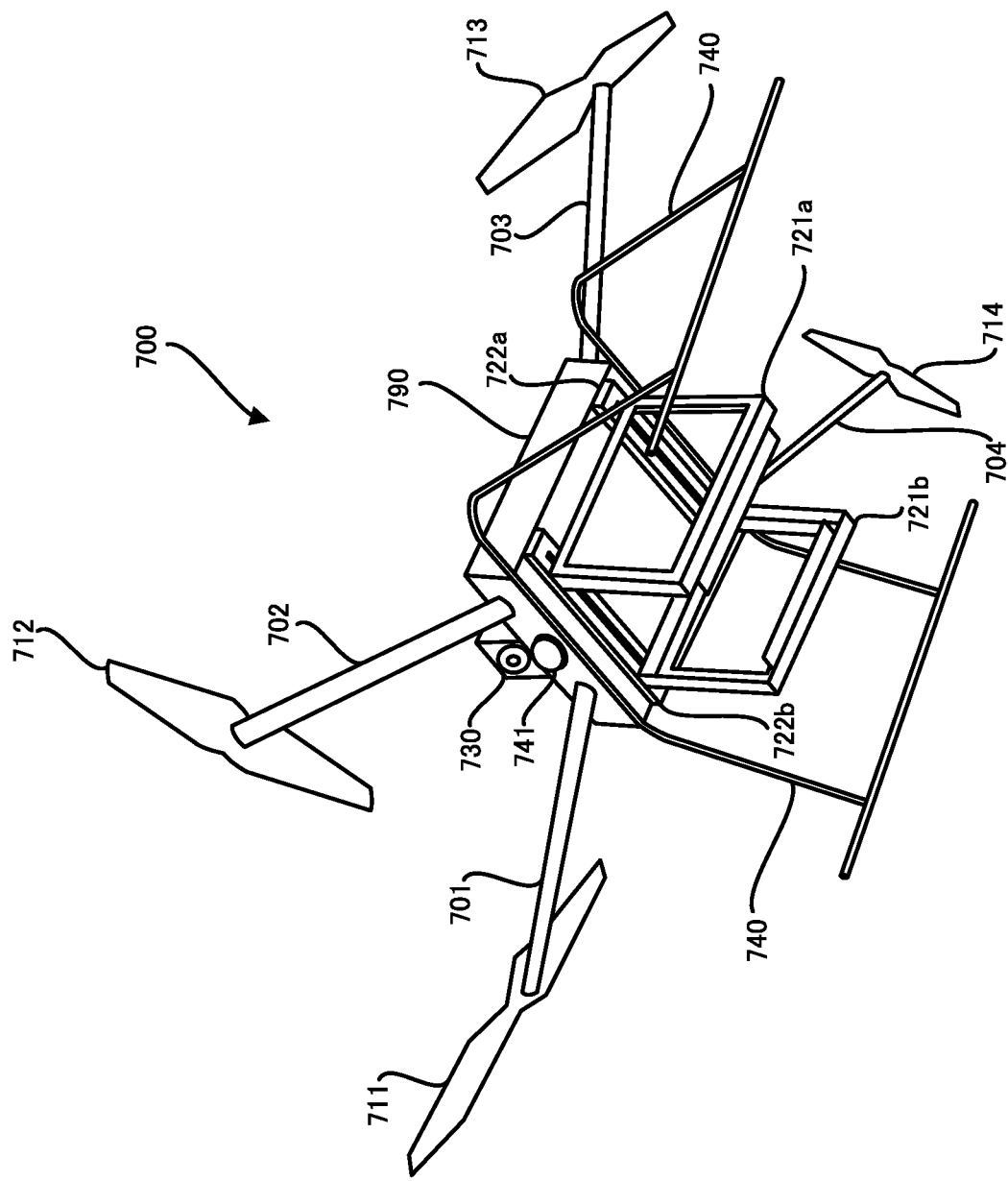
FIG. 21 is an external appearance configuration diagram illustrating an external appearance example of a delivery vehicle according to modification 22 of the embodiment.

In the embodiment, it has been described that the delivery system 1 includes the delivery vehicle 600 as an unmanned ground vehicle. However, the present disclosure is not limited thereto, and the delivery system 1 according to the present modification includes, for example, a delivery vehicle 700 as an unmanned aerial vehicle such as a drone as illustrated in FIG. 21.

The delivery vehicle 700 includes a control device 790 that controls the attitude and flight of the delivery vehicle 700, propeller arms 701 and 702 protruding from the front surface of the control device 790 to the front right and the front left of the control device 790, respectively, and propeller arms 703 and 704 protruding from the rear surface of the control device 790 to the rear left and the rear right of the control device 790, respectively. Furthermore, the delivery vehicle 700 includes propellers 711 to 714 installed at distal ends of the propeller arms 701 to 704, respectively, and not-illustrated motors for rotating the propellers 711 to 714 under the control of the control device 790.

Moreover, the delivery vehicle 700 is provided on the lower surface of the control device 790 thereof with a first holding frame 721a and a second holding frame 721b that surround and hold a product. The first holding frame 721a surrounds and holds four sides of one (hereinafter, referred to as a first surrounded surface) of the side surfaces of a rectangular parallelepiped-shaped cardboard in which the product is packaged, and the second holding frame 721*b* surrounds and holds four sides of another side surface (hereinafter, referred to as a second surrounded surface) facing the first surrounded surface surrounded and held by the first holding frame 721*a*.

Furthermore, the delivery vehicle 700 is provided on the lower surface of the control device 790 thereof with guide rails 722*a* and 722*b* that extend in the normal direction of the first surrounded surface and the second surrounded surface of the product, suspend the first holding frame 721*a* and the second holding frame 721*b*, and have the movement direction of the first holding frame 721*a* and the second holding frame 721*b* as an extension direction.

Moreover, the delivery vehicle 700 includes not-illustrated motors that allow the first holding frame 721*a* and the second holding frame 721*b* to surround and hold the product by moving the first holding frame 721*a* and the second holding frame 721*b* in a direction approaching each other under the control of the control device 790. The not-illustrated motor allows the first holding frame 721*a* and the second holding frame 721*b* to release the surrounded and held product by moving the first holding frame 721*a* and the second holding frame 721*b* in a direction away from each other under the control of the control device 790. In the present modification, collecting a product by the delivery vehicle 700 means that the delivery vehicle 700 surrounds and holds the product with the first holding frame 721*a* and the second holding frame 721*b*.

The delivery vehicle 700 is provided on the upper surface of the control device 790 thereof with an imaging device 730 having an optical axis and a view angle adjusted so that a recipient is included in an imaging range, the recipient being a person who receives the product released from the first holding frame 721*a* and the second holding frame 721*b*. The configuration and function of the imaging device 730 included in the delivery vehicle 700 are the same as those of the imaging device 630 included in the delivery vehicle 600.

The delivery vehicle 700 includes support legs 740 that protrude downward from the lower surface of the control device 790 and support the control device 790.

Furthermore, the delivery vehicle 700 includes a LiDAR sensor 741 provided on the front surface of the control device 790 and a not-illustrated LiDAR sensor provided on the rear surface of the control device 790. The configurations and functions of the LiDAR sensor 741 on the front surface and the LiDAR sensor on the rear surface included in the delivery vehicle 700 are the same as those of the LiDAR sensor 641 on the front surface and the LiDAR sensor on the rear surface included in the delivery vehicle 600.

The control device 790 of the delivery vehicle 700 includes a CPU, a RAM, a ROM, a flash memory, a data communication circuit, a video card, a display device, an input device, a position measurement circuit, an input/output port, and a not-illustrated driving circuit, which are hardware. The configurations and functions of the hardware included in the control device 790 of the delivery vehicle 700 are the same as those of the hardware included in the control device 690 of the delivery vehicle 600 illustrated in FIG. 12.

The driving circuit of the delivery vehicle 700 is connected to not-illustrated cables connected to the not-illustrated motors for rotating the propellers 711 to 714. The driving circuit drives the not-illustrated motors for rotating the propellers 711 to 714 according to a signal output by the CPU. Furthermore, the driving circuit of the delivery vehicle 700 drives the not-illustrated motors that move the first holding frame 721*a* and the second holding frame 721*b* according to a signal output by the CPU.

When the not-illustrated data communication circuit included in the delivery vehicle 700 receives a movement command, the CPU of the delivery vehicle 700 performs similar process to the objective destination movement process illustrated in FIG. 13. With this, the delivery vehicle 700 flies at a setting speed according to the movement command and moves to the destination point PD of the objective destination.

Furthermore, when the data communication circuit included in the delivery vehicle 700 receives an acceptance command, the CPU of the delivery vehicle 700 performs the similar process to the movement destination movement process illustrated in FIG. 15. With this, the delivery vehicle 700 accepts the shipping location R1 or R2 or a delivery destination as a movement destination according to the movement command, and shifts the state of the delivery vehicle to an accepting state. Next, the delivery vehicle 700 flies at the setting speed, moves to the shipping location R1 or R2 or the movement destination as the delivery destination, and then shifts the state of the delivery vehicle to a non-accepting state.

In the present modification, it has been described that the delivery vehicle 700 is provided on the lower surface of the control device 790 thereof with the first holding frame 721*a* and the second holding frame 721*b* that surround and hold a product and the guide rails 722*a* and 722*b* that have the movement direction of the first holding frame 721*a* and the second holding frame 721*b*. However, the present disclosure is not limited thereto, and the delivery vehicle 700 may be provided on the lower surface of the control device 790 thereof with a not-illustrated storage cabinet for storing a product. The configuration and function of the storage cabinet included in the delivery vehicle 700 is the same as those of the storage cabinet 620 included in the delivery vehicle 600.

Furthermore, in the present modification, the delivery vehicle 700 has been described as an unmanned aerial vehicle; however, the present disclosure is not limited thereto, and the delivery vehicle 700 may be an unmanned flying object. Moreover, in the present modification, the delivery vehicle 700 has been described as a drone that obtains lift and thrust with the propellers 711 to 714; however, the present disclosure is not limited thereto. The delivery vehicle 700 may include wings and obtain lift with the wings, or include an air sac filled with gas having a specific gravity smaller than that of air and obtain lift with the air sac. Furthermore, the delivery vehicle 700 may include a jet engine or a rocket engine, and obtain thrust with the jet engine or the rocket engine.

Modification 23 of Embodiment

In the embodiment, it has been described that the target of an order is a product; however, the present disclosure is not limited thereto. The target of an order may be any object as long as it is a package, and may be, for example, an object that is not the target of commercial transactions. Furthermore, the target of an order may be a living thing instead of an object.

In the embodiment, it has been described that the product is a food or drink; however, the present disclosure is not limited thereto, and the product may be, for example, an object different from food and drink, such as a book or a home appliance.

Modification 24 of Embodiment

In the embodiment, it has been described that the shipping locations R1 and R2 are the positions of entrances of the stores ST1 and ST2 that sell ordered foods and drinks; however, the present disclosure is not limited thereto. The shipping locations R1 and R2 may be any positions as long as the delivery vehicle 600 can be stopped or parked, or the delivery vehicle 700 can land, and may be, for example, positions inside the stores ST1 and ST2, positions of parking lots of the stores ST1 and ST2, positions in warehouses where ordered products are stored, or positions of shipping doors of the warehouses.

Furthermore, in the embodiment, it has been described that the delivery destination is the entrance of the condominium in which the recipient resides; however, the present disclosure is not limited thereto. The delivery destination may be any position as long as the delivery vehicle 600 can be stopped or parked, or the delivery vehicle 700 can land. Furthermore, the point PD of the objective destination may be any position as long as the delivery vehicle 600 can be stopped or parked, or the delivery vehicle 700 can land.

The position where the delivery vehicle 600 can be stopped or parked may be, for example, the entrance of an apartment house, an office building, a hotel, a commercial facility, or a public facility, or the front door of a house. Furthermore, the position where the delivery vehicle 600 can be stopped or parked may be a lobby of an apartment house, an office building, a hotel, a commercial facility, or a public facility, a garden or a yard of a house, an apartment house, an office building, a hotel, a commercial facility, or a public facility, a parking lot, a river beach, or a park.

In addition to the position where the delivery vehicle 600 can be stopped or parked, the position where the delivery vehicle 700 can land may be a veranda or a rooftop of a house, an apartment building, an office building, a hotel, a commercial facility, or a public facility.

Furthermore, when arriving at the point PD of the objective destination, the delivery vehicle 600 does not stop or park at the point PD of the objective destination, but may circularly move or reciprocate in the vicinity of the point PD of the objective destination at a predetermined speed. The vicinity of the point PD of the objective destination means a region on the side of the point PD of the objective destination with respect to a boundary line separated from the point PD of the objective destination by a predetermined distance. Furthermore, the delivery vehicle 600 may stop once in the vicinity of the point PD of the objective destination and then circularly move or reciprocate in the vicinity of the point PD of the objective destination, may stop after circularly moving or reciprocating, or may repeat the stop and circularly moving or reciprocating.

Similarly, when arriving at the delivery destination or the shipping location R1 or R2, the delivery vehicle 600 may circularly move or reciprocate in the vicinity of the delivery destination or in the vicinity of the shipping location R1 or R2 at a predetermined speed. Furthermore, the delivery vehicle 600 may stop once in the vicinity of the delivery destination or in the vicinity of the shipping location R1 or R2, and then may circularly move or reciprocate in the vicinity of the delivery destination or in the vicinity of the shipping location R1 or R2, may stop after circularly moving or reciprocating, or may repeat the stop and circularly moving or reciprocating.

Moreover, when arriving at the point PD of the objective destination, the delivery vehicle 700 does not land at the point PD of the objective destination, and may circularly move or reciprocate in the vicinity of the point PD of the objective destination at a speed equal to or lower than a predetermined speed, or may perform hovering flight at an altitude within a predetermined range. The vicinity of the point PD of the objective destination means an airspace on the point PD of the objective destination side with respect to a boundary surface separated from the point PD of the objective destination by a predetermined distance.

Similarly, when arriving at the delivery destination or the shipping location R1 or R2, the delivery vehicle 700 may circularly move or reciprocate in the vicinity of the delivery destination or in the vicinity of the shipping location R1 or R2 at a speed equal to or lower than a predetermined speed, or may perform hovering flight at an altitude within a predetermined range.

Modification 25 of Embodiment

In the embodiment, the delivery vehicle 600 has been described as an unmanned ground vehicle. Furthermore, in modification 22 of the embodiment, the delivery vehicle 700 has been described as an unmanned aerial vehicle. However, the delivery vehicles 600 and 700 do not necessarily have to be unmanned, and a person may be on board as long as the delivery vehicles 600 and 700 are objects that move autonomously, except for the control by the control device 100.

Modification 26 of Embodiment

In the embodiment, it has been described that when the delivery vehicle 600 is located at a point different from the point PD of the objective destination in two periods, the control device 100 performs a control (hereinafter, referred to as objective destination movement control) for moving the delivery vehicle 600 toward the point PD.

One of the two periods is a first period from the timing (hereinafter, referred to as starting timing) when the control device 100 is started to the timing when an order is accepted and a collection delivery task is generated for the first time after the startup. Since the control device 100 allows the delivery vehicle 600 to accept the shipping location R1 or R2 as a movement destination when the order is accepted and the collection delivery task is generated, the first period may be a period from the start timing to the timing when the control device 100 allows, for the first time after the startup, the delivery vehicle 600 to accept the movement destination.

The remaining one of the two periods is a second period from the timing when all generated collection delivery tasks are deleted to the timing when an order is accepted and a collection delivery task is first generated after all the collection delivery tasks are deleted. Since the control device 100 deletes the collection delivery task when the delivery of the product is completed, the second period may be a period from the timing when the delivery by the delivery vehicle 600 is completed for all delivery destinations specified in the accepted order to the timing when the control device 100 allows, for the first time after the delivery is completed for all the delivery destinations, the delivery vehicle 600 to accept the movement destination.

However, the period during which the control device 100 performs the objective destination movement control is not limited to both the first period and the second period, and may be either the first period or the second period.

Furthermore, in the embodiment, it has been described that the execution of the objective destination movement control is prevented in two periods, that is, the objective destination movement control is not performed in two periods.

One of the two periods is a third period from the timing when a collection delivery task is generated for the first time after the start of the control device 100 to the timing when all generated collection delivery tasks are deleted. Furthermore, the remaining one of the two periods is a fourth period from the timing when a collection delivery task is generated for the first time after all the generated collection delivery tasks are deleted to the timing when all the generated collection delivery tasks are deleted.

When the collection delivery task is generated, the control device 100 allows the shipping location R1 or R2 to be accepted as a movement destination, and when the delivery is completed, the control device 100 deletes the collection delivery task. Therefore, the third period may be a period from the timing when the control device 100 allows, for the first time after the startup, the delivery vehicle 600 to accept the movement destination to the timing when the delivery by the delivery vehicle 600 is completed for all delivery destinations. Furthermore, the fourth period may be a period from the timing when the control device 100 allows, for the first time after the delivery for all the delivery destinations is completed, the delivery vehicle 600 to accept the movement destination to the timing when the delivery by the delivery vehicle 600 is completed for all the delivery destinations.

However, the period during which the control device 100 does not perform the objective destination movement control is not limited to both the third period and the fourth period, and may be either the third period or the fourth period.

Modification 27 of Embodiment

In the embodiment, it has been described that the control device 100 stores the state flag and changes the value of the state flag to a value indicating the non-accepting state when it is determined in step S11 of FIG. 7, step S26 of FIG. 8, and step S35 of FIG. 9 that the state of the delivery vehicle 600 is the non-accepting state. However, the present disclosure is not limited thereto, and the control device 100 may not store the state flag and may not perform the processes of steps S11, S26, and S35. Furthermore, in the embodiment, it has been described that when it is determined in steps S23 and S32 that the state of the delivery vehicle 600 is the accepting state, the control device 100 changes the value of the state flag to a value indicating the accepting state; however, the present disclosure is not limited thereto. The control device 100 may not store the state flag and may not perform the processes of steps S23 and S32.

Moreover, in the embodiment, it has been described that the delivery vehicle 600 stores the state flag and shifts the state of the delivery vehicle 600 to the accepting state by changing the value of the state flag to a value indicating the accepting state in step S72 of FIG. 15. Furthermore, in the embodiment, it has been described that the delivery vehicle 600 shifts the state of the delivery vehicle 600 to the non-accepting state by changing the value of the state flag to a value indicating the non-accepting state in step S78. However, the present disclosure is not limited thereto, and the delivery vehicle 600 may not store the state flag and may not perform the processes of steps S72 and S78.

Moreover, in the embodiment, it has been described that the control device 100 outputs the movement start command in step S24 after outputting the acceptance command in step S21 of FIG. 8. Furthermore, it has been described that the control device 100 outputs the movement start command in step S33 after outputting the acceptance command in step S30 of FIG. 9. However, the present disclosure is not limited thereto, and the control device 100 may output the movement start command and the acceptance command at the same time.

Furthermore, the present disclosure is not limited thereto, and the control device 100 may output the acceptance command after outputting the movement start command. In such a case, upon receiving the movement start command, the delivery vehicle 600 may perform the movement destination movement process illustrated in FIG. 15. At this time, the delivery vehicle 600 may perform a process of determining whether or not the acceptance command has been acquired, instead of the process of step S73. When it is determined that the acceptance command has been acquired, the delivery vehicle 600 may acquire position information of a movement destination from the acceptance command by performing the process of step S71. Thereafter, the delivery vehicle 600 may continuously perform the movement destination movement process from step S74.

Furthermore, the present disclosure is not limited thereto, and instead of the acceptance command and the movement start command, the control device 100 may output a movement command including the position information of a movement destination that is the shipping location R1 or R2 or a delivery destination and commanding movement to the movement destination.

Modification 28 of Embodiment

In the embodiment, it has been described that the control device 100 includes the information storage 190; however, the present disclosure is not limited thereto. The control device 100 according to the present modification does not include the information storage 190. The control device 100 according to the present modification is connected to a not-illustrated information storage device that is, for example, a network attached storage (NAS) and that has the same function as that of the information storage 190 via the Internet IN, and performs the objective destination determination process illustrated in FIG. 4, the movement control process illustrated in FIG. 7 to FIG. 9, the task generation process illustrated in FIG. 14, and the notification control process illustrated in FIG. 16 by using information stored in the information storage device. The delivery system 1 according to the present modification may or may not include the information storage device.

Modification 29 of Embodiment

In the embodiment, it has been described that the delivery system 1 includes the control device 100; however, the present disclosure is not limited thereto, and the delivery system 1 may not include the control device 100. In such a case, the objective destination determination process illustrated in FIG. 4, the movement control process illustrated in FIG. 7 to FIG. 9, the task generation process illustrated in FIG. 14, and the notification control process illustrated in FIG. 16 may be performed by the CPU 691 of the control device 690 included in the delivery vehicle 600. Therefore, the CPU 691 of the delivery vehicle 600 may serve as not-illustrated functional units corresponding to the acquirer 110, the first determiner 120, the controller 130, and the second determiner 140 of the control device 100. Furthermore, the flash memory 693*b* of the delivery vehicle 600 may serve as a not-illustrated functional unit corresponding to the information storage 190 of the control device 100.

The example of the present disclosure and modifications 1 to 29 of the embodiment can be combined with each other. It is of course possible to provide a control device 100 having a configuration for implementing the function according to any one of the embodiment and modifications 1 to 28 of the embodiment and a control device 690 having a configuration for implementing the function according to modification 29 of the embodiment, and it is also possible to provide a system including a plurality of devices and having, as a whole system, a configuration for implementing the function according to any one of the embodiment of the present disclosure and modifications 1 to 29 of the embodiment.

It is possible to provide a control device 100 previously having the configuration for implementing the function according to any one of the embodiment and modifications 1 to 28 of the embodiment. Furthermore, application of a program enables an existing control device to serve as the control device 100 according to any one of the embodiment and modifications 1 to 28 of the embodiment. That is, a computer (CPU or the like) that controls the existing control device executes a program for implementing each functional configuration by the control device 100 exemplified in any one of the embodiment and modifications 1 to 28 of the embodiment, thereby allowing the existing control device to serve as the control device 100 according to any one of the embodiment and modifications 1 to 28 of the embodiment.

It is possible to provide a control device 690 previously having the configuration for implementing the function according to modification 29 of the embodiment of the present disclosure. Furthermore, application of a program enables an existing control device to serve as the control device 690 according to modification 29 of the embodiment. That is, a computer (CPU or the like) that controls the existing control device executes a program for implementing each functional configuration by the control device 690 exemplified in modification 29 of the above example, thereby allowing the existing control device to serve as the control device 690 according to modification 29 of the embodiment.

A distribution method of such a program is arbitrary, and can be stored and distributed in a recording medium such as a memory card, a compact disc (CD)-ROM, or a digital versatile disc (DVD)-ROM, or can also be distributed via a communication medium such as the Internet.

The method according to the present disclosure can be carried out by using the control device 100 according to any one of the embodiment and modifications 1 to 28 of the embodiment and the control device 690 according to modification 29 of the embodiment. Furthermore, the method according to the present disclosure can be carried out by using the delivery system 1 according to any one of the embodiment and modifications 1 to 29 of the embodiment.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

Appendices

Appendix 1

A control device for controlling a delivery vehicle, the control device including:
  a determiner that determines a point (i) by using each of a plurality of shipping locations as a reference and (ii) on the basis of a preparation time from when a shipping request is accepted until when shipment becomes possible at each of the plurality of shipping locations; and
  a controller that
    allows the delivery vehicle to accept a shipping location of a package or a delivery destination of the package as a movement destination so as to set a state of the delivery vehicle to a state of accepting the movement destination,
    moves the delivery vehicle to the movement destination when the state of the delivery vehicle is the state of accepting the movement destination, and
    moves the delivery vehicle toward the point when the state of the delivery vehicle is a state of not accepting the movement destination.

Appendix 2

The control device according to appendix 1, further including:
  a communicator that transmits, to a terminal device at the shipping location, a notification notifying that a start timing of preparation has arrived when the delivery vehicle arrives at a boundary of a region determined (i) by using, as a reference, the shipping location accepted as the movement destination and (ii) on the basis of the preparation time at the shipping location.

Appendix 3

The control device according to appendix 2, wherein on the basis of a response time from transmission of the notification to reception of a response to the notification, the controller performs a control for delaying an arrival time of the delivery vehicle to the shipping location.

Appendix 4

The control device according to appendix 2 or 3, wherein
  the preparation time at the shipping location is a time until when shipment of an estimated product becomes possible, the estimated product being a product of which shipment is estimated to be requested,
  when the shipping request is accepted, the determiner corrects the boundary of the region on the basis of a time from when the shipping request is accepted until when shipment of a shipping product becomes possible, the shipping product being a product of which shipment is requested by the shipping request, and
  the communicator transmits the notification when the delivery vehicle arrives at the corrected boundary.

Appendix 5

The control device according to any one of appendices 2 to 4, wherein the determiner determines the point so that distances to the boundary of the region or movement times of the delivery vehicle to the boundary of the region satisfy a predetermined condition, the region determined (i) by using each of the plurality of shipping locations as a reference and (ii) on the basis of the preparation time at each of the plurality of shipping locations.

Appendix 6

The control device according to appendix 5, wherein the determiner acquires a probability that the shipping request is accepted for each of the plurality of shipping locations, and determines the point so that the distances or the movement times weighted by the acquired probability satisfy the predetermined condition.

Appendix 7

The control device according to appendix 6, wherein the predetermined condition is a condition that a sum of the weighted distances or the weighted movement times is minimized.

Appendix 8

The control device according to any one of appendices 2 to 7, wherein the point includes a point inside the region.

Appendix 9

The control device according to any one of appendices 2 to 8, wherein the determiner corrects the preparation time at each of the plurality of shipping locations on the basis of at least one of the number of employees on duty at each of the plurality of shipping locations or the number of packages for each of which the shipping request is accepted but preparation is not completed.

Appendix 10

The control device according to any one of appendices 1 to 9, wherein the delivery vehicle is an unmanned vehicle.

Appendix 11

The control device according to any one of appendices 1 to 10, wherein
when the delivery vehicle is located at a point different from the determined point in at least one of a period from a timing when the control device is started to a timing when the delivery vehicle is first allowed to accept the movement destination or a period from a timing when delivery to the delivery destination by the delivery vehicle is completed to the timing when the delivery vehicle is first allowed to accept the movement destination, the controller performs a control for moving the delivery vehicle toward the point, and
the controller does not perform the control for moving the delivery vehicle toward the point during a period from the timing when the delivery vehicle first accepts the movement destination to the timing when the delivery to the delivery destination by the delivery vehicle is completed.

Appendix 12

The control device according to appendix 11, wherein, when a delivery completion report notifying that the delivery to the delivery destination by the delivery vehicle is completed is obtained or when a predetermined time elapses from acquisition of an arrival report notifying that the delivery vehicle is arrived at the delivery destination, the controller determines that the delivery to the delivery destination by the delivery vehicle is completed.

Appendix 13

The control device according to any one of appendices 1 to 12, wherein
when the control device is started, the controller determines that the state of the delivery vehicle is the state of not accepting the movement destination,
when the shipping request is accepted, the controller allows the delivery vehicle to accept the movement destination and determines that the state of the delivery vehicle is changed to the state of accepting the movement destination, and
when the arrival report notifying that the delivery vehicle is arrived at the delivery destination is received, the controller determines that the state of the delivery vehicle is changed to the state of not accepting the movement destination.

Appendix 14

A control device for controlling a delivery vehicle, the control device including:
a communicator that transmits, to a terminal device at a shipping location, a notification notifying that a start timing of preparation has arrived when the delivery vehicle arrives at a boundary of a region determined (i) by using, as a reference, the shipping location accepted as a movement destination and (ii) on the basis of a preparation time from when a shipping request is accepted until when shipment becomes possible at the shipping location.

Appendix 15

The control device according to appendix 14, further including:
a controller that performs a control for delaying an arrival time of the delivery vehicle to the shipping location on the basis of a response time from transmission of the notification to reception of a response to the notification.

Appendix 16

A system for controlling a delivery vehicle, the system including:
a determiner that determines a point (i) by using each of a plurality of shipping locations as a reference and (ii) on the basis of a preparation time from when a shipping request is accepted until when shipment becomes possible at each of the plurality of shipping locations; and
a controller that
allows the delivery vehicle to accept a shipping location of a package or a delivery destination of the package as a movement destination so as to set a state of the delivery vehicle to a state of accepting the movement destination,
moves the delivery vehicle to the movement destination when the state of the delivery vehicle is the state of accepting the movement destination, and moves the delivery vehicle toward the point when the state of the delivery vehicle is a state of not accepting the movement destination.

Appendix 17

A system for controlling a delivery vehicle, the system including:
a communicator that transmits, to a terminal device at a shipping location, a notification notifying that a start timing of preparation has arrived when the delivery vehicle arrives at a boundary of a region determined (i) by using, as a reference, the shipping location accepted as a movement destination and (ii) on the basis of a preparation time from when a shipping request is accepted until when shipment becomes possible at the shipping location.

Appendix 18

A method to be performed by a control device or a system for controlling a delivery vehicle, the method including:
a determination step of determining a point (i) by using each of a plurality of shipping locations as a reference and (ii) on the basis of a preparation time from when a shipping request is accepted until when shipment becomes possible at each of the plurality of shipping locations; and
a control step of
allowing the delivery vehicle to accept a shipping location of a package or a delivery destination of the package as a movement destination so as to set a state of the delivery vehicle to a state of accepting the movement destination,
moving the delivery vehicle to the movement destination when the state of the delivery vehicle is the state of accepting the movement destination, and
moving the delivery vehicle toward the point when the state of the delivery vehicle is a state of not accepting the movement destination.

Appendix 19

A method to be performed by a control device or a system for controlling a delivery vehicle, the method including:
a communication step of transmitting, to a terminal device at a shipping location, a notification notifying that a start timing of preparation has arrived when the delivery vehicle arrives at a boundary of a region determined (i) by using, as a reference, the shipping location accepted as a movement destination and (ii) on the basis of a preparation time from when a shipping request is accepted until when shipment becomes possible at the shipping location.

Appendix 20

A control device for controlling a delivery vehicle, the control device including:
a determiner that determines a point (i) by using each of a plurality of shipping locations as a reference and (ii) on the basis of a preparation time from when a shipping request is accepted until when shipment becomes possible at each of the plurality of shipping locations; and
a controller that
prevents execution of a control for moving the delivery vehicle toward the point while at least one of a collection task or a delivery task exists, the collection task being a task of allowing the delivery vehicle to collect a product, and the delivery task being a task of allowing the delivery vehicle to deliver the product, and
performs the control for moving the delivery vehicle toward the point when the delivery vehicle is located at a point different from the determined point while the collection task and the delivery task do not exist.

Appendix 21

The control device according to appendix 20, wherein
when an order is accepted, the controller generates the collection task of allowing the delivery vehicle to collect the product at a shipping location specified in the order among the plurality of shipping locations and the delivery task of allowing the delivery vehicle to deliver the collected product to a delivery destination specified in the order,
the control device further includes a communicator that receives a collection completion report notifying that collection of the product is completed and a delivery completion report notifying that delivery of the product is completed, and
the controller deletes the collection task when the collection completion report is received and deletes the delivery task when the delivery completion report is received.

REFERENCE SIGNS LIST

1 Delivery system
100, 690, 790 Control device
101, 691 CPU
102, 692 RAM
103$a$, 693$a$ ROM
103$b$ Hard disk
104, 694 Data communication circuit
105$a$, 695$a$ Video card
105$b$, 695$b$ Display device
105$c$, 695$c$ Input device
110 Acquirer
120 First Determiner
130 Controller
140 Second Determiner
190 Information storage
600, 700 Delivery vehicle
601, 602 Wheel
610 Chassis
620 Storage cabinet
621 Storage box
621$a$ Door
621$b$ Door frame
621$c$ Dead bolt
621$d$ Strike
630, 730 Imaging device
641, 741 LiDAR sensor
693$b$ Flash memory
696 Position measurement circuit
698 Input/output port
699 Driving circuit
701 to 704 Propeller arm
711 to 714 Propeller
721$a$ First holding frame
721$b$ Second holding frame
722$a$, 722$b$ Guide rail 800, 901, 902 Terminal device
B1, B1', B2 Boundary
D1, D2, D2' Distance
IN Internet
L1, L2 Region distance
N1, N1', N2 Neighboring region
PD Point
R1, R2 Shipping location
ST1, ST2 Store
T1, T2 Region time

The invention claimed is:

1. A control device configured to control an unmanned delivery vehicle, the control device comprising:
at least one memory storing program code;
at least one processor configured to access the program code and operate as instructed by the program code; and
a communication circuit configured to communicate with the unmanned delivery vehicle, wherein
the program code includes:
acquisition code configured to cause the at least one processor to acquire, for k=1 to K where k is a first integer and K is a second integer of 2 or more, k-th preparation time information representing a length of a k-th preparation time that is based on an assumption that a shipping request for an estimated product being a product of which shipment is estimated to be requested has been accepted at a k-th shipping location and that is a time from when the shipping request is accepted until when shipment of the estimated product becomes possible at the k-th shipping location, the k-th preparation time information being acquired from a storage storing the k-th preparation time information in advance;
determination code configured to cause the at least one processor to:
for k=1 to the K, determine a k-th boundary that is separated from the k-th shipping location by a distance in which the unmanned delivery vehicle moves in a duration represented by the acquired k-th preparation time information, and
determine, as a point of an objective destination, a first point where a first sum of k-th distances for k=1 to the K that are each a k-th distance to the k-th boundary, or a second sum of k-th movement times for k=1 to the K that are each a k-th movement time of the unmanned delivery vehicle to the k-th boundary, decreases, in preference to a second point where the first sum or the second sum increases; and
control code configured to cause the at least one processor to repeatedly perform a control for:
based on a shipment request of a shipping product requested to be shipped is being accepted at a shipping location among first to K-th shipping locations, moving the unmanned delivery vehicle to the shipping location,
based on a collection completion report notifying that collection of the shipping product is completed is being received by the communication circuit, moving the unmanned delivery vehicle storing the shipping product to a delivery destination of the shipping product, and
based on a delivery completion report notifying that delivery to the delivery destination is completed being received or based on a predetermined time elapsing from acquisition of an arrival report notifying that the unmanned delivery vehicle is arrived at the delivery destination, moving the unmanned delivery vehicle toward the point of the objective destination.

2. The control device according to claim 1, wherein the determination code is configured to cause the at least one processor to determine, as the point of the objective destination, a third point where a third sum of weighted k-th distances for k=1 to the K that are each the k-th distance weighted by a k-th probability that the shipping request is accepted for the k-th shipping location or a fourth sum of weighted k-th movement times for k=1 to the K that are each the k-th movement time weighted by the k-th probability decreases, in preference to a fourth point where the third sum or the fourth sum increases.

3. The control device according to claim 2, wherein the determination code is configured to cause the at least one processor to determine the point of the objective destination such that the third sum or the fourth sum is minimized.

4. The control device according to claim 1, wherein the determination code is configured to cause the at least one processor to correct, for k=1 to the K, the length represented by the k-th preparation time information based on at least one of a number of employees on duty at the k-th shipping location or a number of packages for each of which the shipping request is accepted but preparation is not completed.

5. The control device according to claim 1, wherein
when the K is 2, the storage:
stores, in advance, first preparation time information representing a length of a first preparation time that is based on an assumption that the shipping request for the estimated product being a product of which shipment is estimated to be requested has been accepted at a first shipping location and that is a time from when the shipping request is accepted until when shipment of the estimated product becomes possible at the first shipping location, and
stores, in advance, second preparation time information representing a length of a second preparation time that is based on an assumption that the shipping request for the estimated product being a product of which shipment is estimated to be requested has been accepted at a second shipping location and that is a time from when the shipping request is accepted until when shipment of the estimated product becomes possible at the second shipping location,
the acquisition code is configured to cause, when the K is 2, the at least one processor to acquire the first preparation time information and the second preparation time information from the storage, and
the determination code is configured to cause, when the K is 2, the at least one processor to:
determine a first boundary that is separated from the first shipping location by a distance in which the unmanned delivery vehicle moves in a duration represented by the acquired first preparation time information, and determine a second boundary that is separated from the second shipping location by a distance in which the unmanned delivery vehicle moves in a duration represented by the acquired second preparation time information;
determine, as a first region, the first boundary and a region closer to the first shipping location than the first boundary, and determine, as a second region, the second boundary and a region closer to the second shipping location than the second boundary; and
in a first case, a second case, or a third case, determine, as the point of the objective destination, a third point where a third sum of a first distance being a distance to the first boundary and a second distance being a distance to the second boundary or a fourth sum of a first movement time being a movement time of the unmanned delivery vehicle to the first boundary, and a second movement time being a movement time of the unmanned delivery vehicle to the second boundary, decreases, in preference to a fourth point where the third sum or the fourth sum increases, wherein the first case is a case where the first region wholly covers the second region and a point of tangency does not exist between the first boundary corresponding to the first region and the second boundary corresponding to the second region, the second case is a case where the first region wholly covers the second region and the point of tangency does exist between the first boundary and the second boundary, and the third case is a case where the first region partially covers the second region but does not wholly cover the second region.

6. The control device according to claim 5, wherein the determination code is configured to cause, when the K is 2, the at least one processor to:

in the first case where the first region wholly covers the second region and the point of tangency does not exist, determine the point of the objective destination at a first position located inside the first region and located outside the second region;

in the second case where the first region wholly covers the second region and the point of tangency does exist, determine the point of the objective destination at a second position of the point of tangency; and in the third case where the first region partially covers the second region but does not wholly cover the second region, determine the point of the objective destination at a third position of a point of intersection of the first boundary and the second boundary.

7. The control device according to claim 1, wherein the determination code is configured to cause the at least one processor to determine the point of the objective destination such that the first sum or the second sum is minimized.

8. The control device according to claim 1, wherein for k=1 to the K, the k-th preparation time at the k-th shipping location includes a search time required for finding at the k-th shipping location the estimated product of which shipment is estimated to be requested at the k-th shipping location, and a transportation time required for transporting the estimated product, includes the search time, a packaging time required for packaging the estimated product at the k-th shipping location, and the transportation time, or includes a cooking time required for cooking the estimated product at the k-th shipping location, the packaging time, and the transportation time.

9. The control device according to claim 1, wherein the control code is configured to cause the at least one processor to:

allow the unmanned delivery vehicle to accept the shipping location among the first to K-th shipping locations or the delivery destination of the shipping product as a movement destination so as to set a state of the unmanned delivery vehicle to a first state of accepting the movement destination;

move the unmanned delivery vehicle to the movement destination when the state of the unmanned delivery vehicle is the first state; and move the unmanned delivery vehicle toward the point of the objective destination when the state of the unmanned delivery vehicle is a second state of not accepting the movement destination.

10. The control device according to claim 9, wherein the control code is configured to cause the at least one processor to cause the unmanned delivery vehicle to move toward the point of the objective destination when the unmanned delivery vehicle is located at a third point different from the point of the objective destination in at least one of a first period from a first timing when the control device is started to a second timing when the unmanned delivery vehicle is first allowed to accept the movement destination or a second period from a third timing when delivery to the delivery destination by the unmanned delivery vehicle is completed to the second timing, and the control code is configured to cause the at least one processor not to cause the unmanned delivery vehicle to move toward the point of the objective destination during a third period from the second timing to the third timing.

11. The control device according to claim 10, wherein the control code is configured to cause the at least one processor to determine that the delivery to the delivery destination by the unmanned delivery vehicle is completed when the delivery completion report notifying that the delivery to the delivery destination by the unmanned delivery vehicle is completed is obtained or when a predetermined time elapses from acquisition of the arrival report notifying that the unmanned delivery vehicle has arrived at the delivery destination.

12. The control device according to claim 9, wherein the control code is configured to cause the at least one processor to, when the control device is started, determine that the state of the unmanned delivery vehicle is the second state, the control code is configured to cause the at least one processor to, when the shipping request is accepted, allow the unmanned delivery vehicle to accept the movement destination and determine that the state of the unmanned delivery vehicle is changed to the first state, and the control code is configured to cause the at least one processor to, when the arrival report notifying that the unmanned delivery vehicle has arrived at the delivery destination is received, determine that the state of the unmanned delivery vehicle is changed to the second state.

13. The control device according to claim 9, wherein the control code is configured to cause the at least one processor to, when the shipping request is accepted at the shipping location among the first to K-th shipping locations, allow the unmanned delivery vehicle to accept, as the movement destination, the shipping location at which the shipping request is accepted, and move the unmanned delivery vehicle to the movement destination.

14. A method to be performed by a control device or a system that includes at least one processor and a communication circuit configured to communicate with an unmanned delivery vehicle and is for controlling the unmanned delivery vehicle, the method comprising:

acquiring, for k=1 to K where k is a first integer and K is a second integer of 2 or more, k-th preparation time information representing a length of a k-th preparation time that is based on an assumption that a shipping request for an estimated product being a product of which shipment is estimated to be requested has been accepted at a k-th shipping location and that is a time from when the shipping request is accepted until when shipment of the estimated product becomes possible at the k-th shipping location, the k-th preparation time information being acquired from a storage storing the k-th preparation time information in advance;

determining, for k=1 to the K, a k-th boundary that is separated from the k-th shipping location by a distance in which the unmanned delivery vehicle moves in a time of the length duration represented by the acquired k-th preparation time information;

determining, as a point of an objective destination, a first point where a first sum of k-th distances for k=1 to the K that are each a k-th distance to the k-th boundary or a second sum of k-th movement times for k=1 to the K that are each a k-th movement time of the unmanned delivery vehicle to the k-th boundary, decreases, in preference to a second point where the first sum or the second sum increases; and repeatedly performing a control for:
  based on a shipment request of a shipping product requested to be shipped is being accepted at a shipping location among first to K-th shipping locations,
  moving the unmanned delivery vehicle to the shipping location,
  based on a collection completion report notifying that collection of the shipping product is completed being received by the communication circuit, moving the unmanned delivery vehicle storing the shipping product to a delivery destination of the shipping product, and
  based on a delivery completion report notifying that delivery to the delivery destination is completed being received or based on a predetermined time elapsing from acquisition of an arrival report notifying that the unmanned delivery vehicle is arrived at the delivery destination, moving the unmanned delivery vehicle toward the point of the objective destination.

15. The method according to claim 14, further comprising:

allowing the unmanned delivery vehicle to accept the shipping location among the first to K-th shipping locations or the delivery destination of the shipping product as a movement destination so as to set a state of the unmanned delivery vehicle to a first state of accepting the movement destination;

moving the unmanned delivery vehicle to the movement destination when the state of the unmanned delivery vehicle is the first state; and moving the unmanned delivery vehicle toward the point of the objective destination when the state of the unmanned delivery vehicle is a second state of not accepting the movement destination.

* * * * *